(12) United States Patent
Storey et al.

(10) Patent No.: US 9,650,449 B2
(45) Date of Patent: *May 16, 2017

(54) FUNCTIONALIZATION OF POLYOLEFINS WITH PHENOXY DERIVATIVES

(71) Applicant: The University of Southern Mississippi, Hatteiesburgh, MS (US)

(72) Inventors: Robson F. Storey, Hattiesburg, MS (US); David L. Morgan, Fairfield, CA (US)

(73) Assignee: The University of Southern Mississippi, Hattiesburg, MS (US)

(*) Notice: Subject to any disclaimer, the term of this patent is extended or adjusted under 35 U.S.C. 154(b) by 0 days.

This patent is subject to a terminal disclaimer.

(21) Appl. No.: 13/730,695

(22) Filed: Dec. 28, 2012

(65) Prior Publication Data

US 2013/0131280 A1    May 23, 2013

Related U.S. Application Data

(62) Division of application No. 12/355,664, filed on Jan. 16, 2009, now Pat. No. 8,344,073.

(51) Int. Cl.
*C08F 8/00* (2006.01)
*C08F 110/10* (2006.01)

(52) U.S. Cl.
CPC .............. *C08F 8/00* (2013.01); *C08F 110/10* (2013.01)

(58) Field of Classification Search
CPC ........ C08F 10/00; C08F 10/10; C08F 110/10; C08F 8/00; C08F 8/18
USPC .................... 525/333.7, 383, 385; 526/348.7
See application file for complete search history.

(56) References Cited

U.S. PATENT DOCUMENTS

| | | |
|---|---|---|
| 3,155,686 A | 11/1964 | Prill et al. |
| 3,632,600 A | 1/1972 | Morris et al. |
| 4,034,038 A | 7/1977 | Vogel |
| 4,152,499 A | 5/1979 | Boerzel et al. |
| 4,238,628 A | 12/1980 | Cahill et al. |
| 4,255,538 A | 3/1981 | Skillcorn |
| 4,276,394 A | 6/1981 | Kennedy et al. |
| 4,342,849 A | 8/1982 | Kennedy |
| 4,393,199 A | 7/1983 | Manser |
| 4,429,099 A * | 1/1984 | Kennedy et al. ............... 528/98 |
| 4,468,291 A | 8/1984 | Naarmann et al. |
| 4,486,572 A | 12/1984 | Kennedy |
| 4,568,732 A | 2/1986 | Kennedy et al. |
| 4,758,631 A | 7/1988 | Kennedy et al. |
| 4,814,405 A | 3/1989 | Kennedy |
| 4,910,321 A | 3/1990 | Kennedy et al. |
| 4,929,683 A | 5/1990 | Kennedy et al. |
| 4,943,616 A | 7/1990 | Mishra et al. |
| 4,946,899 A | 8/1990 | Kennedy et al. |
| 4,948,936 A | 8/1990 | Landry |
| 5,032,653 A | 7/1991 | Cheradame et al. |
| 5,066,730 A | 11/1991 | Kennedy et al. |
| 5,112,507 A | 5/1992 | Harrison |
| 5,122,572 A | 6/1992 | Kennedy et al. |
| 5,169,914 A | 12/1992 | Kaszas et al. |
| 5,175,225 A | 12/1992 | Ruhe, Jr. |
| 5,219,948 A | 6/1993 | Storey et al. |
| 5,225,492 A | 7/1993 | Kennedy et al. |
| 5,286,823 A | 2/1994 | Rath |
| 5,300,701 A | 4/1994 | Cherpeck |
| 5,334,321 A | 8/1994 | Harrison et al. |
| 5,336,745 A | 8/1994 | Cheradame et al. |
| 5,340,881 A | 8/1994 | Kennedy et al. |
| 5,350,786 A | 9/1994 | Costanzi et al. |
| 5,350,819 A | 9/1994 | Shaffer |
| 5,366,745 A | 11/1994 | Daden |
| 5,395,885 A | 3/1995 | Kennedy et al. |
| 5,428,111 A | 6/1995 | Faust et al. |
| 5,444,135 A | 8/1995 | Cheradame et al. |
| 5,448,000 A | 9/1995 | Gullapalli et al. |
| 5,451,647 A | 9/1995 | Faust et al. |
| 5,464,549 A | 11/1995 | Sieberth |
| 5,488,000 A | 1/1996 | Zhang et al. |
| 5,506,316 A | 4/1996 | Shaffer |
| 5,580,935 A | 12/1996 | Shaffer |
| 5,616,668 A | 4/1997 | Harrison et al. |
| 5,629,394 A | 5/1997 | Cheradame et al. |

(Continued)

FOREIGN PATENT DOCUMENTS

| | | |
|---|---|---|
| DE | 237072 | 7/1986 |
| DE | 240308 | 10/1986 |

(Continued)

OTHER PUBLICATIONS

JP 4-20501, Jan. 1992, translation.*
Rooney et al., J. Appl. Pol. Sci. 25 (1980) 1365-1372.*
JP 5-186513, Jul. 1993, English translation.*
JP 2969471, machine translation.*
https://en.wikipedia.org/wiki/Electrophilic_aromatic_directing_groups; Jul. 2016.*
JP 2008-266447, Nov. 2008, machine translation.*
Bae et al., "The role of pyridine derivatives in living carbocationic polymerization: Lewis base or nucleophile?" Macromol. Symp., 132, 11-23, 1998.
Bae et al., "β-Proton elimination by free bases in the living carbocationic polymerization of isobutylene," Macromolecules, 30, 7341-7344, 1997.
Bauer et al., "Cationic polymerization of isobutene initiated by stannic chloride and phenols: Polymer endgroup studies," J. Poly. Sci., A-1(9), 1451, 1971.
Bauer et al., "Complexes of stannic chloride and alkyl phenols and the influence of these complexes and of free phenol on the cationic polymerization of isobutene," Can. J. Chem., 48, 1251-1262, 1970.
Bezumnova et al., "Reaction of 2-mercaptobenzothiazole with ethylenic hydrocarbons," Khim. Geterosikl. Soedin., 80, 194, 1971 (English abstract).

(Continued)

Primary Examiner — Roberto Rabago
(74) Attorney, Agent, or Firm — Jones Day

(57) ABSTRACT

Provided herein are telechelic polymers and methods for producing the same. In some embodiments, provided herein are compounds having the formula

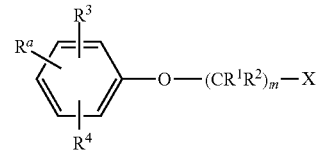

and methods for producing the same.

47 Claims, No Drawings

(56) References Cited

U.S. PATENT DOCUMENTS

| | | |
|---|---|---|
| 5,637,647 A | 6/1997 | Faust et al. |
| 5,663,457 A | 9/1997 | Kolp |
| 5,663,470 A | 9/1997 | Chen et al. |
| 5,677,386 A | 10/1997 | Faust et al. |
| 5,690,861 A | 11/1997 | Faust |
| 5,777,044 A | 7/1998 | Faust |
| 5,945,491 A | 8/1999 | Matyjaszewski et al. |
| 5,948,936 A | 9/1999 | Itoh et al. |
| 6,033,446 A | 3/2000 | Cherpeck et al. |
| 6,121,379 A | 9/2000 | Yamanaka et al. |
| 6,194,597 B1 | 2/2001 | Faust et al. |
| 6,407,066 B1 | 6/2002 | Dressen et al. |
| 6,451,920 B1 | 9/2002 | Harrison et al. |
| 6,468,948 B1 | 10/2002 | Rossi et al. |
| 6,515,083 B2 | 2/2003 | Ozawa et al. |
| 6,642,318 B1 | 11/2003 | Chiefari et al. |
| 6,753,391 B1 | 6/2004 | Lewandowski et al. |
| 6,818,716 B2 | 11/2004 | Wendland et al. |
| 6,906,011 B2 | 6/2005 | Harrison et al. |
| 6,969,744 B2 | 11/2005 | Stokes et al. |
| 7,071,275 B2 | 7/2006 | Rath et al. |
| 7,124,110 B1 | 10/2006 | Kemp, II et al. |
| 7,244,870 B2 | 7/2007 | Lange et al. |
| 7,420,019 B2 | 9/2008 | Stokes |
| 7,501,476 B2 | 3/2009 | Stokes |
| 7,576,161 B2 | 8/2009 | Stokes |
| 7,705,090 B2 | 4/2010 | Stokes |
| 7,709,580 B2 | 5/2010 | Stokes |
| 7,816,459 B2 | 10/2010 | Stokes |
| 8,013,073 B2 | 9/2011 | Stokes et al. |
| 8,063,154 B2 | 11/2011 | Storey et al. |
| 8,344,073 B2 | 1/2013 | Storey et al. |
| 8,394,897 B2 | 3/2013 | Stokes |
| 8,937,134 B2 * | 1/2015 | Storey ............ C08F 8/18 525/132 |
| 2002/0082367 A1 | 6/2002 | McConville et al. |
| 2002/0132905 A1 | 9/2002 | Babinee et al. |
| 2003/0105194 A1 | 6/2003 | Stuart et al. |
| 2003/0162858 A1 | 8/2003 | Faust et al. |
| 2003/0191257 A1 | 10/2003 | Wettling et al. |
| 2004/0015029 A1 | 1/2004 | Lange et al. |
| 2004/0260033 A1 | 12/2004 | Stokes et al. |
| 2005/0107551 A1* | 5/2005 | Lang et al. ............ 526/82 |
| 2005/0282972 A1 | 12/2005 | Stokes et al. |
| 2006/0041081 A1 | 2/2006 | Stokes et al. |
| 2006/0041083 A1 | 2/2006 | Stokes et al. |
| 2006/0041084 A1 | 2/2006 | Stokes et al. |
| 2006/0135721 A1 | 6/2006 | Lange et al. |
| 2006/0264577 A1 | 11/2006 | Faust et al. |
| 2007/0155908 A1 | 7/2007 | Stokes et al. |
| 2007/0155910 A1 | 7/2007 | Stokes |
| 2007/0155911 A1 | 7/2007 | Stokes et al. |
| 2009/0247716 A1 | 10/2009 | Stokes et al. |
| 2009/0258803 A1 | 10/2009 | Harrison et al. |
| 2009/0318624 A1 | 12/2009 | Storey et al. |
| 2010/0016191 A1* | 1/2010 | Harrison ............ C08F 222/06 508/287 |
| 2010/0099835 A1* | 4/2010 | Stokes ............ 526/154 |
| 2010/0249001 A1 | 9/2010 | Storey et al. |
| 2011/0028681 A1 | 2/2011 | Storey et al. |

FOREIGN PATENT DOCUMENTS

| | | |
|---|---|---|
| DE | 253827 | 2/1988 |
| DE | 262028 | 11/1988 |
| DE | 262233 | 11/1988 |
| DE | 266104 | 3/1989 |
| DE | 282697 | 9/1990 |
| DE | 296283 | 11/1991 |
| DE | 296284 | 11/1991 |
| DE | 296285 | 11/1991 |
| DE | 296286 | 11/1991 |
| EP | 206756 A2 | 12/1986 |
| EP | 255181 A1 | 2/1988 |
| EP | 342792 A1 | 11/1989 |
| EP | 397081 A2 | 5/1990 |
| EP | 400844 A1 | 5/1990 |
| EP | 341012 B1 | 12/1992 |
| EP | 959096 | 11/1999 |
| EP | 1209170 A1 | 5/2002 |
| EP | 1489109 A2 | 12/2004 |
| GB | 1 159 368 | 4/1987 |
| GB | 2 184 738 A | 7/1987 |
| JP | 03287605 | 12/1991 |
| JP | 4-20501 * | 1/1992 |
| JP | H04154816 A | 5/1992 |
| JP | 4-183702 * | 6/1992 |
| JP | 4-183702 A | 6/1992 |
| JP | H04183702 A | 6/1992 |
| JP | 5-186513 * | 7/1993 |
| JP | 2969471 * | 8/1999 |
| JP | 2001172567 A | 6/2001 |
| JP | 2008-266447 * | 11/2008 |
| JP | 2008266447 A | 11/2008 |
| WO | WO 90/05711 | 5/1990 |
| WO | WO 94/13706 | 6/1994 |
| WO | WO 97/19962 A1 | 6/1997 |
| WO | WO 99/09074 | 2/1999 |
| WO | WO 00/75202 A1 | 12/2000 |
| WO | WO 03/106390 A1 | 12/2003 |
| WO | WO 2004/048215 A2 | 6/2004 |
| WO | WO 2006/110647 A1 | 10/2006 |

OTHER PUBLICATIONS

Bin et al., "Study of the interactions of organic sulfides with active species in the cationic polymerization of 1,3-pentadiene," Polymer Bulletin, 51, 343-349, 2004.

Boileau et al., "Reaction of functionalized thiols with oligoisobutenes via free-radical addition. Some new routes to thermoplastic crosslinkable polymers," European Polymer Journal, 39, 1395-1404, 2003.

De et al., "Capping reactions in cationic polymerization: Kinetic and synthetic utility," Polymer Preprints., 46, 847-848, 2005.

De et al., "Carbocationic polymerization of isobutylene using methylaluminum bromide coinitiators: Synthesis of bromoallyl functional polyisobutylene," Macromolecules, 39, 7527-7533, 2006.

De Eta al., "Relative reactivity of C4 olefins toward the polyisobutylene cation," Macromolecules, 39, 6861-6870, 2006.

Depuy et al., "Electronic effects in elimination reactions. V. The $E_2$ reaction of β-phenylethyl fluorides and chlorides," J. Am. Chem. Soc., 82, 2535-2537, 1960.

Diaz et al., "A polymer electrode with variable conductivity: Polypyrrole," J.C.S. Chem. Comm., 397-398, 1980.

Diaz et al., "Electrochemical polymerization of pyrrole," J.C.S. Chem Comm., 635-636, 1979.

Evsyukov et al., "Chemical dehydrohalogenation of halogen-containing polymer," Russian Chemical Reviews, 60, 373-390, 1991.

Faust et al., "Living carbocationic polymerization. XXI. Kinetic and mechanistic studies of isobutylene polymerization initiated by trimethylpentyl esters of different acids," J. Macromol. Sci.-Chem., A27, 649-667, 1990.

Faust et al., "Living carbocationic polymerization. IV. Living polymerization of isobutylene," J. Polym. Sci. Part A: Polym. Chem. 25, 1847-1864, 1986.

Fodor et al., "Synthetic applications of non-polymerizable monomers in living carbocationic polymerizations," Polymer Preprints., 35, 492-493, 1994.

Gardini, "The oxidation of monocyclic pyrroles," Adv. Heterocyl. Chem., 15, 67-99, 1973.

De La Campa, "Addition des thiols sur les double liaisons des polybutadienes hydroxytelecheliques radicalaire et anionique. Etude des mecanismes d'addition par $^1$H et $^{13}$C NMR," Makromol. Chem., 182, 1415-1428, 1981 (English Abstract).

Gorski et al., "Functionalized polyisobutenes by SH-en addition", Die Angewandte Makromolekulare Chemie, 253, 51-64, 1997.

Hadjikyriacou et al., "Cationic macromolecular design and synthesis using furan derivatives," Macromolecules, 32, 6394-6399, 1999.

(56) References Cited

OTHER PUBLICATIONS

Hadjikyriacou et al., "Living coupling reaction in living cationic polymerization. 3. Coupling reaction of living polyisobutylene using bis(furanyl) derivatives," Macromolecules, 33, 730-733, 2000.
Hadjikyriacou et al., "Living coupling reaction in living cationic polymerization. 4. Synthesis of telechelic polyisobutylenes using bis-furanyl derivatives as coupling agents", J.M.S. Pure Appl. Chem., A37, 1333-1352, 2000.
Hamley, Block Copolymers, Encyclopedia of Polymer Science and Technology, 457-482, 2002.
Higashihara et al., "Synthesis of poly(isobutylene-block-methyl methacrylate) by a novel coupling approach," Macromolecules, 39(16), 5275-5279, 2006.
Ipatieff et al., "Reaction of aliphatic olefins with thiophenol," J. Am. Chem. Soc. 60, 27312734, 1938.
Ivan et al., "Living carbocationic polymerization. XXX. One-pot synthesis of allyl-terminated linear and tri-arm star polyisobutylenes, and epoxy-and hydroxy-telechelics therefrom," J. Polym. Sci. Part A: Polym. Chem., 28, 89-104, 1990.
Ivan et al., "New telechelic polymers and sequential copolymers by polyfunctional initiator-transfer agents (Inifers)," J. Poly. Chem. Ed., 18, 3177-3191, 1980.
Kaszas et al., "Electron pair donors in carbocationic polymerization. 2. Mechanism of living carbocationic polymerizations and the role of in situ and external electron pair donors," Macromolecules 23, 3909-3915, 1990.
Kaszas et al., "Electron pair donors in carbocationic polymerization," Polymer Bulletin, 20(5), 413-419, 1988.
Keki et al., "Dimethyldioxirane as a new and effective oxidation agent for the epoxidation of $\alpha,\omega$-di(isobutenyl)polyisobutylene: A convenient synthesis of $\alpha,\omega$-di(2-methyl-3-hydroxypropyl)-polyisobutylene," J. Poly. Sci. Part A: Poly. Chem., 40, 3974-3986, 2002.
Kemp, "Synthesis and characterization of novel polyisobutylene based materials: Gradient block copolymers, exo-olefins via in situ quenching, and carboxylic acid functional telechelics," Thesis Dissertation, University of Southern Mississippi, 2007.
Kennedy et al., "New telechelic polymers and sequential copolymers by polyfunctional initiator-transfer agents, (Inifers) 10. Three-arm star telechelic polyisobutylenes carrying chlorine, olefin or primary alcohol endgroups," Polymer Bulletin, 4, 67-74, 1981.
Kennedy et al., "Living carbocationic polymerization. XXXIX. Isobutylene polymerization in the presence of pyridine and various other electron donors," J. Macromol. Sci. Chem., A28, 197-207, 1991.
Kennedy et al., "New telechelic polymers and sequential copolymers by polyfunctional initiator-transfer agents (Inifers) V. Synthesis of $\alpha$-tert-butyl-$\omega$-isopropenylopolyisobutylene and $\alpha,\omega$-di(isopropenyl)polyisobutylene," Polymer Bulletin, 1, 575-580, 1979.
Kennedy et al., "New telechelic polymers and sequential copolymers by polyfunctional initiator-transfer agents (Inifers) 27. Bisphenol and trisphenol polyisobutylenes," Polymer Bulletin, 8, 563-570, 1982.
Kennedy et al., "New telechelic polymers and sequential copolymers by polyfunctional initiator-transfer Agents (Inifers) I. Synthesis and characterization of $\alpha,\omega$-di-(t-chloro)polyisobutylene," Polymer Preprints, 20, 316-319, 1979.
Kennedy et al., "New telechelic polymers and sequential copolymers by polyfunctional initiator-transfer agents. II. Synthesis and characterization of $\alpha,\omega$-di-(tert-chloro)polyisobutylene," J. Polym. Sci., Polym. Chem. Ed., 18, 1523-1537, 1980.
Kennedy et al., "New telechelic polymers and sequential copolymers by polyfunctional initiator-transfer agents (Inifers) 29. Synthesis of $\alpha,\omega$-di-(amino)polyisobutylene," Polymer Bulletin, 9, 27-32, 1983.
Kim et al., "Synthesis and characterization of novel silicon-functional polyisobutylenes and their applications: Polyisobutylene brushes on silicate substrates via living cationic polymerization." J. Macromol. Sci. Part A—Pure Appl. Chem., A40, 991-1008, 2003.
Klemm et al., "Untersuchungen zur thioladdition an polybutadiene," Angew Makromol. Chem., 207, 187-193, 1993 (English Abstract).
Klemm et al., "Unusual addition by the thiol-ene photopolymerization." Polymer Bulletin, 28, 653-656, 1992.
Koroskenyi et al., "Initiation via haloboration in living cationic polymerization. 6. A novel method for the synthesis of primary amine functional polyisobutylenes," Pure Appl. Chem., A36, 1879-1893, 1999.
Lenz, "Organic chemistry of synthetic high polymers," Section 7.2 Poly(alkylene Sulfides), Interscience Publishers, New York, p. 196, 1967.
Li et al., "Polyisobutylene supports—a non-polar hydrocarbon analog of PEG supports," Tetrahedron, 61, 12081-12092, 2005.
Machl et al., "Novel synthetic routes to aminofunctionalized polyisobutylenes," Polymer Preprints, 44, 858-859, 2003.
Maenz et al., "Comb-like polymers from macromonomers based on low-molecular weight poly(isobutene)s," Angewandte Makromolekulare Chemie, 258, 69-73, 1998.
Maenz et al., "Investigation of the structure of low molecular weight polybutadienes and epoxides made therefrom," Acta Polymerica, 47, 208-213, 1996.
Maenz et al., "Macromonomers based on low-molecular-weight polyisobutenes," Angewandte Makromolekulare Chemie, 242, 183-197, 1996.
Martinez-Castro et al., "Polyisobutylene stars and polyisobutylene-block-poly(tert-butyl methacrylate) block copolymers by site transformation of thiophene end-capped polyisobutylene chain ends," Macromolecules, 36, 6985-6994, 2003.
Mishra et al., "Living carbocationic polymerization VIII. Telechelic polyisobutylenes by the $MeO(CH_3)_2C$-p-$C_6H_4$-$C(CH_3)_2OMe/BCl_3$ initiating system," Polymer Bulletin, 17, 7-13, 1987.
Mishra et al., "New telechelic polymers and sequential copolymers by polyfunctional initiator transfer agents (inifers) LI. Synthesis and characterization of anisole terminated polyisobutylenes," Polymer Bulletin, 16, 47-53, 1982.
Morgan et al., "Thiol/ene photocurable polymers," J. Polym. Sci. Polym. Chem. Ed., 15, 627-645, 1977.
Nemes et al., "Oxyethylation and carbonation of telechelic polyisobutylene anions," Polymer Bulletin, 24, 187-194, 1990.
Nielsen et al., "Synthesis of isobutenyl-telechelic polyisobutylene by functionalization with isobutenyltrimethylsilane," Polymer, 38, 2529-2534, 1997.
Nuyken et al., "Novel sulfur containing polymers," Makromol. Chem. Macromol. Symp., 26, 313-331, 1989.
Nuyken et al., "Telechelics via addition of dithiols onto alkadienes, 1 Radical mechanism," Makromol. Chem. Rapid Comm., 11, 365-373, 1990.
Nuyken et al., "New telechelic polymers and sequential copolymers by polyfunctional initiator-transfer agents (Inifers) 9. A demonstration of chain extension of $\alpha,\omega$-polyisobutylene-diolefins with dithiols," Polymer Bulletin, 4, 61-65, 1981.
Odian, Principles of Polymerization, 4th ed., Wiley, Chapter 8, 2004.
Pernecker et al., "Living carbocationic polymerization, XLVI. Living isobutylene polymerization induced by the common ion effect," Polymer Bulletin, 26, 305-312, 1991.
Puskas et al., "Investigation of the effect of epoxide structure on the initiation efficiency in isobutylene polymerizations initiated by epoxide/$TiCl_4$ systems," Euro. Polymer Journal, 39: 2147-2153, 2003.
Puskas et al., "The nature of the double bond in low molecular weight polyisobutylenes and polybutene copolymers," J. Polymer Sci: Symp., 56, 191-202, 1976.
Rooney, "Synthesis of phenol-terminated polyisobuylene: Competitive chain transfer reactions," J. Appl. Poly. Sci., 25, 1365-1372, 1980.
Roth et al., "A novel method of the determination of propagation rate constants: Carbocationic oligomerization of isobutylene," Macromolecules, 29, 6104-6109, 1996.

(56) References Cited

OTHER PUBLICATIONS

Sawamoto et al., "End functionalized polymers by living cationic polymerization," Macromolecules, 20, 1-6, 1987.
Schriescheim et al., "Industrial Friedel-Crafts chemistry: Past and future," Chemtech, 310-314, 1978.
Serniuk et al., "Study of the reaction of buna rubbers of aliphatic mercaptans," J. Am. Chem. Soc., 70, 1804-1808, 1948.
Si et al., "Living carbocationic polymerization. Narrow molecular weight distribution polyisobutylenes prepared by esters and ketones as electron donors," Polymer Bulletin, 33, 651-6, 1994.
Simison et al., "End-quenching of quasiliving carbocationic isobutylene polymerization with hindered bases: Quantitative formation of exo-olefin-terminated Polyisobutylene", Macromolecules, 39, 2481-2487, 2006.
Sita et al., "Amidinate-based catalysts for stereoselective living ziegler-natta polymerizations," Abstracts of Papers of the American Chemical Society, 224, U502, 2002.
Stacey et al., Organic Reactions, 13, pp. 150-208 and 233-333, 1963.
Storey et al. "Mechanistic role of Lewis bases and other additives in quasiliving carbocationic polymerization of isobutylene," Macromolecules, 34, 5416-5432, 2001.
Storey et al., "N-Methylpyrrole-terminated polyisobutylene through end-quenching of quasiliving carbocationic polymerization," Macromolecules, 38, 4618-4624, 2005.
Ummadisetty et al., "Rapid communication: Quantitative syntheses of novel polyisobutylenes fitted with terminal primary—Br, -OH, -$NH_2$, and methacrylate termini," J. Poly. Sci. Part A: Poly. Chem., 46, 4236-4242, 2008.
Wallace et al., "Intelligent polymer systems," Encyclopedia of Polymer Science and Technology, 231-250, 2004.
Wollyung et al., "Intelligent Polymers Systems," J. Poly. Sci. Part A: Poly. Chem., 43, 946-958, 2005.
Zhang et al., "Synthesis of polyisobutylene with arylamino terminal group by combination of cationic polymerization with alkylation," Poly. Sci. Part A: Poly. Chem, 46, 936-946, 2008.
Zinger et al., "Timed release of chemicals from polypyrrole films," J. Am. Chem. Soc., 106, 6861-6863, 1984.
Notice of Allowance mailed May 11, 2005, U.S. Appl. No. 10/600,898.
Notice of Allowance mailed May 4, 2009, U.S. Appl. No. 11/186,157.
Final Action mailed Feb. 20, 2009, U.S. Appl. No. 11/186,157.
Office Action mailed Oct. 20, 2008, U.S. Appl. No. 11/186,157.
Office Action mailed Apr. 1, 2008, U.S. Appl. No. 11/186,157.
Notice of Allowance mailed Dec. 10, 2009, U.S. Appl. No. 11/207,264.
Notice of Allowance mailed Aug. 6, 2009, U.S. Appl. No. 11/207,264.
Office Action mailed Nov. 12, 2008, U.S. Appl. No. 11/207,264.
Notice of Allowance mailed Apr. 2, 2010, U.S. Appl. No. 11/207,366.
Notice of Allowance mailed Dec. 15, 2009, U.S. Appl. No. 11/207,366.
Notice of Allowance mailed Aug. 7, 2009, U.S. Appl. No. 11/207,366.
Office Action mailed Nov. 12, 2008, U.S. Appl. No. 11/207,366.
Notice of Allowance mailed Jun. 11, 2008, U.S. Appl. No. 11/207,377.
Final Action mailed Jan. 2, 2008, U.S. Appl. No. 11/207,377.
Office Action mailed Mar. 23, 2007, U.S. Appl. No. 11/207,377.
Notice of Allowance mailed Aug. 30, 2010, U.S. Appl. No. 11/356,490.
Notice of Allowance mailed Apr. 28, 2010, U.S. Appl. No. 11/356,490.
Office Action mailed Aug. 31, 2009, U.S. Appl. No. 11/356,490.
Office Action mailed Jan. 8, 2009, U.S. Appl. No. 11/356,490.
Notice of Allowance mailed Dec. 3, 2008, U.S. Appl. No. 11/356,491.
Office Action mailed May 13, 2008, U.S. Appl. No. 11/356,491.
Notice of Allowance mailed Apr. 15, 2011, U.S. Appl. No. 11/357,562.
Final Office Action mailed Apr. 2, 2010, U.S. Appl. No. 11/357,562.
Office Action mailed Aug. 7, 2009, U.S. Appl. No. 11/357,562.
Office Action mailed Dec. 5, 2008, U.S. Appl. No. 11/357,562.
Notice of Allowability mailed Dec. 14, 2012, U.S. Appl. No. 12/055,281.
Notice of Allowance mailed Nov. 8, 2012, U.S. Appl. No. 12/055,281.
Supplemental Final Office Action and Interview Summary mailed Apr. 29, 2011, U.S. Appl. No. 12/055,281.
Final Office Action mailed Jan. 21, 2011, U.S. Appl. No. 12/055,281.
Office Action mailed Jun. 11, 2010, U.S. Appl. No. 12/055,281.
Notice of Allowance mailed Jul. 8, 2011, U.S. Appl. No. 12/145,460.
Notice of Allowance mailed Mar. 22, 2011, U.S. Appl. No. 12/145,460.
Notice of Allowance mailed Sep. 10, 2012, U.S. Appl. No. 12/355,664.
Office Action mailed Jan. 19, 2012, U.S. Appl. No. 12/355,664.

\* cited by examiner

FUNCTIONALIZATION OF POLYOLEFINS WITH PHENOXY DERIVATIVES

1. CROSS REFERENCE TO RELATED APPLICATION(S)

This application is a divisional application of U.S. application Ser. No. 12/355,664, filed Jan. 16, 2009, now U.S. Pat. No. 8,344,073; the disclosure of which is incorporated herein by reference in its entirety.

2. FIELD

Provided herein are telechelic polymers and methods for producing the same.

3. BACKGROUND

Telechelic polymers, that is, polymers containing functional end groups, are useful intermediates in the preparation of high-performance polymer products. For example, such intermediates can be used in the production of fuel or lube oil additives, network polymers, star-branched polymers, and block copolymers. For example, polymers containing primary aliphatic hydroxyl end groups are very useful as reactive intermediates in polyurethane polymer synthesis. As a further example, polymers containing primary aliphatic halogen end groups are useful intermediates since the halogen group may be readily replaced by another group by reaction with a nucleophilic reagent. As yet a further example, polymers containing phenol end groups are useful in the synthesis of fuel and lubricating oil additives because, for example, they are readily reacted with formaldehyde and a polyamine to generate ashless dispersants. Thus, there is a need for telechelic polymers containing hydroxyl, halogen, phenol, etc. end groups, as well as methods of synthesizing the same.

4. SUMMARY

In some embodiments, provided herein are methods for preparing a telechelic polymer of formula I:

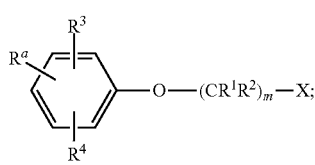

wherein $R^a$ is a polyolefin group;
$R^1$ and $R^2$ are each, independently in each $-(CR^1R^2)$ unit, H or alkyl;
and m is an integer from 0 to 20; wherein
if m is 0,
then $R^3$ and $R^4$ are each, independently, alkyl, and X is H;
if m is 1,
then $R^3$ and $R^4$ are each, independently H, alkyl, or alkoxy, and X is H, alkyl, alkenyl, alkynyl, alkaryl, aralkyl, aryl, heteroaryl, or

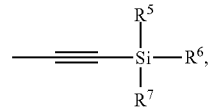

wherein $R^5$-$R^7$ are each, independently, alkyl or aryl;
if m is 2,
then $R^3$ and $R^4$ are each, independently H, alkyl, or alkoxy, and
X is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^8$, —C(O)O$R^9$, —C(O)N$R^{10}R^{11}$, or

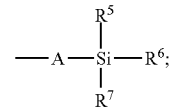

wherein A is ═══ or nothing,
$R^5$-$R^7$ are each, independently, alkyl, alkenyl, alkynyl, alkaryl, aralkyl, aryl, heteroaryl, alkoxy, hydroxy, —N$R^{10}R^{11}$, —F, —Cl, —Br, —I, or —At,
$R^8$ is alkyl, alkenyl, alkynyl, alkaryl, aryl, or heteroaryl, and $R^9$-$R^{11}$ are each, independently, H, alkyl, alkenyl, alkynyl, alkaryl, aryl, or heteroaryl,
or, when —O—$(CR^1R^2)_m$—X is ortho to $R^4$, then X and $R^4$,
together, with the atoms to which X and $R^4$ are attached, may form a ring;
and if m is 3-20,
then $R^3$ and $R^4$ are each, independently H, alkyl, or alkoxy, and
X is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)$R^8$, —C(O)O$R^9$, —C(O)N$R^{10}R^{11}$,

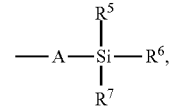

or —N$R^XR^Y$;
wherein
A is ═══ or nothing,
$R^X$ and $R^Y$ are each, independently, H, alkyl, alkenyl, alkynyl, cycloalkyl, aryl, heteroaryl, heterocyclyl, C(O)$R^Z$,
wherein $R^Z$ is H, alkyl, alkenyl, alkynyl, cycloalkyl, aryl, heteroaryl, heterocyclyl, —O$R^8$, or —N$R^{10}R^{11}$;
$R^5$-$R^7$ are each, independently, alkyl, alkenyl, alkynyl, alkaryl, aralkyl, aryl, heteroaryl, alkoxy, hydroxy, —N$R^{10}R^{11}$, —F, —Cl, —Br, —I, or —At, R$^8$ is alkyl, alkenyl, alkynyl, alkaryl, aryl, or heteroaryl, and R$^9$-R$^{11}$ are each, independently, H, alkyl, alkenyl, alkynyl, alkaryl, aryl, or heteroaryl; comprising:

(a) generating a quasiliving carbocationic polyolefin; and
(b) reacting the quasiliving carbocationic polyolefin from step (a) with one or more compounds of formula II in the presence of a Lewis acid or mixture of Lewis acids under quasiliving carbocationic polymerization conditions:

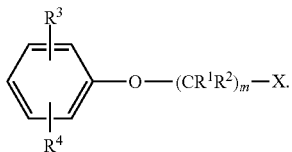

In some embodiments, provided herein are compounds of formula I

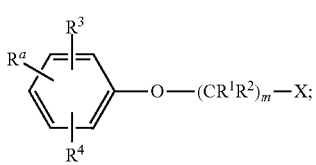

wherein:
R$^a$ is a polyolefin group;
R$^1$ and R$^2$ are each, independently in each —(CR$^1$R$^2$) unit, H or alkyl;
  wherein m is an integer from 0 to 20; wherein
  if m is 0,
    then R$^3$ and R$^4$ are each, independently, alkyl, and X is H;
  if m is 1 and at least one of R$^3$ and R$^4$ is not H,
    then R$^3$ and R$^4$ are each, independently H, alkyl, or alkoxy, and
    X is H, alkyl, alkenyl, alkynyl, alkaryl, aralkyl, aryl, heteroaryl or

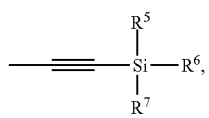

wherein R$^5$-R$^7$ are each, independently, alkyl or aryl;
if m is 1 and R$^3$ and R$^4$ are both H,
  then R$^3$ and R$^4$ are each, independently H, alkyl, or alkoxy, and
  X is alkyl, alkenyl, alkynyl, alkaryl, aralkyl, aryl, heteroaryl, or

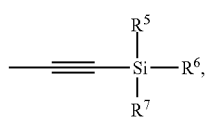

wherein R$^5$-R$^7$ are each, independently, alkyl or aryl;
if m is 2,
  then R$^3$ and R$^4$ are each, independently H, alkyl, or alkoxy, and
  X is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)R$^8$, —C(O)OR$^9$, —C(O)NR$^{10}$R$^{11}$,

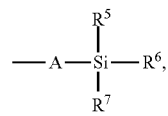

wherein
A is === or nothing,
R$^5$-R$^7$ are each, independently, alkyl, alkenyl, alkynyl, alkaryl, aralkyl, aryl, heteroaryl, alkoxy, or hydroxy,
R$^8$ is alkyl, alkenyl, alkynyl, alkaryl, aryl, or heteroaryl, and R$^9$-R$^{11}$ are each, independently, H, alkyl, alkenyl, alkynyl, alkaryl, aryl, or heteroaryl,
or, when —O—(CR$^1$R$^2$)$_m$—X is ortho to R$^4$, then X and R$^4$, together, with the atoms to which X and R$^4$ are attached, may form a ring;
and if m is 3-20,
  then R$^3$ and R$^4$ are each, independently H, alkyl, or alkoxy, and
  X is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)R$^8$, —C(O)OR$^9$, —C(O)NR$^{19}$R$^{11}$,

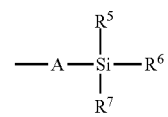

or —NR$^X$R$^Y$;
wherein
A is === or nothing,
R$^X$ and R$^Y$ are each, independently, H, alkyl, alkenyl, alkynyl, cycloalkyl, aryl, heteroaryl, heterocyclyl, C(O)R$^Z$,
  wherein R$^Z$ is H, alkyl, alkenyl, alkynyl, cycloalkyl, aryl, heteroaryl, heterocyclyl, —OR$^8$, or —NR$^{19}$R$^{11}$;
R$^5$-R$^7$ are each, independently, alkyl, alkenyl, alkynyl, alkaryl, aralkyl, aryl, heteroaryl, alkoxy, or hydroxy,
R$^8$ is alkyl, alkenyl, alkynyl, alkaryl, aryl, or heteroaryl, and
R$^9$-R$^{11}$ are each, independently, H, alkyl, alkenyl, alkynyl, alkaryl, aryl, or heteroaryl.

5. DETAILED DESCRIPTION

5.1 Definitions

Unless defined otherwise, all technical and scientific terms used herein have the same meaning as is commonly understood by one of ordinary skill in the art. In the event that there are a plurality of definitions for a term used herein, the definitions provided in this section prevail unless stated otherwise.

As used herein, "alkane" refers to a zero-valent hydrocarbon containing only single bonds. In some embodiments, the alkane contains a straight hydrocarbon chain. In some embodiments, the alkane contains a branched hydrocarbon chain. In some embodiments, the alkane is cyclic. In some embodiments, the alkane contains 1 to 10 carbons. In some embodiments, the alkane contains 1 to 8 carbons. In some embodiments, the alkane contains 1 to 6 carbons. In some embodiments, the alkane contains 1 to 3 carbons. In some embodiments, the alkane contains 1 to 2 carbons. In some embodiments, the alkane contains 5 to 6 carbons. In some embodiments, the alkane is pentane. In some embodiments, the alkane is hexane. In some embodiments, the alkane is substituted.

As used herein, "alkaryl" refers to a uni-valent aryl group substituted with at least one alkyl, alkenyl, or alkynyl group.

As used herein, "alkaryloxy" refers to a uni-valent group of formula —OR, wherein R is alkaryl.

As used herein, "alkenyl" refers to a uni-valent hydrocarbon chain or group of about 2 to about 20 carbons, wherein the chain or group contains one or more double bonds. In some embodiments, the alkenyl contains about 2 to about 15 carbons. In some embodiments, the alkenyl contains about 2 to about 10 carbons. In some embodiments, the alkenyl contains about 2 to about 8 carbons. In some embodiments, the alkenyl contains about 2 to about 6 carbons. In some embodiments, the alkenyl contains about 2 to about 3 carbons. In some embodiments, the alkenyl is an allyl group. In some embodiments, the alkenyl group contains one or more double bonds that are conjugated to another unsaturated group. In some embodiments, the alkenyl is substituted.

As used herein, "alkoxy" refers to —OR, wherein R is alkyl.

As used herein, "alkyl" refers to a uni-valent hydrocarbon chain or group of about 1 to about 20 carbons. In some embodiments, the alkyl contains about 1 to about 15 carbons. In some embodiments, the alkyl contains about 1 to about 10 carbons. In some embodiments, the alkyl contains about 1 to about 8 carbons. In some embodiments, the alkyl contains about 1 to about 6 carbons. In some embodiments, the alkyl contains about 1 to about 3 carbons. In some embodiments, the alkyl contains 1 to 2 carbons. In some embodiments, the alkyl is primary. In some embodiments, the alkyl is secondary. In some embodiments, the alkyl is tertiary. In some embodiments, the alkyl is methyl, ethyl, n-propyl, isopropyl, isobutyl, n-butyl, sec-butyl, tert-butyl, isopentyl, neopentyl, tert-pentyl, or isohexyl. In some embodiments, the alkyl is methyl, ethyl, n-propyl, or isopropyl. In some embodiments, the alkyl is methyl. In some embodiments, the alkyl is tert-butyl. In some embodiments, the alkyl is a straight hydrocarbon chain. In some embodiments, the alkyl is a branched hydrocarbon chain. In some embodiments, the alkyl is cyclic. In some embodiments, the alkyl is substituted.

As used herein, "alkynyl" refers to a uni-valent hydrocarbon chain or group of about 2 to about 20 carbons, wherein the chain contains one or more triple bonds. In some embodiments, the alkynyl contains about 2 to about 15 carbons. In some embodiments, the alkynyl contains about 2 to about 10 carbons. In some embodiments, the alkynyl contains about 2 to about 8 carbons. In some embodiments, the alkynyl contains about 2 to about 6 carbons. In some embodiments, the alkynyl contains about 2 to about 3 carbons. In some embodiments, the alkynyl is a propargyl group. In some embodiments, the alkynyl group contains one or more triple bonds that are conjugated to another unsaturated group. In some embodiments, the alkynyl is substituted.

As used herein, "amide" refers to a compound of the following formula:

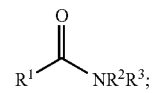

wherein $R^1$-$R^3$ are each, independently, hydrogen or optionally substituted hydrocarbyl. In some embodiments, $R^1$ is hydrogen. In some embodiments, $R^1$ is hydrocarbyl. In some embodiments, $R^2$ is hydrogen. In some embodiments, $R^2$ and $R^3$ are hydrocarbyl. In some embodiments, the amide is N,N-dimethylformamide.

As used herein, "aralkyl" refers to a uni-valent alkyl, alkenyl, or alkynyl group substituted with at least one aryl group.

As used herein, "aryl" refers to a uni-valent monocyclic or multicyclic aromatic group containing from 6 to about 30 carbons. In some embodiments, the aryl is monocyclic. In some embodiments, the aryl contains about 6 to about 15 carbons. In some embodiments, the aryl contains about 6 to about 10 carbons. In some embodiments, the aryl is fluorenyl, phenyl, or naphthyl. In some embodiments, the aryl is phenyl. In some embodiments, the aryl is substituted.

As used herein, "aryloxy" refers to a uni-valent group having the formula —OR, wherein R is aryl.

As used herein, "binifer" refers to an inifer that is capable of initiation and propagation at two separate sites of an inifer. In some embodiments, the initiation and propagation occur simultaneously or nearly simultaneously at the two sites.

As used herein, "carbocation terminated polyolefin" refers to a polyolefin containing at least one carbocation end group. Examples include, but are not limited to, compounds of the formula:

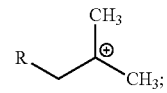

wherein R is a polyolefin group.

As used herein, "chain-end concentration" refers to the sum of the molar concentration of carbocationic end groups and dormant end groups. When a mono-functional initiator is used, the chain-end concentration is approximately equal to the initiator concentration. For a multi-functional initiator, when the functionality of the initiator equals x, then the chain end concentration is approximately equal to x times the initiator concentration.

As used herein, "common ion salt" refers to an ionic salt that is optionally added to a reaction performed under quasiliving carbocationic polymerization conditions to prevent dissociation of the propagating carbenium ion and counter-ion pairs.

As used herein, "common ion salt precursor" refers to an ionic salt that is optionally added to a reaction performed under quasiliving carbocationic polymerization conditions, wherein the ionic salt generates counter-anions that are identical to those of the propagating chain ends, via in situ reaction with a Lewis acid.

As used herein, "diluent" refers to a liquid diluting agent or compound. Diluents may be a single or a mixture of two or more compounds or agents. Diluents may completely dissolve or partially dissolve the reaction components.

As used herein, "electron donor" refers to a molecule that is capable of donating a pair of electrons to another molecule.

As used herein, "halo" refers to halogen. In some embodiments, halo is F, Cl, Br, or I. In some embodiments, halo is F. In some embodiments, halo is Cl. In some embodiments, halo is Br. In some embodiments, halo is I.

As used herein, "heteroaryl" refers to a uni-valent monocyclic or multicyclic aromatic ring system containing about 5 to about 15 ring atoms wherein at least one ring atom is a heteroatom. In some embodiments, the heteroaryl contains 5 to about 10 ring atoms. In some embodiments, the heteroaryl contains 5 or 6 ring atoms. In some embodiments, the heteroaryl is monocyclic. In some embodiments, the heteroatom is N, O, or S. In some embodiments, the heteroaryl contains one heteroatom. In some embodiments, the heteroaryl contains 1 to 3 N atoms. In some embodiments, the heteroaryl contains one O or S atom and one or two N atoms. In some embodiments, the heteroaryl is furyl, imidazolyl, pyrimidinyl, tetrazolyl, thienyl, pyridyl, pyrrolyl, thiazolyl, isothiazolyl, oxazolyl, isoxazolyl, thiazolyl, quinolinyl, or isoquinolinyl. In some embodiments, the heteroaryl is furyl. In some embodiments, the heteroaryl is substituted.

As used herein, "heteroaryloxy" refers to a uni-valent group of formula —OR, wherein R is heteroaryl.

As used herein, "hydrocarbyl" refers to a monovalent, linear, branched, or cyclic group which contains carbon and hydrogen atoms, and in certain embodiments, is substituted. In some embodiments, the hydrocarbyl is alkyl, alkenyl, alkynyl, aryl, alkaryl, or aralkyl, each optionally substituted. In some embodiments, the hydrocarbyl is substituted. In some embodiments, the hydrocarbyl is not substituted.

As used herein, "heterocyclyl" refers to a uni-valent monocyclic or multicyclic non-aromatic ring system containing about 3-30 ring atoms, wherein at least one ring atom is a heteroatom. In some embodiments, the heterocyclyl contains 5 to about 10 ring atoms. In some embodiments, the heterocyclyl contains 5 or 6 ring atoms. In some embodiments, the heteroatom is N, O, or S. In some embodiments, the heterocyclyl is monocyclic.

As used herein, "inifer" refers to a compound that acts as both an initiator and a chain transfer agent.

As used herein, "initiator" refers to a compound that provides a carbocation.

As used herein, "ionized polyolefin" refers to a polyolefin containing at least one carbenium ion. In some embodiments, the ionized polyolefin is a tert-halide terminated polyolefin that has been ionized into a cationic polyolefin. In some embodiments, the ionized polyolefin is a quasiliving carbocationic polyolefin. In some embodiments, the ionized polyolefin is a vinylidene-terminated polyolefin that has been ionized into an ionized polyolefin or quasiliving polyolefin. In some embodiments, the ionized polyolefin is a polyolefin containing an olefin that has been ionized into a quasiliving carbocationic polyolefin or a cationic polyolefin. In some embodiments, the ionized polyolefin is derived from an inifer.

As used herein, "Lewis acid" refers to a chemical entity that is capable of accepting a pair of electrons.

As used herein, "mono-functional initiator" refers to an initiator that provides approximately one stoichiometric equivalent of carbocation relative to initiator. When a mono-functional initiator is used, the chain-end concentration is approximately equal to the initiator concentration.

As used herein, "monomer" refers to an olefin that is capable of combining with a carbocation to form another carbocation.

As used herein, "multi-functional initiator" refers to an initiator that provides approximately x stoichiometric equivalents of carbocation relative to initiator, wherein x represents the functionality of the initiator. When a multi-functional initiator is used, when the functionality of the initiator equals x, then the chain-end concentration equals x times the initiator concentration. In some embodiments, x is 2, and the initiator is a bi-functional initiator.

As used herein, "nitroalkane" refers to $RNO_2$, wherein R is hydrocarbyl. In some embodiments, R is alkyl.

As used herein, "polyfunctional carbocationic initiator residue" refers to a polyvalent, i.e., divalent or greater, radical of formula $(-CR_aR_b)_rR_c$, wherein $R_a$ and $R_b$ are each independently hydrogen, alkyl, aryl, alkaryl, or aralkyl, provided that at least one of $R_a$ and $R_b$ is not hydrogen, and $R_c$ is an aliphatic or aromatic univalent or polyvalent radical with valence r, wherein r is an integer from 1 to 4. In some embodiments, $R_c$ is hydrocarbyl. In some embodiments, $R_c$ is aryl. In some embodiments, $R_c$ is alkyl. In some embodiments, $R_c$ is phenyl. In some embodiments, r is 1. In some embodiments, r is 2. In some embodiments, r is 3. In some embodiments, r is 4. In some embodiments, the polyfunctional carbocationic initiator residue is derived from an initiator described herein.

As used herein, "polyisobutyl group" refers to a monovalent polyolefin group comprising at least 2 isobutylene monomer units. In some embodiments, the polyisobutyl group is

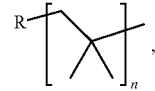

wherein R is H or alkyl of 1 to about 10 carbons, and n is an integer from about 10 to about 2000. In further embodiments, n is about 10 to about 1000. In further embodiments, n is about 10 to about 500. In further embodiments, n is about 10 to about 250. In further embodiments, n is about 10 to about 100. In further embodiments, n is about 10 to about 50.

As used herein, "polyisobutylene group" refers to a divalent polyolefin group comprising at least 2 isobutylene monomer units. In some embodiments, the polyisobutylene group is

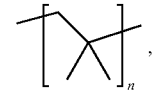

wherein n is an integer from about 10 to about 2000. In further embodiments, n is about 10 to about 1000. In further embodiments, n is about 10 to about 500. In further embodiments, n is about 10 to about 250. In further embodiments, n is about 10 to about 100. In further embodiments, n is about 10 to about 50.

As used herein, "polyolefin" refers to a polymer that comprises at least two olefin monomer units. In some embodiments, the polyolefin has a molecular weight from about 300 to in excess of a million g/mol. In some embodiments, the polyolefin has a molecular weight of from about 200 to 10,000 g/mol. In some embodiments, the polyolefin has a molecular weight of from about 100,000 to 1,000,000 g/mol. In some embodiments, the polyolefin has a molecular weight greater than 200 g/mol. In some embodiments, the polyolefin has a molecular weight greater than 400 g/mol. In some embodiments, the polyolefin has a molecular weight greater than 600 g/mol. In some embodiments, the polyolefin has a molecular weight greater than 800 g/mol. In some embodiments, the polyolefin has a molecular weight greater than 1000 g/mol. In some embodiments, the polyolefin has a molecular weight greater than 5000 g/mol. In some embodiments, the polyolefin has a molecular weight greater than 10,000 g/mol. In some embodiments, the polyolefin has a molecular weight greater than 100,000 g/mol. In some embodiments, the polyolefin has a molecular weight greater than 500,000 g/mol. In some embodiments, the polyolefin has a molecular weight greater than 1,000,000 g/mol. In some embodiments, the polyolefin is derived from a mono-functional initiator, bi-functional initiator, or multi-functional initiator. In some embodiments, the polyolefin is polyisobutylene.

As used herein, "polyolefin group" refers to a polyolefin substituent. In some embodiments, the polyolefin group is a polyisobutyl group or a polyisobutylene group.

As used herein, "quasiliving carbocationic polyolefin" refers to a carbocationic polyolefin that has been formed under quasiliving carbocationic polymerization conditions.

As used herein, "quasiliving carbocationic polymerization conditions" refers to conditions that allow for quasiliving polymerizations, which are polymerizations that proceed with minimal irreversible chain termination and minimal chain transfer. Quasiliving polymerizations proceed by initiation followed by propagation, wherein propagating (active) species are in equilibrium with non-propagating (dormant) polymer chains.

As used herein, "substituted" refers to the presence of one or more substituents. In some embodiments, only one substituent is present.

As used herein, "telechelic polymer" refers to a polyolefin having a functionalized endgroup.

As used herein, "tert-halide terminated polyolefin" refers to a polyolefin that contains at least one tertiary halide end group. In some embodiments, the tert-halide terminated polyolefin has the following formula:

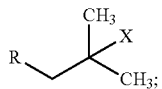

wherein R is a polyolefin group and X is halo. In some embodiments, the tert-halide terminated polyolefin has the following formula:

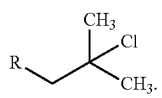

As used herein, "trinifer" refers to an inifer that is capable of initiation and propagation at three separate sites of an inifer. In some embodiments, the initiation and propagation occur simultaneously or nearly simultaneously at the three sites.

5.2 Methods 5.2.1 Methods of Preparing Telechelic Polymers

In some embodiments, provided herein are methods for preparing a telechelic polymer of formula I:

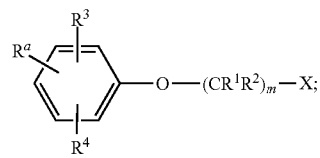

wherein $R^a$ is a polyolefin group;
$R^1$ and $R^2$ are each, independently in each $-(CR^1R^2)$ unit, H or alkyl;
and m is an integer from 0 to 20; wherein
if m is 0,
then $R^3$ and $R^4$ are each, independently, alkyl, and X is H;
if m is 1,
then $R^3$ and $R^4$ are each, independently H, alkyl, or alkoxy, and
X is H, alkyl, alkenyl, alkynyl, alkaryl, aralkyl, aryl, heteroaryl,
or

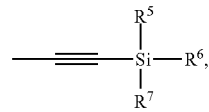

wherein $R^5$-$R^7$ are each, independently, alkyl or aryl;
if m is 2,
then $R^3$ and $R^4$ are each, independently H, alkyl, or alkoxy, and
X is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^8$, —C(O)O$R^9$, —C(O)N$R^{10}R^{11}$, or

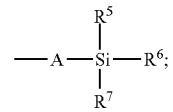

wherein A is —≡— or nothing,
$R^5$-$R^7$ are each, independently, alkyl, alkenyl, alkynyl, alkaryl, aralkyl, aryl, heteroaryl, alkoxy, hydroxy, —N$R^{10}R^{11}$, —F, —Cl, —Br, —I, or —At,
$R^8$ is alkyl, alkenyl, alkynyl, alkaryl, aryl, or heteroaryl, and $R^9$-$R^{11}$ are each, independently, H, alkyl, alkenyl, alkynyl, alkaryl, aryl, or heteroaryl, or, when —O—(CR$^1$R$^2$)$_m$—X is ortho to R$^4$, then X and R$^4$, together, with the atoms to which X and R$^4$ are attached, may form a ring;

and if m is 3-20,
then R$^3$ and R$^4$ are each, independently H, alkyl, or alkoxy, and
X is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)R$^8$, —C(O)OR$^9$, —C(O)NR$^{10}$R$^{11}$,

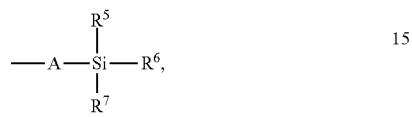

or —NR$^X$R$^Y$;
wherein A is ══ or nothing,
R$^X$ and R$^Y$ are each, independently, H, alkyl, alkenyl, alkynyl, cycloalkyl, aryl, heteroaryl, heterocyclyl, C(O)R$^Z$,
wherein R$^Z$ is H, alkyl, alkenyl, alkynyl, cycloalkyl, aryl, heteroaryl, heterocyclyl, —OR$^8$, or —NR$^{10}$R$^{11}$;
R$^5$-R$^7$ are each, independently, alkyl, alkenyl, alkynyl, alkaryl, aralkyl, aryl, heteroaryl, alkoxy, hydroxy, —NR$^{10}$R$^{11}$, —F, —Cl, —Br, —I, or —At,
R$^8$ is alkyl, alkenyl, alkynyl, alkaryl, aryl, or heteroaryl, and R$^9$-R$^{11}$ are each, independently, H, alkyl, alkenyl, alkynyl, alkaryl, aryl, or heteroaryl; comprising:

(a) generating a quasiliving carbocationic polyolefin; and
(b) reacting the quasiliving carbocationic polyolefin from step (a) with one or more compounds of formula II in the presence of a Lewis acid or mixture of Lewis acids under quasiliving carbocationic polymerization conditions:

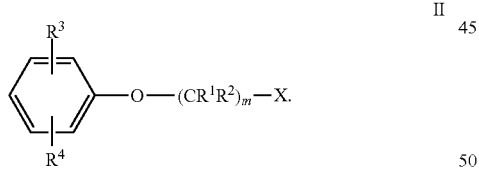
II

In some embodiments, provided herein are methods for preparing a telechelic polymer of formula I:

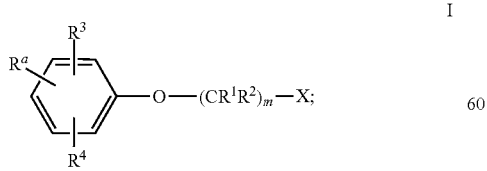
I wherein R$^a$ is a polyolefin group;
R$^1$ and R$^2$ are each, independently in each —(CR$^1$R$^2$) unit, H or alkyl;

and m is an integer from 0 to 20; wherein
if m is 0,
then R$^3$ and R$^4$ are each, independently, alkyl, and X is H;
if m is 1,
then R$^3$ and R$^4$ are each, independently H, alkyl, or alkoxy, and
X is H, alkyl, alkenyl, alkynyl, alkaryl, aralkyl, aryl, heteroaryl,
or

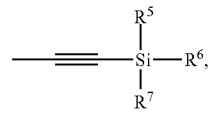

wherein R$^5$-R$^7$ are each, independently, alkyl or aryl;
if m is 2 or 3,
then R$^3$ and R$^4$ are each, independently H, alkyl, or alkoxy, and
X is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)R$^8$, —C(O)OR$^9$, —C(O)NR$^{10}$R$^{11}$,

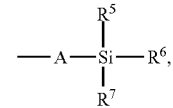

wherein A is ══ or nothing,
R$^5$-R$^7$ are each, independently, alkyl, alkenyl, alkynyl, alkaryl, aralkyl, aryl, heteroaryl, alkoxy, hydroxy, —NR$^{10}$R$^{11}$, —F, —Cl, —Br, —I, or —At,
R$^8$ is alkyl, alkenyl, alkynyl, alkaryl, aryl, or heteroaryl, and R$^9$-R$^{11}$ are each, independently, H, alkyl, alkenyl, alkynyl, alkaryl, aryl, or heteroaryl;
or, when —O—(CR$^1$R$^2$)$_m$—X is ortho to R$^4$, then X and R$^4$, together, with the atoms to which X and R$^4$ are attached, may form a ring;
and if m is 4-20,
then R$^3$ and R$^4$ are each, independently H, alkyl, or alkoxy, and
X is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)R$^8$, —C(O)OR$^9$, —C(O)NR$^{10}$R$^{11}$,

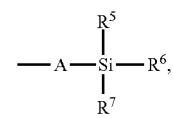

or —NR$^X$R$^Y$;
wherein A is ══ or nothing,
R$^X$ and R$^Y$ are each, independently, H, alkyl, alkenyl, alkynyl, cycloalkyl, aryl, heteroaryl, heterocyclyl, C(O)R$^Z$, wherein $R^z$ is H, alkyl, alkenyl, alkynyl, cycloalkyl, aryl, heteroaryl, heterocyclyl, —$OR^8$, or —$NR^{10}R^{11}$;

$R^5$-$R^7$ are each, independently, alkyl, alkenyl, alkynyl, alkaryl, aralkyl, aryl, heteroaryl, alkoxy, hydroxy, —$NR^{10}R^{11}$, —F, —Cl, —Br, —I, or —At, $R^8$ is alkyl, alkenyl, alkynyl, alkaryl, aryl, or heteroaryl, and $R^9$-$R^{11}$ are each, independently, H, alkyl, alkenyl, alkynyl, alkaryl, aryl, or heteroaryl; comprising (a) generating a quasiliving carbocationic polyolefin; and (b) reacting the quasiliving carbocationic polyolefin from step (a) with one or more compounds of formula II in the presence of a Lewis acid or mixture of Lewis acids under quasiliving carbocationic polymerization conditions:

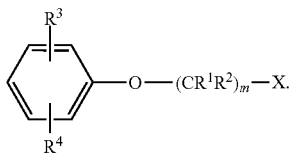

II

In further embodiments, $R^a$ is a polyisobutyl group. In even further embodiments, the polyisobutyl group is

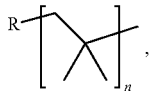

wherein R is H or alkyl of 1 to about 10 carbons, and n is an integer from about 10 to about 2000. In one embodiment, n is about 10 to about 1000. In one embodiment, n is about 10 to about 500. In one embodiment, n is about 10 to about 250. In one embodiment, n is about 10 to about 100. In one embodiment, n is about 10 to about 50.

In further embodiments, the compound of formula I is

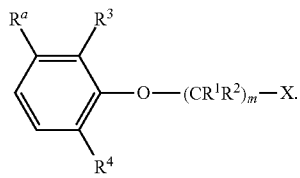

In further embodiments, the compound of formula I is

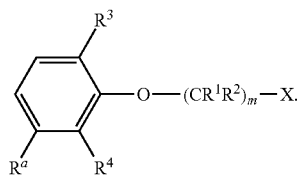

In further embodiments, the compound of formula I is

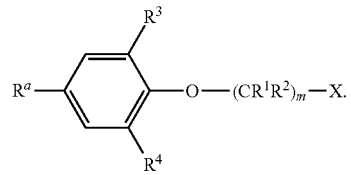

In further embodiments, the compound of formula I is:

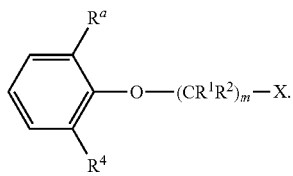

In further embodiments, the method is performed in the presence of a mono-functional, bi-functional, or multi-functional initiator.

In further embodiments, the compound of formula I is

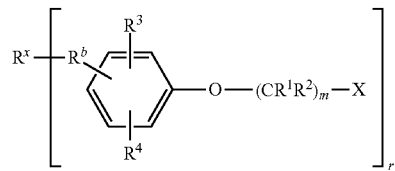

wherein $R^b$ is a polyisobutylene group;
$R^x$ is a polyfunctional carbocationic initiator residue;
and r is an integer from 1 to 4.

In even further embodiments, m is 4-20. In even further embodiments, m is 6-20. In even further embodiments, r is 1. In even further embodiments, r is 2. In even further embodiments, r is 3. In even further embodiments, r is 4.

In some embodiments, the compound of formula I is

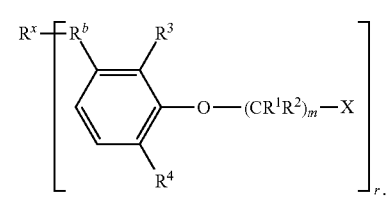

In some embodiments, the compound of formula I is

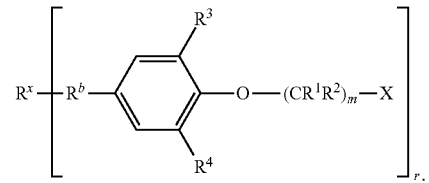

In some embodiments, the compound of formula I is
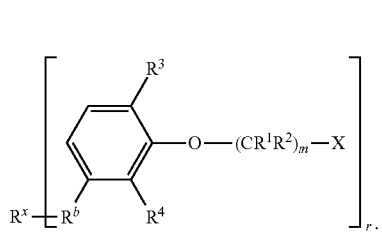
In some embodiments, the compound of formula I is
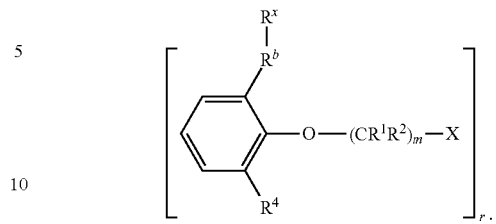
In some embodiments, the compound of formula I is
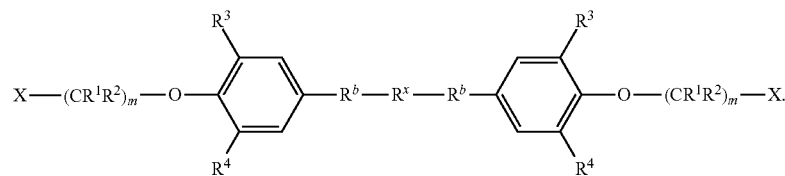
In some embodiments, the compound of formula I is
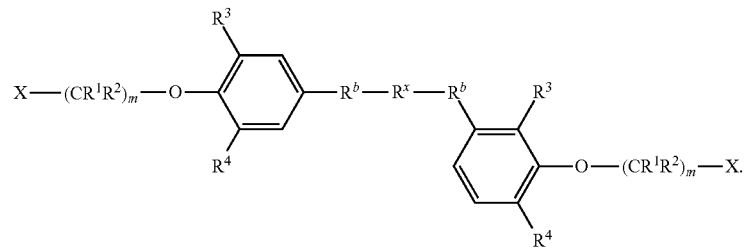
In some embodiments, the compound of formula I is
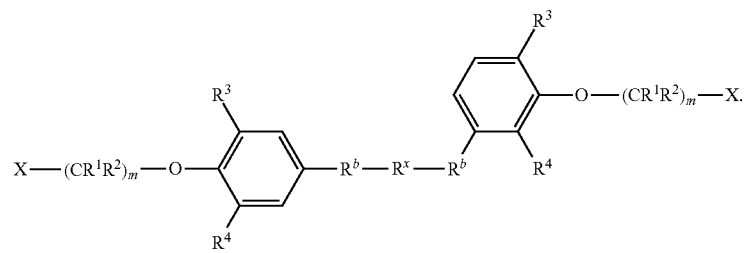
In some embodiments, the compound of formula I is
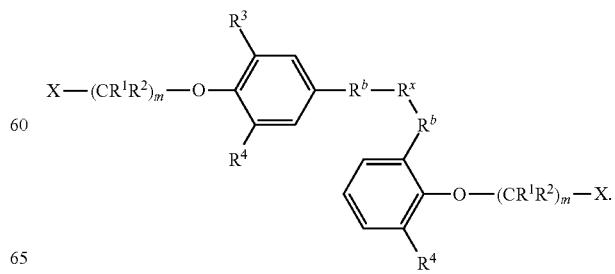

In some embodiments, the compound of formula I is

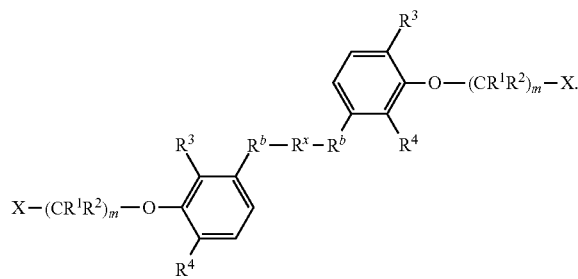

In some embodiments, the compound of formula I is

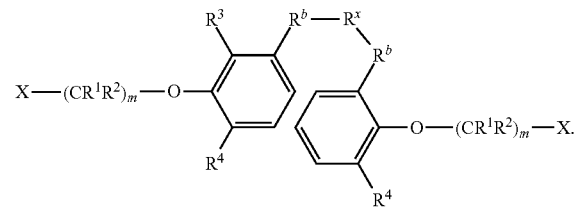

In some embodiments, the compound of formula I is

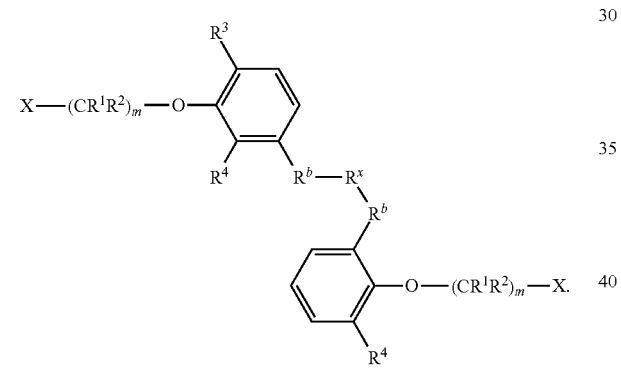

In further embodiments, the compound of formula I is

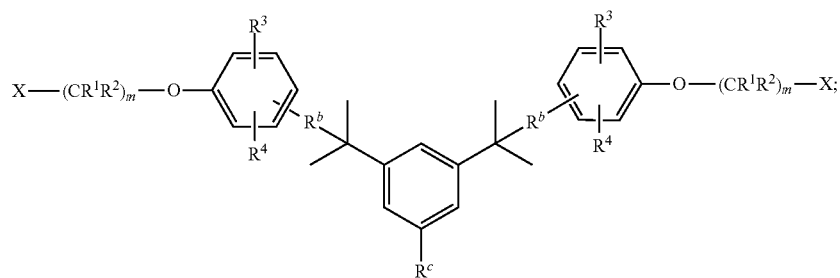

wherein $R^b$ is a polyisobutylene group;
and $R^C$ is H or alkyl.

In even further embodiments, $R^b$ is

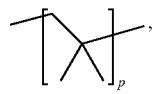

wherein p is an integer from about 10 to about 2000. In further embodiments, p is about 10 to about 1000. In further embodiments, p is about 10 to about 500. In further embodiments, p is about 10 to about 250. In further embodiments, p is about 10 to about 10 to about 100. In further embodiments, p is 10 to about 50.

In even further embodiments, $R^C$ is alkyl of 1 to about 10 carbons. In one embodiment, $R^C$ is alkyl of 1 to about 6 carbons. In one embodiment, $R^C$ is alkyl of 1 to about 4 carbons. In one embodiment, $R^C$ is tert-butyl.

In even further embodiments, the compound of formula I is

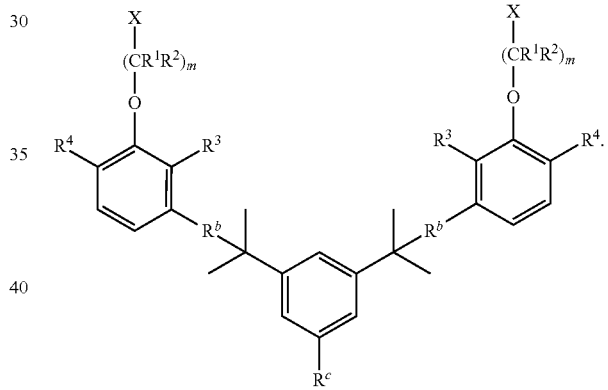

In even further embodiments, the compound of formula I is
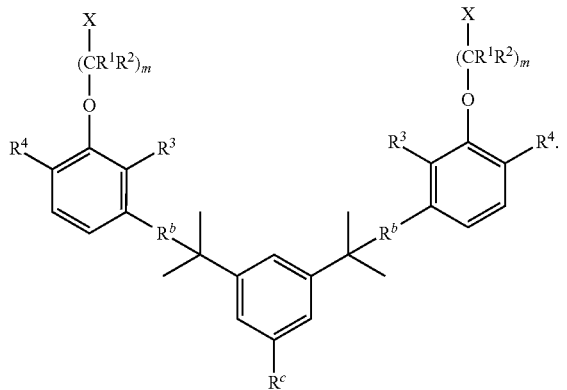
In even further embodiments, the compound of formula I is
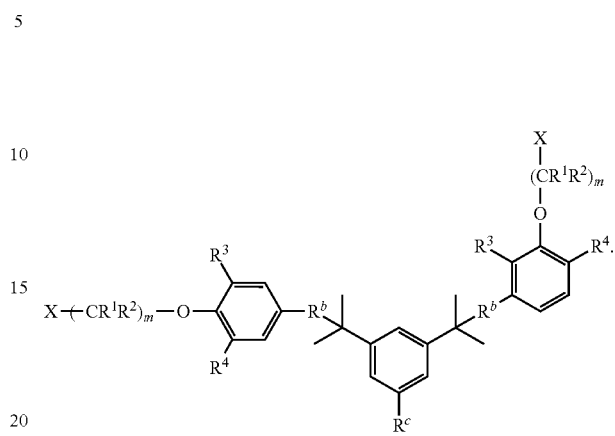
In even further embodiments, the compound of formula I is
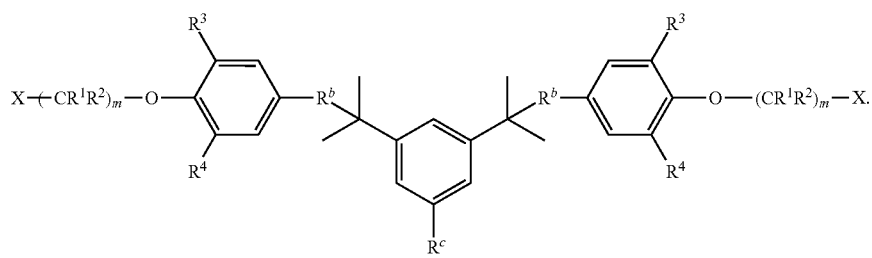
In even further embodiments, the compound of formula I is
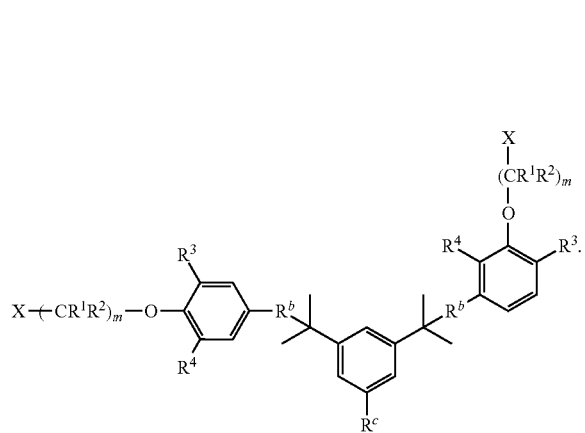
In even further embodiments, the compound of formula I is
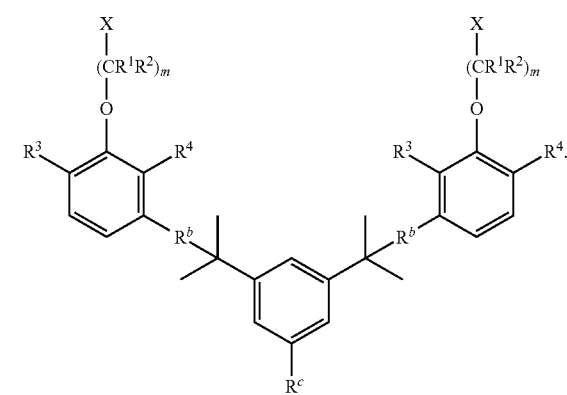

In even further embodiments, the compound of formula I is
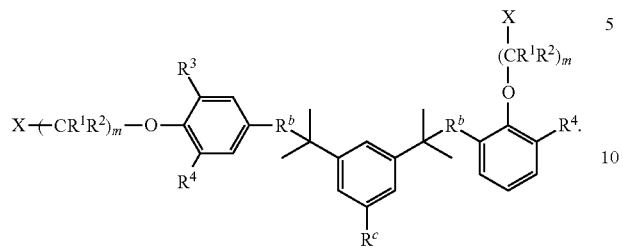
In even further embodiments, the compound of formula I is
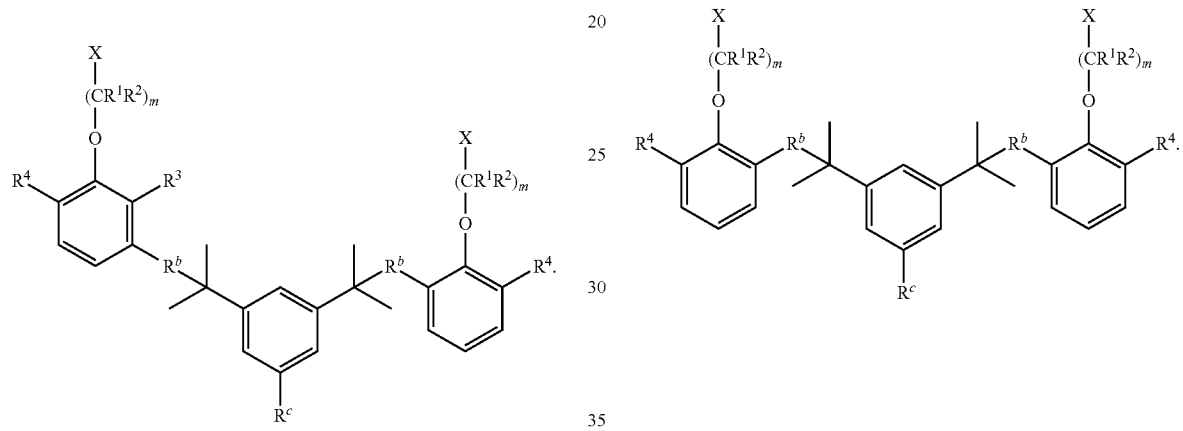
In even further embodiments, the compound of formula I is
In even further embodiments, the compound of formula I is
In some embodiments, the compound of formula I is
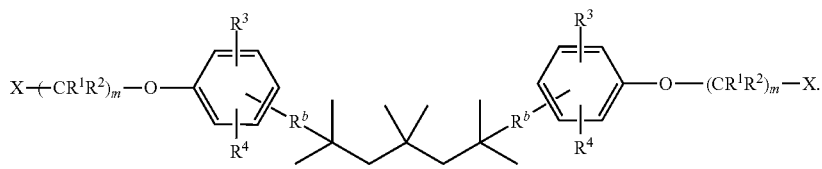
In some embodiments, the compound of formula I is
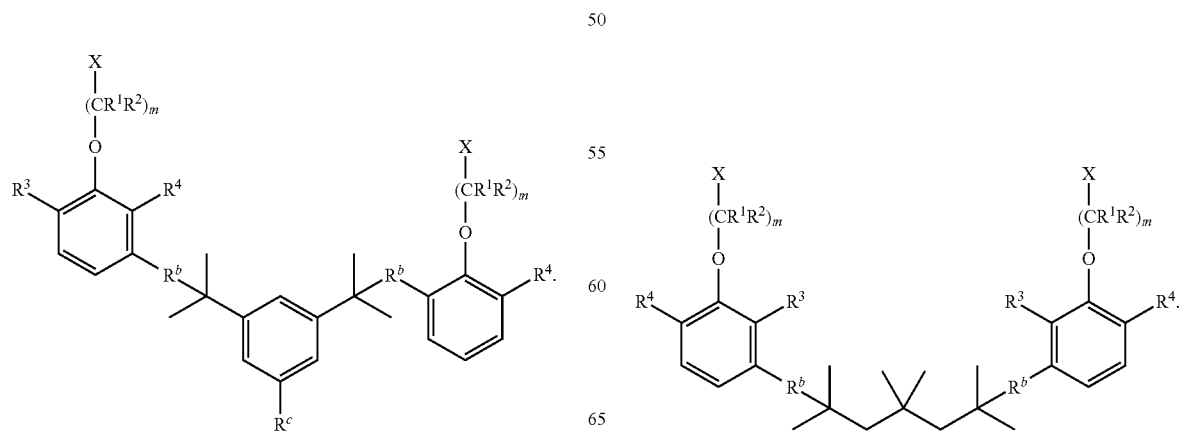

In some embodiments, the compound of formula I is
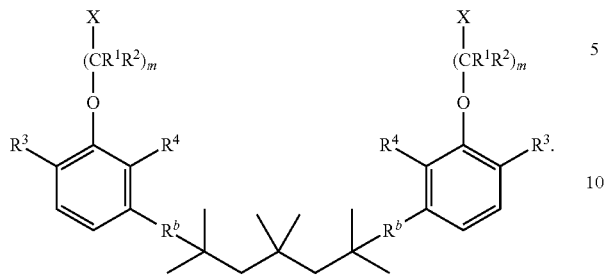
In some embodiments, the compound of formula I is
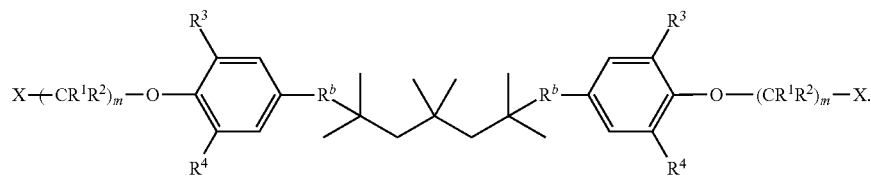
In some embodiments, the compound of formula I is
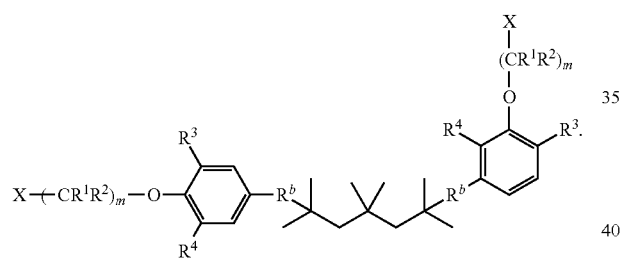
In some embodiments, the compound of formula I is
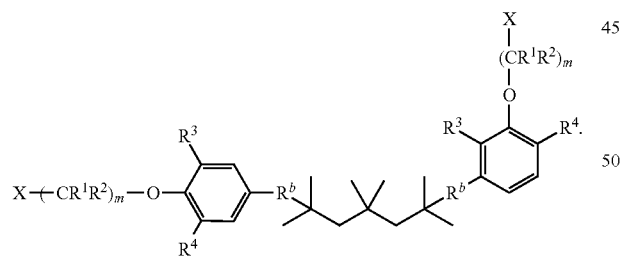
In some embodiments, the compound of formula I is
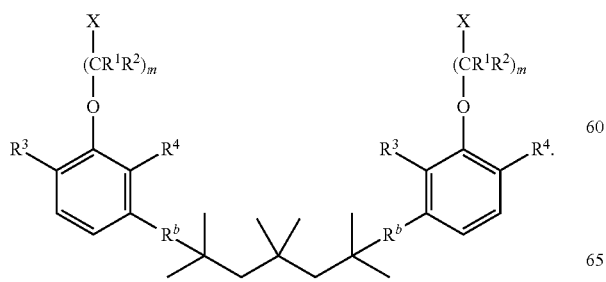

In some embodiments, the compound of formula I is
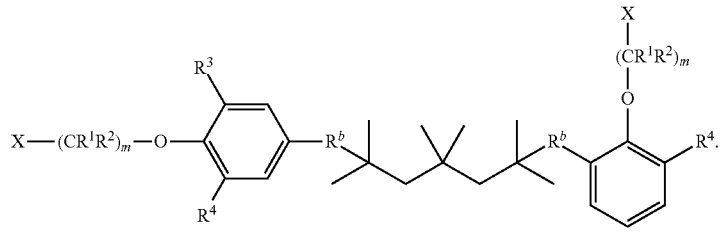
In some embodiments, the compound of formula I is
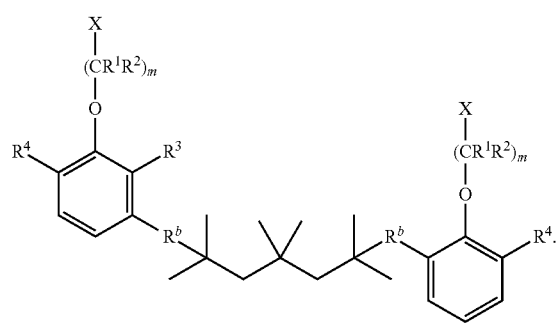
In some embodiments, the compound of formula I is
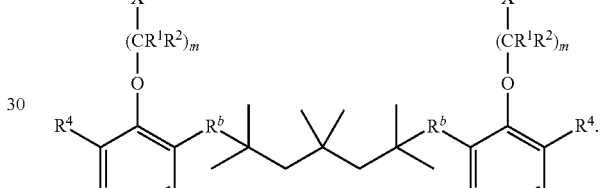
In some embodiments, the compound of formula I is
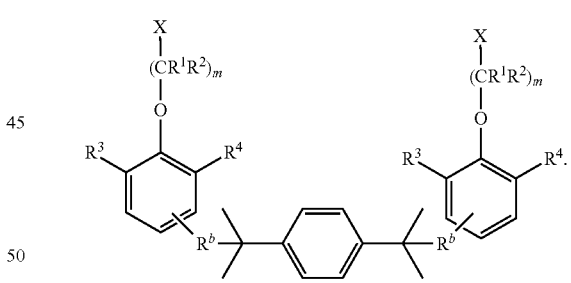
In some embodiments, the compound of formula I is
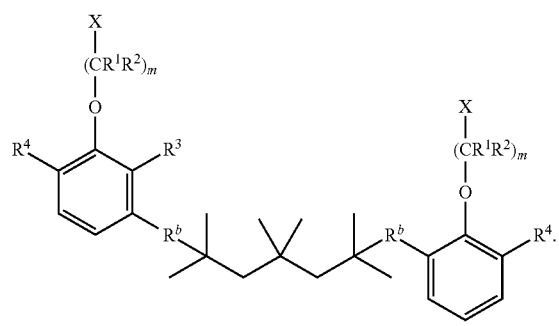
In some embodiments, the compound of formula I is
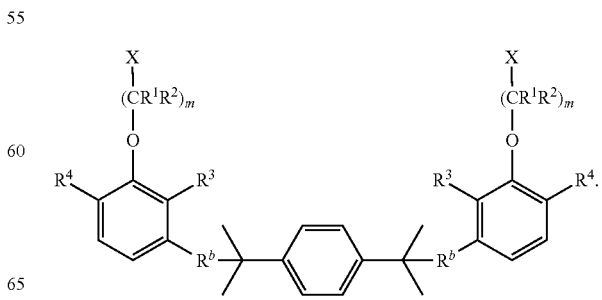

In some embodiments, the compound of formula I is
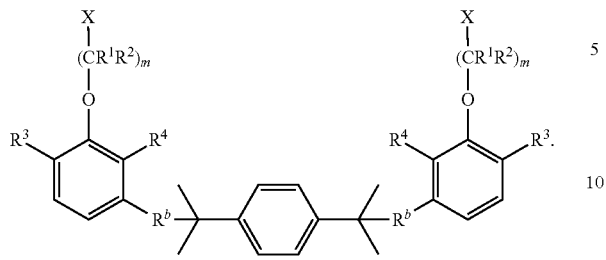
In some embodiments, the compound of formula I is
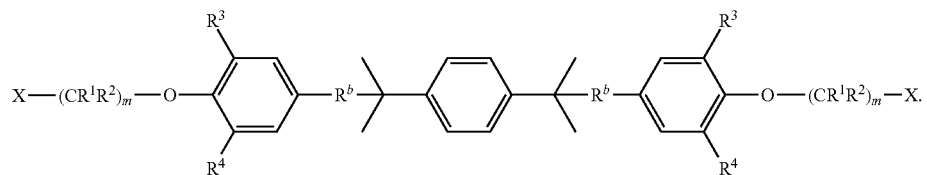
In some embodiments, the compound of formula I is
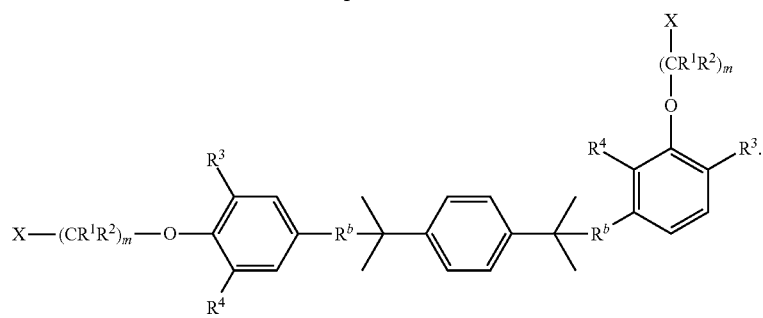
In some embodiments, the compound of formula I is
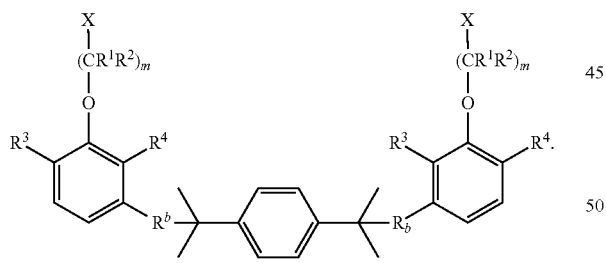
In some embodiments, the compound of formula I is
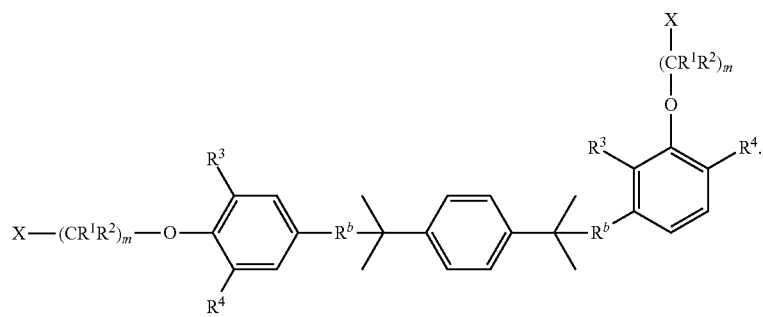

In some embodiments, the compound of formula I is
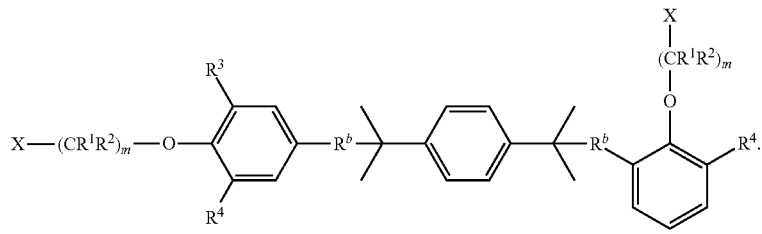
In some embodiments, the compound of formula I is
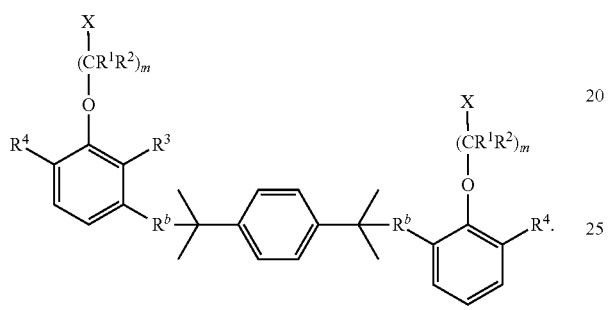
In some embodiments, the compound of formula I is
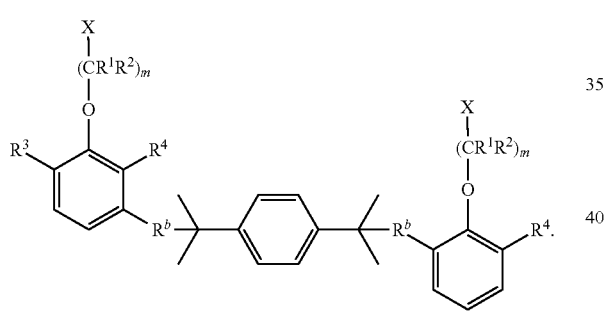
In some embodiments, the compound of formula I is
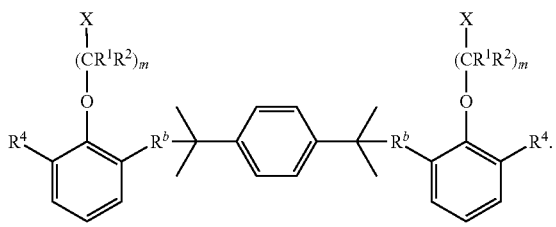
In some embodiments, the compound of formula I is
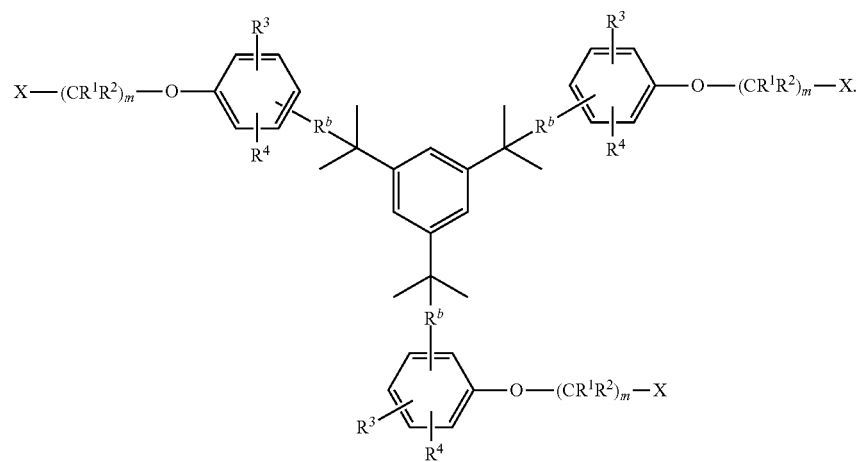

In some embodiments, the compound of formula I is

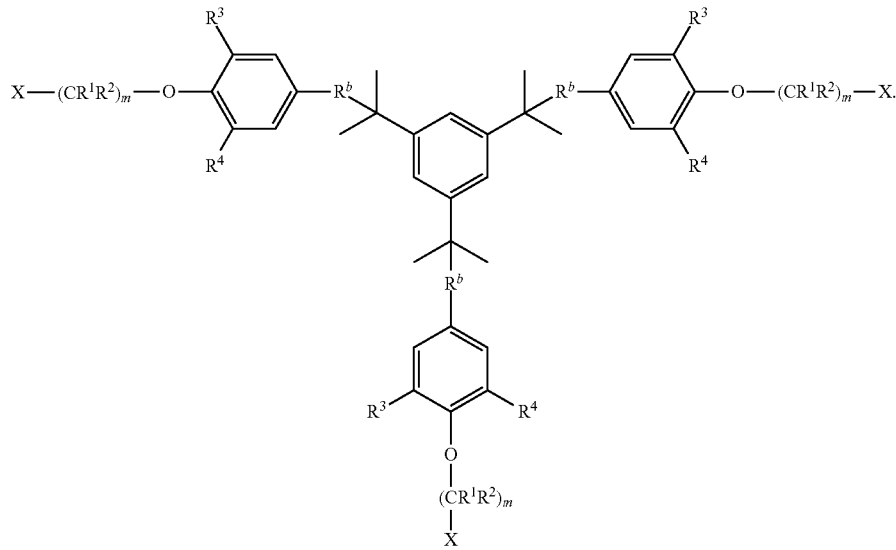

In some embodiments for the compounds of formula I or II, $R^1$ and $R^2$ are both H.

In some embodiments, $R^1$ and $R^2$ are each, independently in each —$(CR^1R^2)$— unit, alkyl of 1 to about 6 carbons or hydrogen.

In some embodiments, $R^1$ and $R^2$ are each, independently in each —$(CR^1R^2)$— unit, methyl or hydrogen.

In some embodiments, $R^3$ and $R^4$ are identical.

In some embodiments, m is 1-20 and $R^3$ and $R^4$ are hydrogen.

In some embodiments, m is 1-20 and $R^3$ and $R^4$ are each, independently, alkoxy of 1 to about 6 carbons.

In some embodiments, m is 1-20 and $R^3$ and $R^4$ are each, independently, alkoxy of 1 to about 3 carbons.

In some embodiments, m is 1-20 and $R^3$ and $R^4$ are each, independently, alkyl of 1 to about 6 carbons or alkoxy of 1 to about 6 carbons.

In some embodiments, $R^3$ and $R^4$ are each, independently, alkyl of 1 to about 6 carbons. In some embodiments, $R^3$ and $R^4$ are each, independently, alkyl of 1 to about 3 carbons.

In some embodiments, m is 1-20, and $R^3$ and $R^4$ are each, independently, H, alkyl of 1 to about 6 carbons, or alkoxy of 1 to about 6 carbons.

In some embodiments, m is 1-20, and $R^3$ and $R^4$ are each, independently, H, alkyl of 1 to about 3 carbons, or alkoxy of 1 to about 3 carbons.

In some embodiments, $R^3$ and $R^4$ are each, independently, tert-butyl.

In some embodiments, m is 0.
In some embodiments, m is 1.
In some embodiments, m is 2.
In some embodiments, m is 2 or 3.
In some embodiments, m is 3-20.
In some embodiments, m is 4-20.
In some embodiments, m is 0-10.
In some embodiments, m is 0-3.
In some embodiments, m is 0 and $R^3$ and $R^4$ are alkyl of 1 to about 6 carbons.
In some embodiments, m is 0 and $R^3$ and $R^4$ are alkyl of 1 to about 3 carbons.
In some embodiments, m is 1 and X is H, alkyl, or alkenyl.

In some embodiments, m is 1 and X is H, alkyl of 1 to about 6 carbons or alkenyl of 2 to about 6 carbons.

In some embodiments, m is 1 and X is H.
In some embodiments, m is 1 and X is

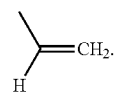

In some embodiments, m is 1 and X is methyl. In some embodiments, m is 1 and X is

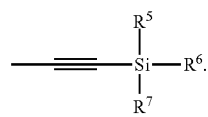

In even further embodiments, at least one of $R^5$-$R^7$ is tert-butyl. In even further embodiments, at least one of $R^5$-$R^7$ is phenyl. In even further embodiments, $R^5$ and $R^6$ are phenyl and $R^7$ is tert-butyl.

In some embodiments, m is 3-20 and X is H, alkyl, alkenyl, alkynyl, alkaryl, aralkyl, aryl, heteroaryl, alkoxy, —OH, —F, —Cl, —Br, —I, —At, —CN, —NC, —NCO, —OCN, —NCS, —SCN, —OC(O)$R^8$, —C(O)O$R^9$, —C(O)N$R^{10}R^{11}$, or

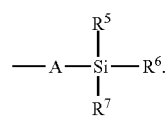

In some embodiments, m is 3-20 and X is H, alkyl, alkenyl, alkynyl, alkaryl, aralkyl, heteroaryl, alkoxy, —OH, —F, —Cl, —Br, —I, —At, —CN, —NC, —NCO, —OCN, —NCS, —SCN, —OC(O)$R^8$, —C(O)O$R^9$, —C(O)N$R^{10}R^{11}$, or

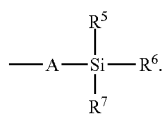

In some embodiments, m is 4-20 and X is H, alkyl, alkenyl, alkynyl, alkaryl, aralkyl, aryl, heteroaryl, alkoxy, —OH, —F, —Cl, —Br, —I, —At, —CN, —NC, —NCO, —OCN, —NCS, —SCN, —OC(O)R$^8$, —C(O)OR$^9$, —C(O)NR$^{10}$R$^{11}$, or

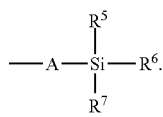

In some embodiments, m is 4-20 and X is H, alkyl, alkenyl, alkynyl, alkaryl, aralkyl, heteroaryl, alkoxy, —OH, —F, —Cl, —Br, —I, —At, —CN, —NC, —NCO, —OCN, —NCS, —SCN, —OC(O)R$^8$, —C(O)OR$^9$, —C(O)NR$^{10}$R$^{11}$, or

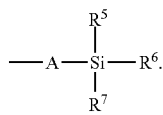

In some embodiments, R$^5$-R$^8$ are each, independently, alkyl, aryl, or halo. In some embodiments, R$^5$-R$^8$ are each, independently, tert-butyl, methyl, phenyl, or chloro.

In some embodiments, m is 2-20 and X is H, alkyl of 1 to about 6 carbons, alkenyl of 2 to about 6 carbons, F, Cl, Br, or I.

In some embodiments, m is 2-5 and X is H, alkyl of 1 to about 6 carbons, alkenyl of 2 to about 6 carbons, F, Cl, Br, or I.

In some embodiments, m is 2-20 and X is Cl or Br.

In some embodiments, m is 2-5 and X is Cl or Br.

In some embodiments, m is 3 to 20 and X is OH. In some embodiments, m is 4 to 20 and X is OH. In some embodiments, m is 6-20 and X is OH. In some embodiments, m is 4 to 11 and X is OH.

Without being bound or limited to any theory, in some embodiments, when m is 4 to 20 and X is OH for the compounds of formula I, these compounds form titanates upon contact with a titanium tetrahalide. Without being bound or limited to any theory, in some embodiments, these titanates are the quenching species. Without being bound or limited to any theory, in some embodiments, the titanate is a compound of the following formula:

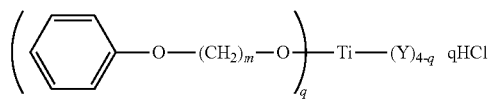

wherein m is an integer from 4-20, q is an integer from 1-4, and Y is halo. Without being bound or limited to any theory, in some embodiments, limited solubility of the titanate for low values of m may be overcome by formulation of the polymerization medium or by replacing the halide ligands with alkyl ligands. In some embodiments, the titanate may be formed in a separate reaction and subsequently added to the polymerization. In some embodiments, other phenoxy alkyl metal oxides are used. In some embodiments, the titanium is replaced with aluminum or boron.

In some embodiments, R$^8$-R$^{11}$ are each, independently, alkyl of 1 to about 6 carbons.

In some embodiments, R$^8$-R$^{11}$ are each, independently, alkyl of 1 to about 3 carbons.

In some embodiments, m is 2; R$^1$ and R$^2$ are H; —O—(CR$^1$R$^2$)$_m$—X is ortho to R$^4$; and X and R$^4$, together, with the atoms to which X and R$^4$ are attached, form a ring.

In some embodiments, m is 2 and X is

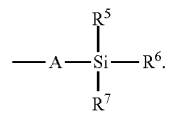

In even further embodiments, at least one of R$^5$-R$^7$ is tert-butyl. In even further embodiments, at least one of R$^5$-R$^7$ is phenyl. In even further embodiments, R$^5$ and R$^6$ are phenyl and R$^7$ is tert-butyl. In even further embodiments, R$^5$-R$^8$ are each, independently, alkyl, aryl, or halo. In even further embodiments, R$^5$-R$^8$ are each, independently, tert-butyl, methyl, phenyl, or chloro.

In some embodiments, m is 3-20 and X is

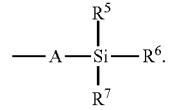

In even further embodiments, at least one of R$^5$-R$^7$ is tert-butyl. In even further embodiments, at least one of R$^5$-R$^7$ is phenyl. In even further embodiments, R$^5$ and R$^6$ are phenyl and R$^7$ is tert-butyl. In even further embodiments, R$^5$-R$^8$ are each, independently, alkyl, aryl, or halo. In even further embodiments, R$^5$-R$^8$ are each, independently, tert-butyl, methyl, phenyl, or chloro.

In some embodiments, m is 2-3; R$^1$ and R$^2$ are H; —O—(CR$^1$R$^2$)$_m$—X is ortho to R$^4$; and X and R$^4$, together, with the atoms to which X and R$^4$ are attached, form a ring.

In some embodiments, m is 2-3 and X is

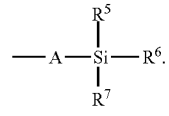

In even further embodiments, at least one of R$^5$-R$^7$ is tert-butyl. In even further embodiments, at least one of R$^5$-R$^7$ is phenyl. In even further embodiments, R$^5$ and R$^6$ are phenyl and R$^7$ is tert-butyl. In even further embodiments, R$^5$-R$^8$ are each, independently, alkyl, aryl, or halo. In even further embodiments, R$^5$-R$^8$ are each, independently, tert-butyl, methyl, phenyl, or chloro.

In some embodiments, m is 4-20 and X is

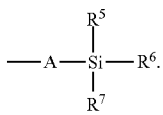

In even further embodiments, at least one of $R^5$-$R^7$ is tert-butyl. In even further embodiments, at least one of $R^5$-$R^7$ is phenyl. In even further embodiments, $R^5$ and $R^6$ are phenyl and $R^7$ is tert-butyl. In even further embodiments, $R^5$-$R^8$ are each, independently, alkyl, aryl, or halo. In even further embodiments, $R^5$-$R^8$ are each, independently, tert-butyl, methyl, phenyl, or chloro.

In some embodiments, A is ≡.

In some embodiments, $R^X$ and $R^Y$ are each, independently, alkyl or hydrogen. In some embodiments, $R^X$ and $R^Y$ are both hydrogen.

In some embodiments, $R^8$-$R^{11}$ are each, independently, alkyl, alkenyl, alkynyl, or alkaryl.

In some embodiments, $R^8$-$R^{11}$ are each alkyl.

In some embodiments, the compound of formula II is

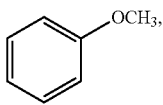

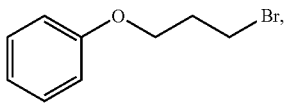

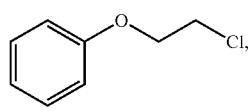

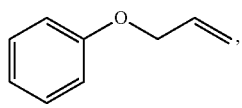

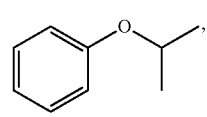

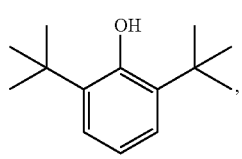

-continued

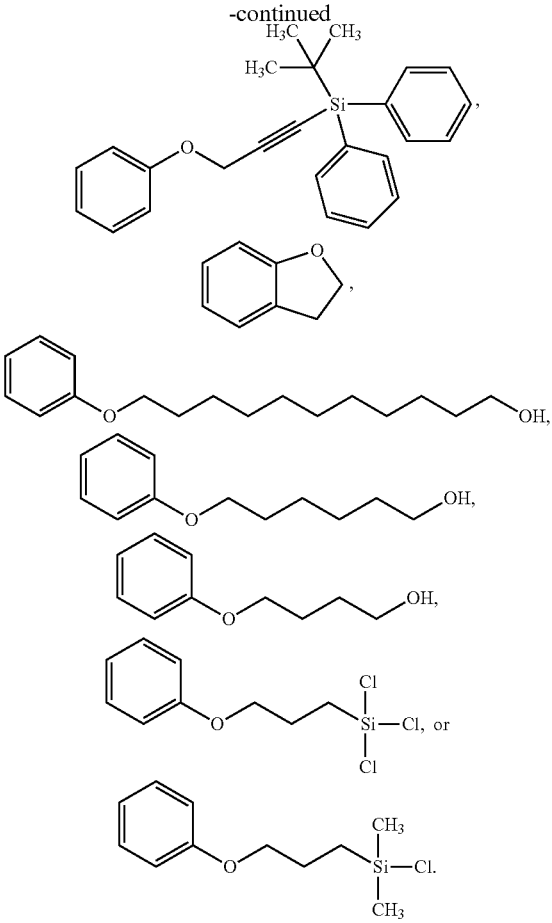

In some embodiments, the compound of formula I is between about $5.0 \times 10^2$ g/mol to about $1.0 \times 10^5$ g/mol. In further embodiments, the compound of formula I is between about $1.0 \times 10^3$ g/mol to about $1.0 \times 10^4$ g/mol. In further embodiments, the compound of formula I is between about $1.0 \times 10^3$ g/mol to about $5.0 \times 10^3$ g/mol. In further embodiments, the compound of formula I is between about $2.0 \times 10^3$ g/mol to about $3.0 \times 10^3$ g/mol.

In some embodiments, the methods provided herein comprise a further step of reacting the compound of formula I with an acid to form a compound of formula III

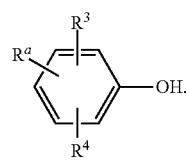

In some embodiments, the step of reacting the compound of formula II with an acid is performed in situ following step (b).

In some embodiments, the acid is a boron halide, aluminum halide, titanium halide, or silyl reagent. In some embodiments, the acid is or is derived from $BCl_3$, $BI_3$, $BF_3OEt_2$, $Me_2BBr$, $Me_3SiSMe$, $Me_3SiSPh$, $H_2SiI_2$, $SiCl4$, $Me_3SiCl$, $Me_3SiI$, $(Me_3Si)_2$, $PhSiMe_3$, $P_2I_4$, $ZnBr_2$, $TiCl_4$, $TiBr_4$, $AlBr_3$, or $SnCl_4$. In some embodiments, the acid is AlBr$_3$, TiCl$_4$, TiBr$_4$, or SnCl$_4$. In some embodiments, the acid is BBr$_3$. In further embodiments, a protic acid is used. In some embodiments, the protic acid is H$_2$SO$_4$, HBr, HCl, trifluoroacetic acid, p-toluenesulfonic acid, or methanesulfonic acid. In some embodiments, more than one acid is used.

In some embodiments, the compound of formula I that is formed from the reaction of the quasiliving carbocationic polyolefin and the compound of formula II, when X is

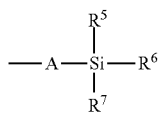

and one or more of R$^5$-R$^7$ is a halide group, upon termination with an alcohol, reacts with the alcohol, and the halide group(s) is replaced with an alkoxy group (s). In some embodiments, the compound of formula I that is formed from the reaction of the quasiliving carbocationic polyolefin and the compound of formula II, when X is

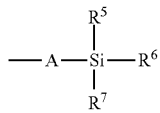

and two or more of R$^5$-R$^7$ is a halide group, upon termination with an amine, reacts to form a silyl amide, which can be converted to a siloxane or a silicone using methods known in the art.

In some embodiments, the compound of formula II is not

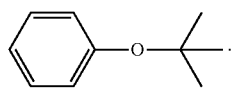

In some embodiments, the compound of formula II is not

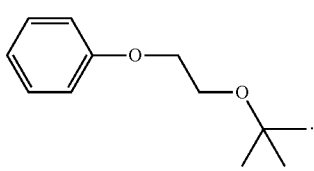

In some embodiments, the compound of formula II is not

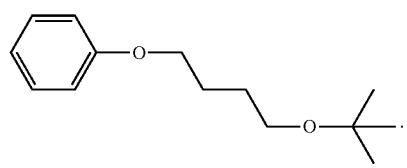 [SMILES: CC(C)(C)OCCCCOc1ccccc1]

In some embodiments, the compound of formula II is not

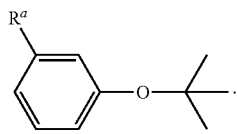

In some embodiments, the compound of formula II is not

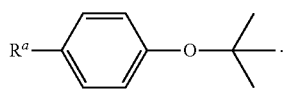

In some embodiments, the compound of formula II is not

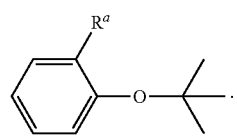

In some embodiments, the compound of formula II is not

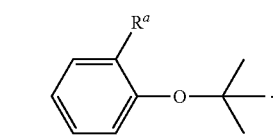

In some embodiments, the compound of formula II is not

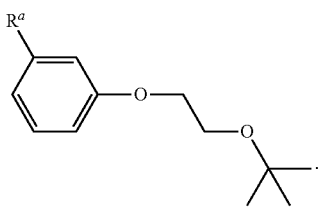

In some embodiments, the compound of formula II is not

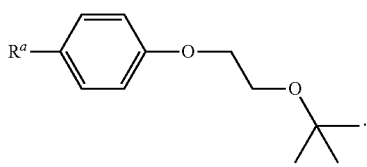

In some embodiments, the compound of formula II is not

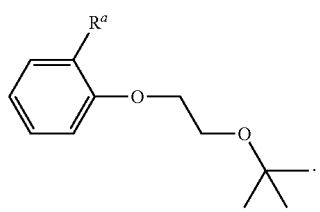

In some embodiments, the compound of formula II is not

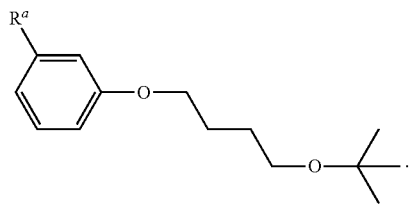

In some embodiments, the compound of formula II is not

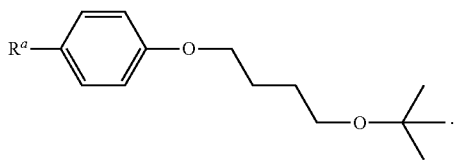

In some embodiments, the compound of formula II is not

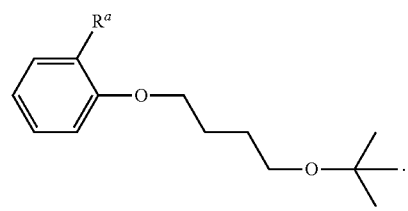

In some embodiments, the compound of formula II is not

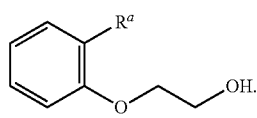

In some embodiments, the compound of formula II is not

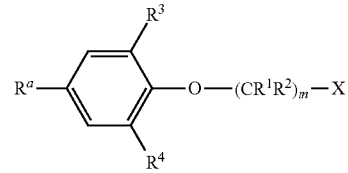

In some embodiments, the compound of formula II is not

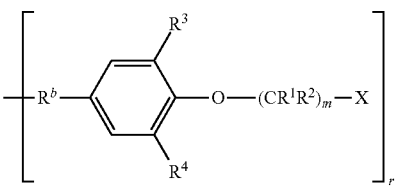

(a) Regioselectivity
In some embodiments, the compound having the formula

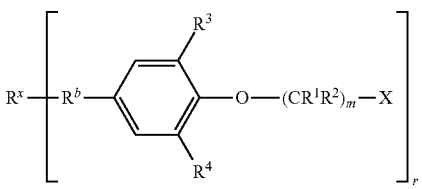

is the major isomer product.
In some embodiments, the compound having the formula

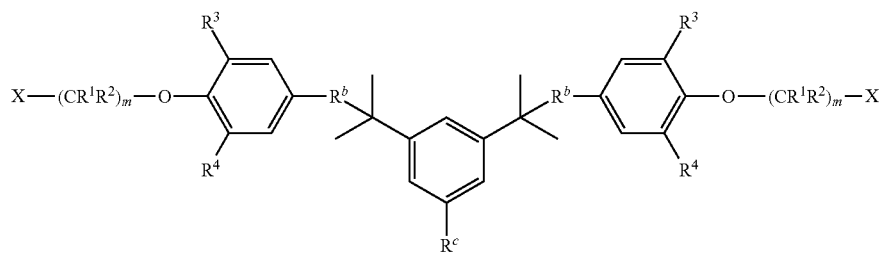

is the major isomer product.

In some embodiments, the compound having the formula

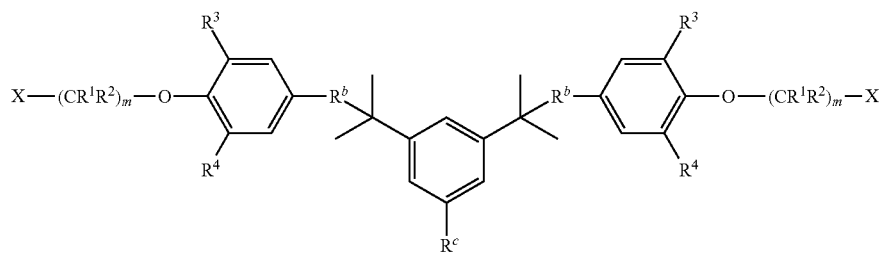

is the major isomer product.

(b) Reaction Time

In some embodiments, step (b) is performed for less than 3 hours. In further embodiments, step (b) is performed for less than 2 hours. In further embodiments, step (b) is performed for less than 1 hour.

5.2.2 Ionized Polyolefins

Ionized polyolefins may be made by any method known to those of skill in the art. Examples include, but are not limited to, ionizing a tert-halide terminated polyolefin with a Lewis acid under quasiliving conditions; ionizing a preformed polyolefin containing a terminal unsaturation with a Lewis acid in the presence of a proton source under quasiliving conditions; polymerizing an olefin monomer under quasiliving carbocationic polymerization conditions; or performing the "inifer" polymerization method.

In some embodiments, the ionized polyolefin is a carbocationic polyolefin. In some embodiments, the carbocationic polyolefin is a carbocation terminated polyolefin. In some embodiments, the carbocationic polyolefin contains one or more carbocation end groups. In some embodiments, the carbocationic polyolefin contains one carbocation end group. In some embodiments, the carbocationic polyolefin contains two carbocation end groups. In some embodiments, the carbocationic polyolefin contains three carbocation end groups. In some embodiments, the carbocationic polyolefin is a polyisobutylene with a cationic end group. In some embodiments, the carbocationic polyolefin is a compound of the following formula:

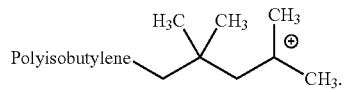

(a) Ionized Polyolefins from Tert-Halides Under Quasiliving Conditions

In some embodiments, the ionized carbocationic polyolefin is derived from a tert-halide terminated polyolefin under quasiliving conditions. In some embodiments, the ionized polyolefin is derived form a tert-chloride terminated polyolefin, tert-bromide terminated polyolefin, or tert-iodide terminated polyolefin under quasiliving conditions. In some embodiments, the ionized polyolefin is derived from a tert-chloride terminated polyolefin or tert-bromide terminated polyolefin under quasiliving conditions. In some embodiments, the ionized polyolefin is derived from a tert-chloride polyolefin under quasiliving conditions.

Tert-halide terminated polyolefins may be made by any method known to those of skill in the art.

In some embodiments, the ionized polyolefin is generated by contacting a tert-halide terminated polyolefin with a Lewis acid under quasiliving conditions. In some embodiments, the ionized polyolefin is generated by contacting a tert-chloride terminated polyolefin, tert-bromide terminated polyolefin, or tert-iodide terminated polyolefin with a Lewis acid under quasiliving conditions. In some embodiments, the ionized polyolefin is generated by contacting a tert-chloride terminated polyolefin with a Lewis acid under quasiliving conditions. In some embodiments, the tert-halide terminated polyolefin is derived from an inifer.

(b) Ionized Polyolefins from Preformed Polyolefins Under Quasiliving Conditions

In some embodiments, the ionized polyolefin is derived from a preformed polyolefin under quasiliving conditions. In some embodiments, the preformed polyolefin contains one or more double bonds. In some embodiments, the preformed polyolefin contains one double bond. In some embodiments, the preformed polyolefin is a polyisobutylene derivative. In some embodiments, the preformed polyolefin contains one or more endo olefins.

In some embodiments, the ionized polyolefin is generated by contacting a Lewis acid with a preformed polyolefin in the presence of a proton source under quasiliving conditions. In some embodiments, the ionized polyolefin is generated by contacting a preformed polyolefin containing one or more double bonds with a Lewis acid in the presence of a proton source under quasiliving conditions. In some embodiments, the ionized polyolefin is generated by contacting a preformed polyolefin containing one double bond with a Lewis acid in the presence of a proton source under quasiliving conditions. In some embodiments, the ionized polyolefin is generated by contacting a polyisobutylene derivative with a Lewis acid in the presence of a proton source under quasiliving conditions. In some embodiments, the ionized polyolefin is generated by contacting a preformed polyolefin containing one or more endo olefins with a Lewis acid in the presence of a proton source under quasiliving conditions.

(c) Ionized Polyolefins from the Inifer Method

In some embodiments, the ionized polyolefin is derived from an inifer using methods known to those of ordinary skill in the art. Non-limiting examples of such methods are described in U.S. Pat. Nos. 4,276,394 and 4,568,732, each of which is incorporated by reference herein. In some embodiments, a monomer is reacted with an inifer carrying at least two tertiary halogens under cationic polymerization conditions.

Non-limiting examples of inifers suitable for use in the methods described herein are those inifers disclosed in U.S. Pat. Nos. 4,276,394 and 4,568,732, each of which is incorporated by reference herein. In some embodiments, the inifer is a binifer or a trinifer. In some embodiments, the inifer is a binifer. In some embodiments, the inifer is a trinifer. In some embodiments, the inifer is tricumyl chloride, paradicumyl chloride, metadicumyl chloride, or tricumyl bromide.

(d) Ionized Polyolefins from Olefinic Monomers Under Quasiliving Carbocationic Polymerization Conditions In some embodiments, the ionized polyolefin is derived from olefinic monomers under quasiliving carbocationic polymerization conditions. Under such conditions, a quasiliving carbocationic polyolefin is generated. Such conditions may be achieved by any method known to those of skill in the art. Non-limiting examples of such methods are described in EP 206756 B1 and WO 2006/110647 A1, both of which are incorporated by reference herein.

In some embodiments, a monomer, an initiator, and a Lewis acid are used. In some embodiments, an electron donor, common ion salt, and/or common ion salt precursor is/are used. In some embodiments, the ionized polyolefin is a quasiliving carbocationic polyisobutylene of the following formula:

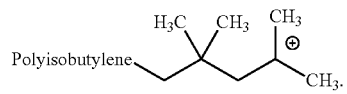

Some non-limiting examples of reagents and conditions suitable for polymerizations producing quasi-living polyolefins will be described below.

(i) Initiators

In some embodiments, the initiator is a compound or polyolefin with one, or more than one, end group capable of initiating a cationic olefin polymerization. For example, the initiator can be a compound of formula $(X'—CR_aR_b)_aR_c$ wherein $R_a$ and $R_b$ are independently hydrogen, alkyl, aryl, alkaryl, or aralkyl, provided that at least one of $R_a$ or $R_b$ is not hydrogen; and $R_c$ is an aliphatic or aromatic univalent or polyvalent radical with valence n, wherein n is an integer from one to 4. X' is an acetate, etherate, hydroxyl group, or a halogen. In some embodiments, $R_a$, $R_b$ and $R_c$ are hydrocarbon groups containing one carbon atom to about 20 carbon atoms. In some embodiments, $R_a$, $R_b$ and $R_c$ are hydrocarbyl groups containing one carbon atom to about 8 carbon atoms. In some embodiments, X' is a halogen. In some embodiments, X' is chloride. In some embodiments, the structure of $R_a$, $R_b$ and $R_c$ mimics the growing species or monomer. In some embodiments, such structure is a 1-halo, 1-phenylethane initiator for polystyrene or a 2,4,4-trimethyl pentyl halide initiator for polyisobutylene. In some embodiments, $R_a$, $R_b$ and $R_c$ are each hydrocarbon groups containing one carbon atom to about 8 carbon atoms for the initiation of an isobutylene polymerization. In some embodiments, the initiator is a cumyl, dicumyl or tricumyl halide.

Some exemplary initiators include 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); 2-acetoxy-2-phenylpropane, i.e., cumyl acetate; 2-propionyloxy-2-phenyl propane, i.e., cumyl propionate; 2-methoxy-2-phenylpropane, i.e., cumylmethyl ether; 1,4-di(2-methoxy-2-propyl)benzene, i.e., di(cumylmethyl ether); 1,3,5-tri(2-methoxy-2-propyl)benzene, i.e., tri(cumylmethyl ether); 2-chloro-2,4,4-trimethyl pentane (TMPC1); 1,3-di(2-chloro-2-propyl)benzene; 2,6-dichloro-2,4,4,6-tetramethylheptane; and 1,3,-di(2-chloro-2-propyl)-5-tert-butylbenzene (bDCC).

In some embodiments, the initiator is mono-functional, bi-functional, or multi-functional.

In some embodiments, the mono-functional initiator is 2-chloro-2-phenylpropane, 2-acetoxy-2-phenylpropane, 2-propionyloxy-2-phenylpropane, 2-methoxy-2-phenylpropane, 2-ethoxy-2-phenylpropane, 2-chloro-2,4,4-trimethylpentane, 2-acetoxy-2,4,4,-trimethylpentane, 2-propionyloxy-2,4,4-trimethylpentane, 2-methoxy-2,4,4-trimethylpentane, 2-ethoxy-2,4,4-trimethylpentane, or 2-chloro-2,4,4-trimethylpentane. In some embodiments, the initiator is 2-chloro-2,4,4-trimethylpentane.

In some embodiments, the bi-functional initiator is 1,3-di(2-chloro-2-propyl)benzene, 1,3-di(2-methoxy-2-propyl)benzene, 1,4-di(2-chloro-2-propyl)benzene, 1,4-di(2-methoxy-2-propyl)benzene, 1,3-di(2-chloro-2-propyl)-5-tert-butylbenzene, 1,3-di(2-methoxy-2-propyl)-5-tert-butylbenzene, 2,6-dichloro-2,4,4,6-tetramethylheptane, or 2,6-dimethoxy-2,4,4,6-tetramethylheptane. In some embodiments, the initiator is 1,3-di(2-chloro-2-propyl)-5-tert-butylbenzene or 2,6-dichloro-2,4,4,6-tetramethylheptane. In some embodiments, the initiator is 1,3-di(2-chloro-2-propyl)-5-tert-butylbenzene.

In some embodiments, the multi-functional initiator is 1,3,5-tri(2-chloro-2-propyl)benzene, 1,3,5-tri(2-bromo-2-propyl)benzene, or 1,3,5-tri(2-methoxy-2-propyl)benzene.

(ii) Monomers

In some embodiments, the monomer is a hydrocarbon monomer, i.e., a compound containing only hydrogen and carbon atoms, including but not limited to, olefins and diolefins, and those having from about 2 to about 20 carbon atoms. In some embodiments, such compounds have from about 4 to about 8 carbon atoms.

In some embodiments, the methods described herein can be employed for the polymerization of such monomers to produce polymers of different, but uniform molecular weights. In some embodiments, such molecular weight is from about 300 to in excess of a million g/mol. In some embodiments, such polymers are low molecular weight liquid or viscous polymers having a molecular weight of from about 200 to 10,000 g/mol, or solid waxy to plastic, or elastomeric materials having molecular weights of from about 100,000 to 1,000,000 g/mol, or more.

In some embodiments, the monomer is isobutylene, styrene, beta pinene, isoprene, butadiene, or substituted compounds of the preceding types. In some embodiments, the monomer is isobutylene, 2-methyl-1-butene, 3-methyl-1-butene, 4-methyl-1-pentene, or styrene. In some embodiments, the monomer is isobutylene.

In some embodiments, mixtures of monomers are used.

(iii) Lewis Acids

In some embodiments, the Lewis acid is a non-protic acid. In some embodiments, the Lewis acid is a metal halide or non-metal halide. In some embodiments, the Lewis acid is a metal halide. In some embodiments, the Lewis acid is a titanium (IV) halide, a zinc (II) halide, a tin (IV) halide, or an aluminum (III) halide. In some embodiments, the Lewis acid is a titanium(IV) halide. In some embodiments, the Lewis acid is a tin (IV) halide. In some embodiments, the Lewis acid an aluminum (III) halide. In some embodiments, the Lewis acid is titanium tetrabromide or titanium tetrachloride. In some embodiments, the Lewis acid is titanium tetrachloride. In some embodiments, the Lewis acid is zinc chloride. In some embodiments, the Lewis acid is aluminum trichloride ($AlCl_3$). In some embodiments, the Lewis acid is $AlBr_3$. In some embodiments, the Lewis acid is ethyl aluminum dichloride. In some embodiments the Lewis acid is a non-metal halide. In some embodiments, the Lewis acid is an antimony (VI) halide, a gallium (III) halide, or a boron (III) halide. In some embodiments, the Lewis acid is boron trichloride. In some embodiments, the Lewis acid is a trialkyl aluminum compound. In some embodiments, the Lewis acid is trimethyl aluminum.

In some embodiments, one Lewis acid is used. In some embodiments, a mixture of two or more Lewis acids is used. In some embodiments, a mixture of two Lewis acids is used. In some embodiments, a mixture of a aluminum (III) halide and trialkyl aluminum compound is used. In some embodiments, a stoichiometric ratio of about 1:1 aluminum (III) halide to trialkyl aluminum compound is used. In some embodiments, a stoichiometric ratio of 2:1 aluminum (III) halide to trialkyl aluminum compound is used. In some embodiments, a stoichiometric ratio of 1:2 aluminum (III) halide to trialkyl aluminum is used. In some embodiments, the stoichiometric ratio of aluminum (III) halide to trialkyl aluminum is greater than 1. In some embodiments, the stoichiometric ratio of aluminum (III) halide to trialkyl aluminum is less than 1. In some embodiments, a mixture of aluminum tribromide and trimethyl aluminum is used.

In some embodiments, the Lewis acid is an alkyl aluminum halide. In some embodiments, the Lewis acid is a methyl aluminum bromide.

In some embodiments, the Lewis acid is added in one aliquot. In some embodiments, the Lewis acid is added in more than one aliquot. In some embodiments, the Lewis acid is added in two aliquots. In some embodiments, a first aliquot of Lewis acid is added during the polymerization reaction, and a second aliquot of Lewis acid is added after the addition of the compounds of formula I.

(iv) Electron Donors

As is understood to one of ordinary skill in the art, some electron donors are capable of converting traditional polymerization systems into quasiliving carbocationic polymerization systems. In some embodiments, the methods described herein are performed in the presence of an electron donor.

In some embodiments, the electron donor is capable of complexing with Lewis acids. In some embodiments, the electron donor is a base and/or nucleophile. In some embodiments, the electron donor is capable of abstracting or removing a proton. In some embodiments, the electron donor is an organic base. In some embodiments, the electron donor is an amide. In some embodiments, the electron donor is N,N-dimethylformamide, N,N-dimethylacetamide, or N,N-diethylacetamide. In some embodiments, the electron donor is a sulfoxide. In some embodiments, the electron donor is dimethyl sulfoxide. In some embodiments, the electron donor is an ester. In some embodiments, the electron donor is methyl acetate or ethyl acetate. In some embodiments, the electron donor is a phosphate compound. In some embodiments, the electron donor is trimethyl phosphate, tributyl phosphate, or triamide hexamethylphosphate. In some embodiments, the electron donor is an oxygen-containing metal compound. In some embodiments, the electron donor is tetraisopropyl titanate.

In some embodiments, the electron donor is pyridine or a pyridine derivative. In some embodiments, the electron donor is a compound of formula:

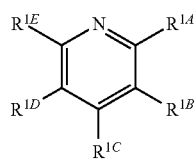

wherein $R^{1A}$, $R^{1B}$, $R^{1C}$, $R^{1D}$, and $R^{1E}$ are each independently, hydrogen or hydrocarbyl; or $R^{1A}$ and $R^{1B}$, or $R^{1B}$ and $R^{1C}$, or $R^{1C}$ and $R^{1D}$, or $R^{1D}$ and $R^{1E}$ independently form a fused aliphatic ring of about 3 to about 7 carbon atoms or a fused aromatic ring of about 5 to about 7 carbon atoms. In some embodiments, $R^{1A}$ and $R^{1E}$ are each, independently, hydrocarbyl, and $R^{1B}$-$R^{1D}$ are hydrogen.

In some embodiments, the electron donor is 2,6-di-tert-butylpyridine, 2,6-lutidine, 2,4-lutidine, 2,4,6-trimethylpyridine, 2-methylpyridine, or pyridine. In some embodiments, the electron donor is N,N-dimethylaniline or N,N-dimethyltoluidine. In some embodiments, the electron donor is 2,6-lutidine.

(v) Common Ion Salts and Ion Salt Precursors

In some embodiments, common ion salts or salt precursors may be optionally added to the reaction mixture in addition to or in replacement of the electron donor. In some embodiments, such salts may be used to increase the ionic strength, suppress free ions, and interact with ligand exchange. In some embodiments, the common ion salt precursor is tetra-n-butylammonium chloride. In some embodiments, the common ion salt precursor is tetra-n-butylammonium bromide. In some embodiments, the common ion salt precursor is tetra-n-butylammonium iodide In some embodiments, the concentration of the common ion salts or salt precursors in the total reaction mixture may be in the range from about 0.0005 moles per liter to about 0.05 moles per liter. In some embodiments, the concentration of the common ion salts or salt precursors is in the range from about 0.0005 moles per liter to about 0.025 moles per liter. In some embodiments, the concentration of the common ion salt or salt precursors is in the range from about 0.001 moles per liter to about 0.007 moles per liter 5.2.3 Diluents In some embodiments of the methods described herein, the methods are performed in a diluent. In some embodiments, the diluent is a single compound or a mixture of two or more compounds. In some embodiments, the diluent completely dissolves the reaction components or partially dissolves the reaction components. In some embodiments, the diluent completely or nearly completely dissolves the reaction components. In some embodiments, the diluent completely dissolves the reaction components. In some embodiments, the diluent nearly completely dissolves the reaction components.

In some embodiments, the diluent has a low boiling point and/or low freezing point. In some embodiments, the diluent is an alkane. In some embodiments, the diluent is a normal alkane. In some embodiments, the diluent is propane, normal butane, normal pentane, normal hexane, normal heptane, normal octane, normal nonane or normal decane. In some embodiments, the diluent is normal hexane or normal pentane. In some embodiments, the diluent is normal hexane. In some embodiments, the diluent is a branched alkane. In some embodiments, the alkane is isobutane, isopentane, neopentane, isohexane, 3-methylpentane, 2,2-dimethylbutane, or 2,3-dimethylbutane. In some embodiments, the alkane is cyclic. In some embodiments, the alkane is methylcyclohexane. In some embodiments, the diluent is a mixed boiling fraction alkane. In some embodiments, the diluent is a mixed boiling fraction of C5 alkanes, i.e., mixed pentanes or mixed boiling fraction of C6 alkanes, i.e., mixed hexanes. In some embodiments, the alkane is a nitroalkane.

In some embodiments, the diluent is an alkyl halide. In some embodiments, the diluent is an alkyl monohalide or an alkyl polyhalide. In some embodiments, the diluent is chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, iso-propyl chloride, 1,2-dichloropropane, or 1,3-dichloropropane. In some embodiments, the diluent is methylene chloride or methyl chloride. In some embodiments, the diluent is methyl chloride. In some embodiments, the diluent is an alkene or halogenated alkene. In some embodiments, the diluent is vinyl chloride, 1,1-dichloroethene, or 1,2-dichloroethene.

In some embodiments, the diluent is a substituted benzene. In some embodiments, the diluent is benzene. In some embodiments, the diluent is toluene.

In some embodiments, the diluent is carbon disulfide, sulfur dioxide, acetic anhydride, acetonitrile, benzene, toluene, ethylbenzene, methylcyclohexane, chlorobenzene, or a nitroalkane.

In some embodiments, the diluent is a mixture of two or more compounds. In some embodiments, the diluent is a mixture of hexane and methyl chloride. In further embodiments, such mixture is from about 10/90 to about 90/10 hexane/methyl chloride by volume. In further embodiments, such mixture is from about 20/80 to about 80/20 hexane/methyl chloride by volume. In further embodiments, such mixture is from about 30/70 to about 70/30 hexane/methyl chloride by volume. In further embodiments, such mixture is from about 40/60 to about 60/40 hexane/methyl chloride by volume. In further embodiments, such mixture is about 50/50 hexane/methyl chloride by volume. In further embodiments, such mixture is about 60/40 hexane/methyl chloride by volume. In further embodiments, such mixture is about 40/60 hexane/methyl chloride by volume.

5.2.4 Temperature

In some embodiments, the methods described herein are performed at a temperature from about −120° C. to about 0° C. In some embodiments, the methods described herein are performed at a temperature from about −110° C. to about −10° C. In some embodiments, the methods described herein are performed at a temperature from about −100° C. to about −20° C. In some embodiments, the methods described herein are performed at a temperature from about −90° C. to about −30° C. In some embodiments, the methods described herein are performed at a temperature from about −80° C. to about −40° C. In some embodiments, the methods described herein are performed at a temperature from about −70° C. to about −40° C. In some embodiments, the methods described herein are performed at a temperature from about −60° C. to about −40° C. In some embodiments, the methods described herein are performed at a temperature of about −40° C., −50° C., −60° C., −70° C., or −80° C. In some embodiments, the methods described herein are performed at a temperature of about −40° C. In some embodiments, the methods described herein are performed at a temperature of about −50° C. In some embodiments, the methods described herein are performed at a temperature of about −60° C. n some embodiments, the methods described herein are performed at a temperature of about −70° C. In some embodiments, the methods described herein are performed at a temperature of about −80° C.

5.2.5 Concentrations

The chain end concentration of the methods described herein are not limited by the disclosed examples. The chain end concentration for the methods described herein appears to have no definite upper limit, and the methods described herein may be performed at any chain end concentration, subject to the inherent limits imposed by the density and molecular weight (i.e., molar volume) of the reaction components.

In some embodiments, the molar concentration of the compounds of formula I is from about 1 to about 10 times the molar concentration of chain ends. In some embodiments, the molar concentration of the compounds of formula I is from about 1.1 to about 8 times the molar concentration of chain ends. In some embodiments, the molar concentration of the compounds of formula I is from about 1.1 to about 5 times the molar concentration of chain ends. In some embodiments, the molar concentration of the compounds of formula I is from about 1.1 to about 4 times the molar concentration of chain ends. In some embodiments, the molar concentration of the compounds of formula I is from about 1.1 to about 3 times the molar concentration of chain ends. In some embodiments, the molar concentration of the compounds of formula I is from about 1.1 to about 2 times the molar concentration of chain ends.

In some embodiments, the molar concentration of Lewis acid is from about 0.5 to about 20 times the molar concentration of chain ends. In some embodiments, the molar concentration of Lewis acid is from about 0.5 to about 15 times the molar concentration of chain ends. In some embodiments, the molar concentration of Lewis acid is from about 1.0 to about 10 times the molar concentration of chain ends. In some embodiments, the molar concentration of Lewis acid is from about 1.0 to about 8 times the molar concentration of chain ends. In some embodiments, the molar concentration of Lewis acid is from about 2 to about 5 times the molar concentration of chain ends.

In some embodiments, the electron donor concentration is less than half the concentration of Lewis acid. In some embodiments, the electron donor concentration is less than 0.4 times the Lewis acid concentration. In some embodiments, the electron donor concentration is less than 0.3 times the Lewis acid concentration. In some embodiments, the electron donor concentration is less than 0.2 times the Lewis acid concentration. In some embodiments, the electron donor concentration is less than 0.1 times the Lewis acid concentration.

In some embodiments, the chain end concentration is less than 0.010 M. In some embodiments, the chain end concentration is less than 0.050 M. In some embodiments, the chain end concentration is less than 0.10 M. In some embodiments, the chain end concentration is less than 0.5 M. In some embodiments, the chain end concentration is less than 1.0 M. In some embodiments, the chain end concentration is greater than 0.001 M.

5.2.6 Terminators

In some embodiments, the terminator is a compound capable of deactivating a Lewis acid. In some embodiments, the terminator is a base and/or a nucleophile. In some embodiments, the terminator is a base. In some embodiments, the terminator is an electron donor. In some embodiments, the terminator is an organic base. In some embodiments, the terminator is an alcohol or amine. In some embodiments, the terminator is an alcohol. In some embodiments, the terminator is a pyridine derivative.

In some embodiments, the terminator is methanol, ethanol, or isopropanol. In some embodiments, the terminator is methanol. In some embodiments, the terminator is water. In some embodiments, the terminator is diethylamine, triethylamine, pyridine, 2,6-lutidine, n-butylamine, or tert-amylamine.

In some embodiments, the terminator is added after the quenching step.

5.3 Compounds

In some embodiments, provided herein are compounds of formula II:

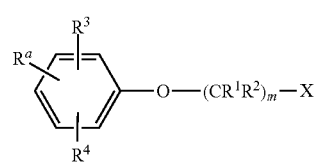

I wherein
$R^a$ is a polyolefin group;
$R^1$ and $R^2$ are each, independently in each —$(CR^1R^2)$ unit, H or alkyl;
  wherein m is an integer from 0 to 20; wherein
  if m is 0,
    then $R^3$ and $R^4$ are each, independently, alkyl, and
    X is H;
  if m is 1 and at least one of $R^3$ and $R^4$ is not H,
    then $R^3$ and $R^4$ are each, independently H, alkyl, or alkoxy, and
    X is H, alkyl, alkenyl, alkynyl, alkaryl, aralkyl, aryl, heteroaryl, or

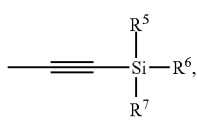

wherein $R^5$-$R^7$ are each, independently, alkyl or aryl;
  if m is 1 and $R^3$ and $R^4$ are both H,
    then $R^3$ and $R^4$ are each, independently H, alkyl, or alkoxy, and
    X is alkyl, alkenyl, alkynyl, alkaryl, aralkyl, aryl, heteroaryl, or

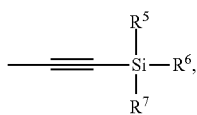

wherein $R^5$-$R^7$ are each, independently, alkyl or aryl;
  if m is 2,
    then $R^3$ and $R^4$ are each, independently H, alkyl, or alkoxy, and
    X is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)$R^8$, —C(O)O$R^9$, —C(O)N$R^{10}R^{11}$,

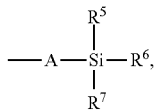

wherein A is —≡— or nothing,
    $R^5$-$R^7$ are each, independently, alkyl, alkenyl, alkynyl, alkaryl, aralkyl, aryl, heteroaryl, alkoxy, or hydroxy,
    $R^8$ is alkyl, alkenyl, alkynyl, alkaryl, aryl, or heteroaryl, and $R^9$-$R^{11}$ are each, independently, H, alkyl, alkenyl, alkynyl, alkaryl, aryl, or heteroaryl,
    or, when —O—$(CR^1R^2)_m$—X is ortho to $R^4$, then X and $R^4$,
      together, with the atoms to which X and $R^4$ are attached, may form a ring;
  and if m is 3-20,
    then $R^3$ and $R^4$ are each, independently H, alkyl, or alkoxy, and X is H, alkyl, alkenyl, alkynyl, alkaryl, aralkyl, aryl, heteroaryl, alkoxy, aryloxy, heteroaryloxy, alkaryloxy —OH, —F, —Cl, —Br, —I, —At, —CN, —NC, —NCO, —OCN, —NCS, —SCN, —OC(O)$R^8$, —C(O)O$R^9$, —C(O)N$R^{10}R^{11}$,

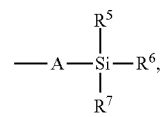

or —N$R^XR^Y$;
  wherein A is —≡— or nothing,
  $R^X$ and $R^Y$ are each, independently, H, alkyl, alkenyl, alkynyl, cycloalkyl, aryl, heteroaryl, heterocyclyl, C(O)$R^Z$,
    wherein $R^Z$ is H, alkyl, alkenyl, alkynyl, cycloalkyl, aryl, heteroaryl, heterocyclyl, —O$R^8$, or —N$R^{10}R^{11}$;
  $R^5$-$R^7$ are each, independently, alkyl, alkenyl, alkynyl, alkaryl, aralkyl, aryl, heteroaryl, alkoxy, or hydroxy,
  $R^8$ is alkyl, alkenyl, alkynyl, alkaryl, aryl, or heteroaryl, and $R^9$-$R^{11}$ are each, independently, H, alkyl, alkenyl, alkynyl, alkaryl, aryl, or heteroaryl.

In some embodiments, provided herein are compounds of formula I:

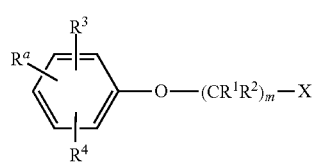

I wherein
$R^a$ is a polyolefin group;
$R^1$ and $R^2$ are each, independently in each —$(CR^1R^2)$ unit, H or alkyl;
  wherein m is an integer from 0 to 20; wherein
  if m is 0,
    then $R^3$ and $R^4$ are each, independently, alkyl, and
    X is H;
  if m is 1 and at least one of $R^3$ and $R^4$ is not H,
    then $R^3$ and $R^4$ are each, independently H, alkyl, or alkoxy, and
    X is H, alkyl, alkenyl, alkynyl, alkaryl, aralkyl, aryl, heteroaryl, or

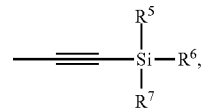

wherein $R^5$-$R^7$ are each, independently, alkyl or aryl;
  if m is 1 and $R^3$ and $R^4$ are both H,
    then $R^3$ and $R^4$ are each, independently H, alkyl, or alkoxy, and
    X is alkyl, alkenyl, alkynyl, alkaryl, aralkyl, aryl, heteroaryl, or

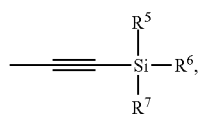

wherein R⁵-R⁷ are each, independently, alkyl or aryl;

if m is 2 or 3,
  then $R^3$ and $R^4$ are each, independently H, alkyl, or alkoxy, and
  X is H, alkyl, alkenyl, alkynyl, alkaryl, aralkyl, aryl, heteroaryl, alkoxy, —F, —Cl, —Br, —I, —At, —CN, —NC, —NCO, —OCN, —NCS, —SCN, —OC(O)R⁸, —C(O)OR⁹, —C(O)NR¹⁰R¹¹,

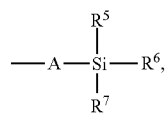

wherein A is ═══ or nothing,
  $R^5$-$R^7$ are each, independently, alkyl, alkenyl, alkynyl, alkaryl, aralkyl, aryl, heteroaryl, alkoxy, or hydroxy,
  $R^8$ is alkyl, alkenyl, alkynyl, alkaryl, aryl, or heteroaryl, and $R^9$-$R^{11}$ are each, independently, H, alkyl, alkenyl, alkynyl, alkaryl, aryl, or heteroaryl,
  or, when —O—(CR¹R²)ₘ—X is ortho to $R^4$, then X and $R^4$, together, with the atoms to which X and $R^4$ are attached, may form a ring;

and if m is 4-20,
  then $R^3$ and $R^4$ are each, independently H, alkyl, or alkoxy, and
  X is H, alkyl, alkenyl, alkynyl, alkaryl, aralkyl, aryl, heteroaryl, alkoxy, aryloxy, heteroaryloxy, alkaryloxy, —OH, —F, —Cl, —Br, —I, —At, —CN, —NC, —NCO, —OCN, —NCS, —SCN, —OC(O)R⁸, —C(O)OR⁹, —C(O)NR¹⁰R¹¹,

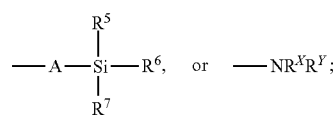

wherein $R^X$ and $R^Y$ are each, independently, H, alkyl, alkenyl, alkynyl, cycloalkyl, aryl, heteroaryl, heterocyclyl, C(O)R^Z,
    wherein $R^Z$ is H, alkyl, alkenyl, alkynyl, cycloalkyl, aryl, heteroaryl, heterocyclyl, —OR⁸, or —NR¹⁰R¹¹;
  A is ═══ or nothing,
  $R^5$-$R^7$ are each, independently, alkyl, alkenyl, alkynyl, alkaryl, aralkyl, aryl, heteroaryl, alkoxy, or hydroxy,
  $R^8$ is alkyl, alkenyl, alkynyl, alkaryl, aryl, or heteroaryl, and $R^9$-$R^{11}$ are each, independently, H, alkyl, alkenyl, alkynyl, alkaryl, aryl, or heteroaryl.

In further embodiments, $R^a$ is a polyisobutyl group. In even further embodiments, the polyisobutyl group is

wherein R is H or alkyl of 1 to about 10 carbons, and n is an integer from about 10 to about 2000. In one embodiment, n is about 10 to about 1000. In one embodiment, n is about 10 to about 500. In one embodiment, n is about 10 to about 250. In one embodiment, n about 10 to about 100. In one embodiment, n is 10 to about 50.

In some embodiments, the compound has the formula

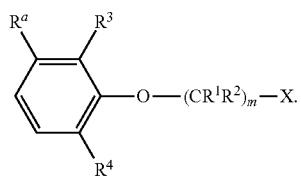

In some embodiments, the compound has the formula

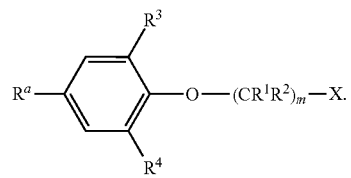

In some embodiments, the compound has the formula

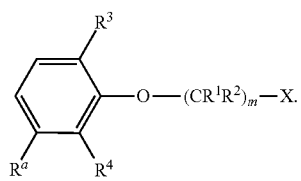

In some embodiments, the compound has the formula

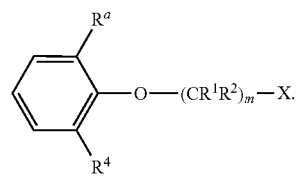

In some embodiments, the compound has the formula

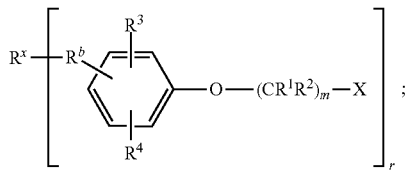

wherein $R^b$ is a polyisobutylene group;
$R^x$ is a polyfunctional carbocationic initiator residue;
and r is an integer from 1 to 4.

In further embodiments, m is 4-20. In further embodiments, m is 6-20. In further embodiments, r is 1. In further embodiments, r is 2. In further embodiments, r is 3. In further embodiments, r is 4.

In further embodiments, the compound has the formula

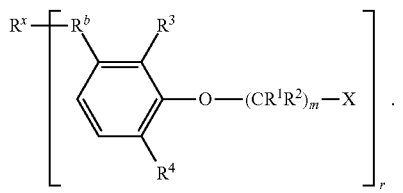

In further embodiments, the compound has the formula

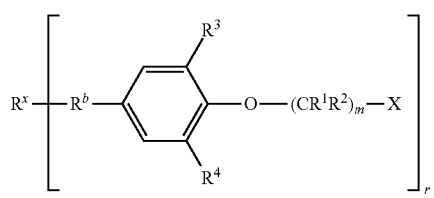

In further embodiments, the compound has the formula

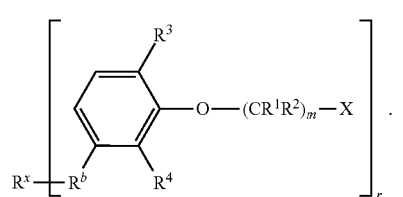

In further embodiments, the compound has the formula

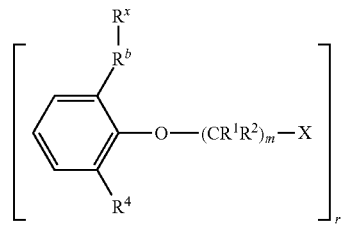

In further embodiments, the compound has the formula

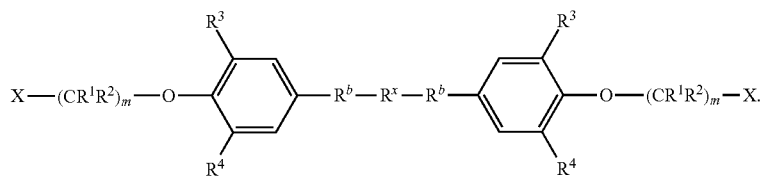

In further embodiments, the compound has the formula

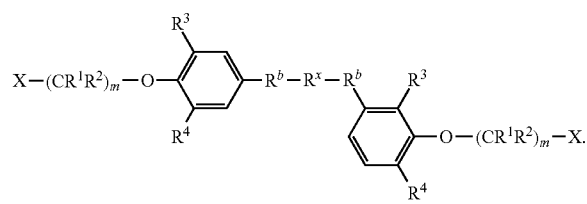

In further embodiments, the compound has the formula

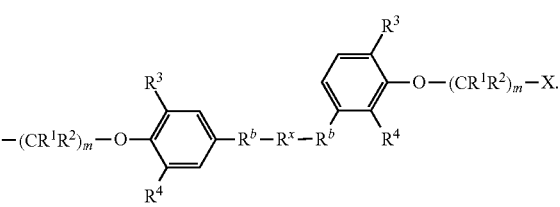

In further embodiments, the compound has the formula

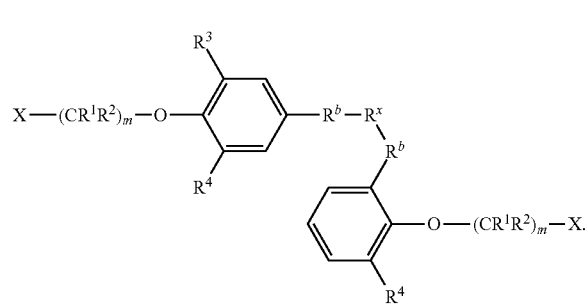

In further embodiments, the compound has the formula

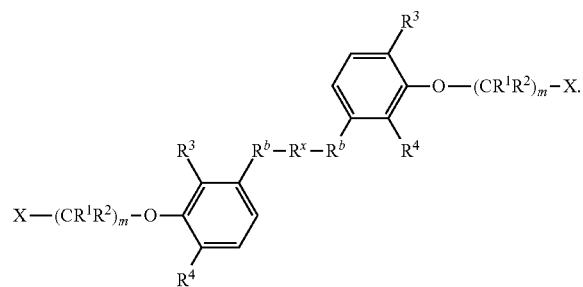

In further embodiments, the compound has the formula

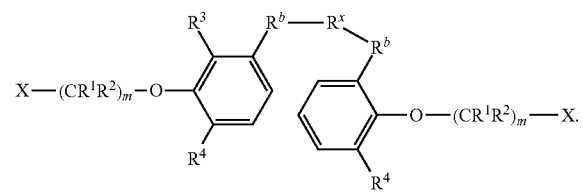

In further embodiments, the compound has the formula

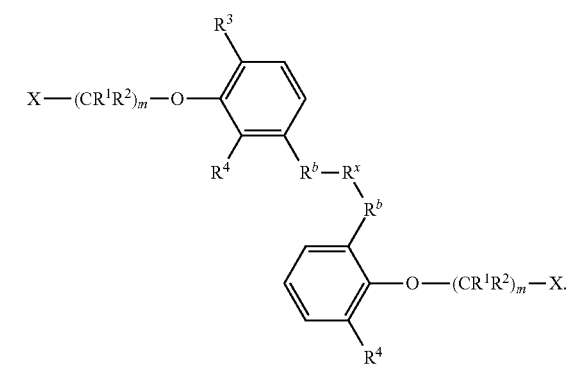

In some embodiments, the compound has the formula

In some embodiments, $R^b$ is

wherein p is an integer from about 10 to about 2000. In further embodiments, p is about 10 to about 1000. In further embodiments, p is about 10 to about 500. In further embodiments, p is about 10 to about 250. In further embodiments, p is about 10 to about 100. In further embodiments, p is 10 to about 50.

In some embodiments, the compound has the formula

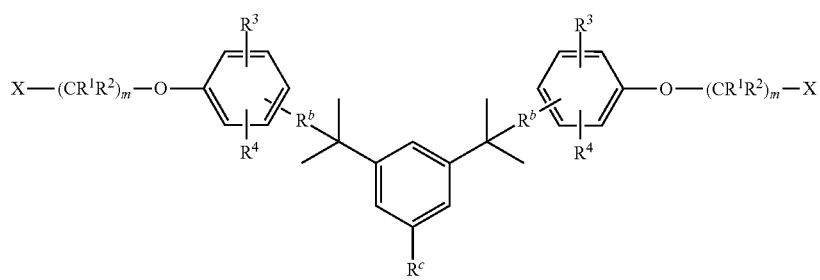

wherein $R^b$ is a polyisobutylene group;
and $R^c$ is H or alkyl.

In some embodiments, the compound has the formula
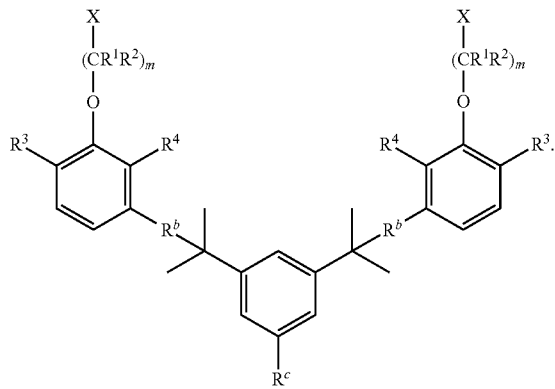
In some embodiments, the compound has the formula
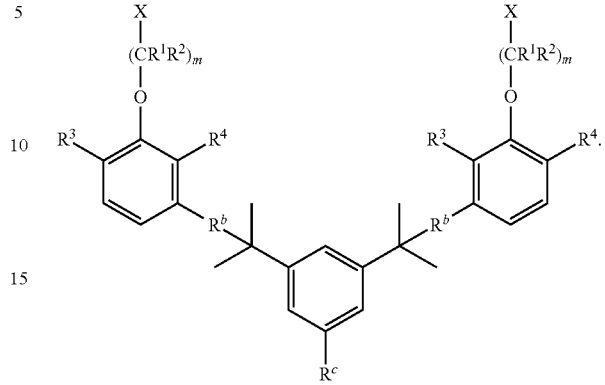
In some embodiments, the compound has the formula
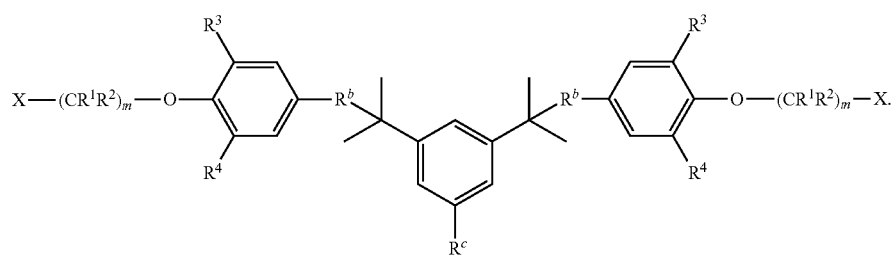
In some embodiments, the compound has the formula
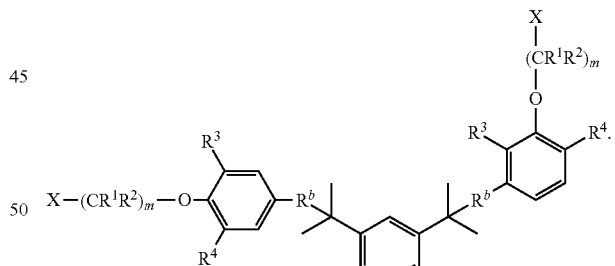
In some embodiments, the compound has the formula
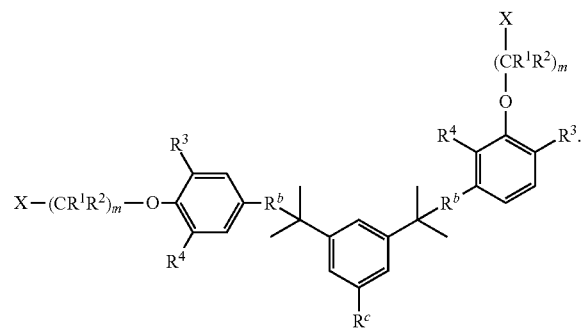
In some embodiments, the compound has the formula
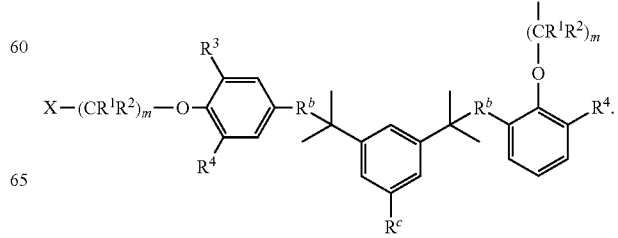

In some embodiments, the compound has the formula
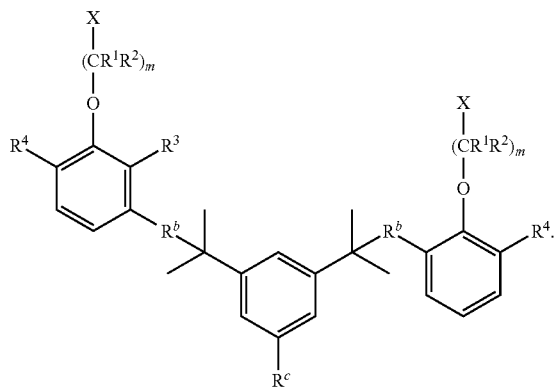
In some embodiments, the compound has the formula
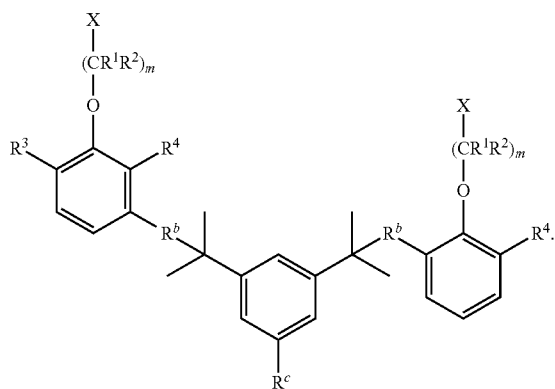
In some embodiments, the compound has the formula
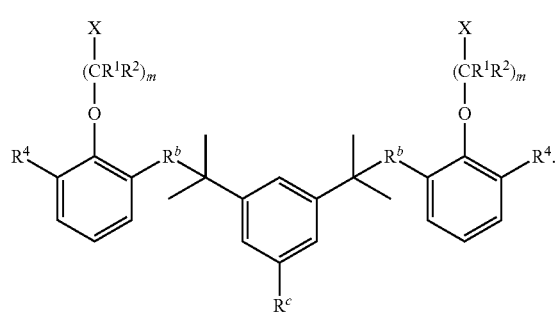
In some embodiments, the compound has the formula
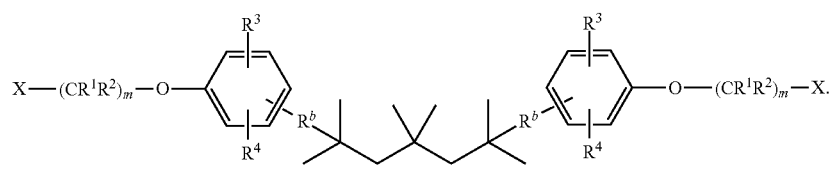

In some embodiments, the compound has the formula

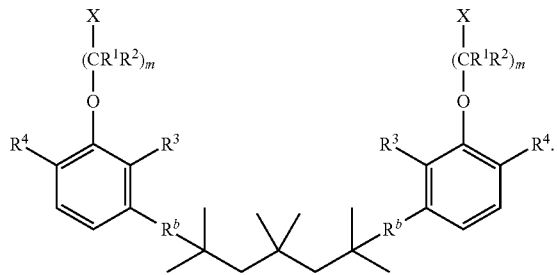

In some embodiments, the compound has the formula

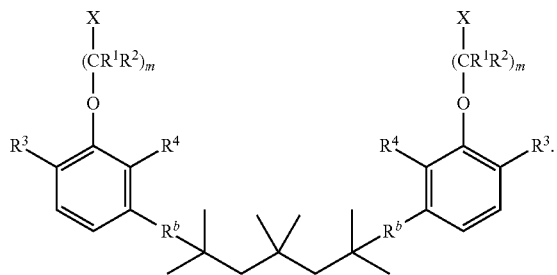

In some embodiments, the compound has the formula

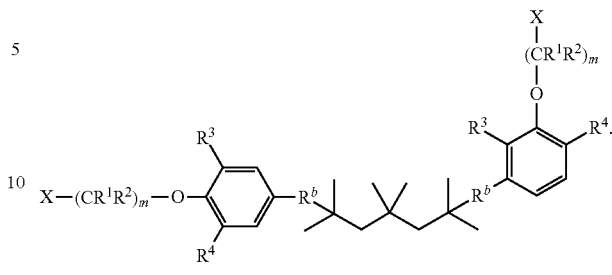

In some embodiments, the compound has the formula

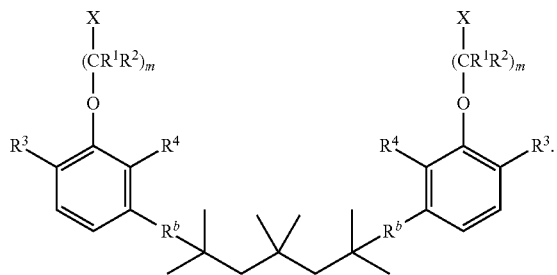

In some embodiments, the compound has the formula

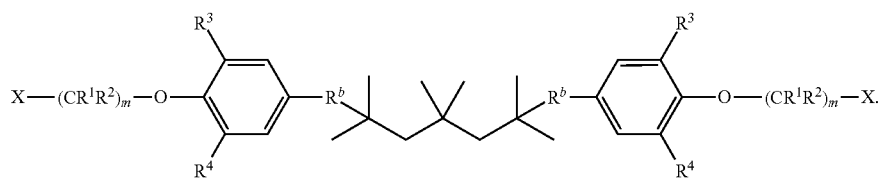

In some embodiments, the compound has the formula

In some embodiments, the compound has the formula

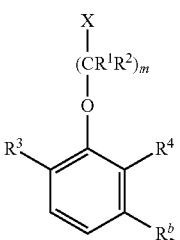

In some embodiments, the compound has the formula

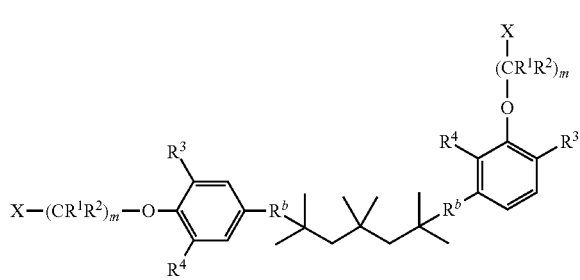

In some embodiments, the compound has the formula

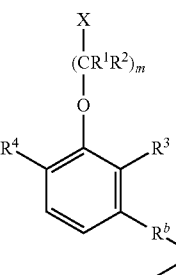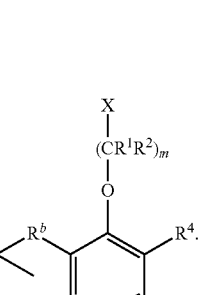

In some embodiments, the compound has the formula
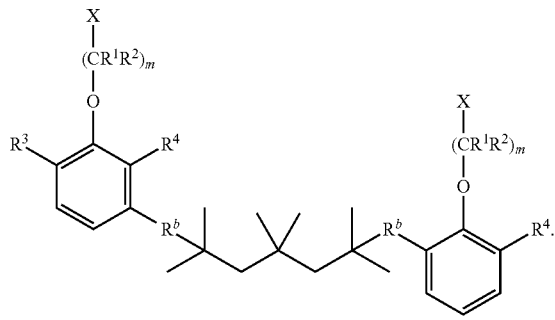
In some embodiments, the compound has the formula
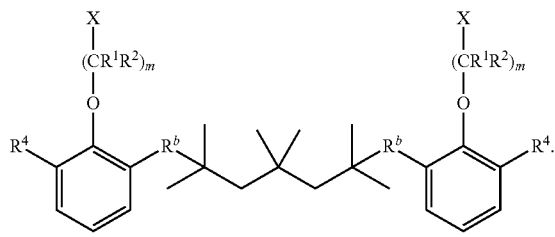
In some embodiments, the compound has the formula
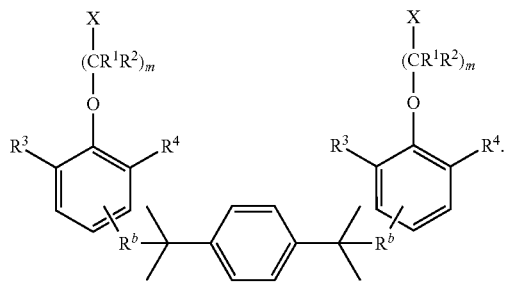
In some embodiments, the compound has the formula
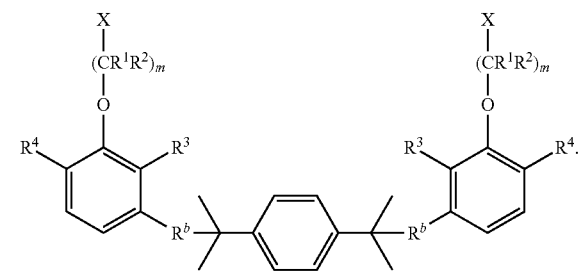
In some embodiments, the compound has the formula
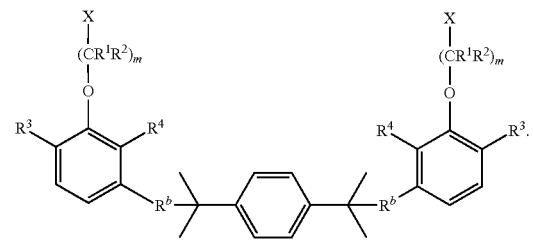
In some embodiments, the compound has the formula
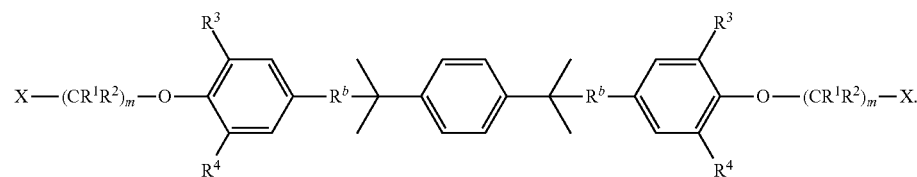

In some embodiments, the compound has the formula

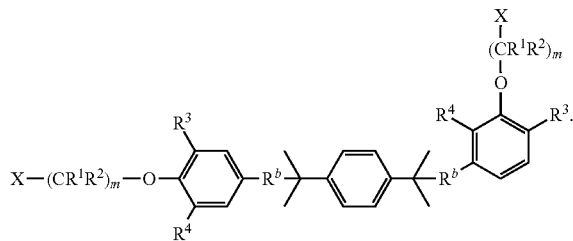

In some embodiments, the compound has the formula

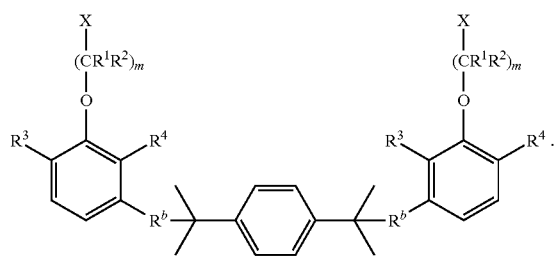

In some embodiments, the compound has the formula

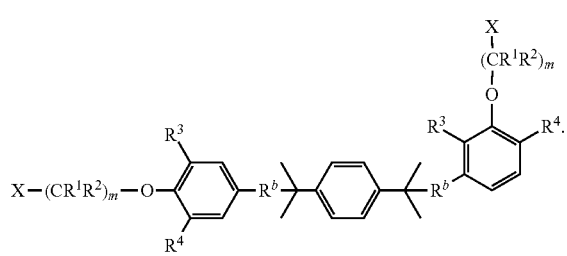

In some embodiments, the compound has the formula

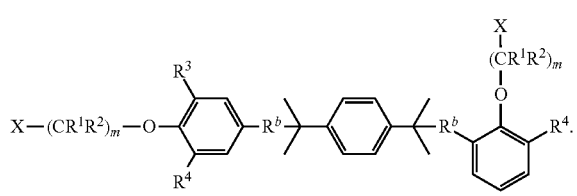

In some embodiments, the compound has the formula

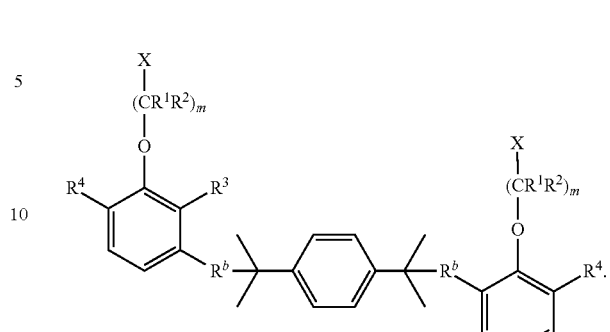

In some embodiments, the compound has the formula

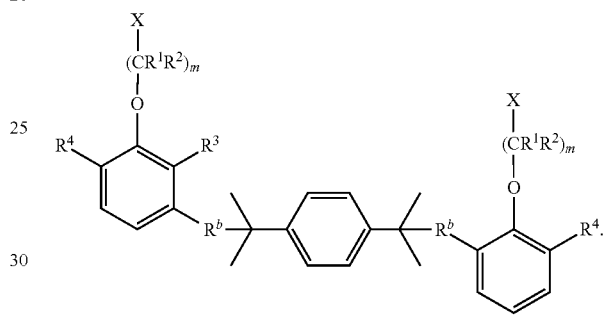

In some embodiments, the compound has the formula

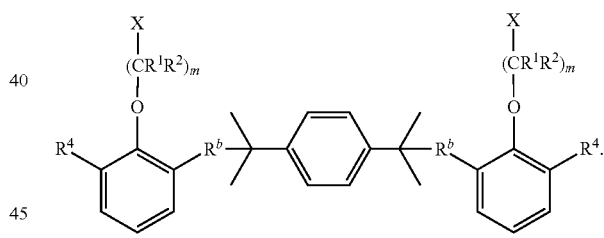

In some embodiments, the compound has the formula

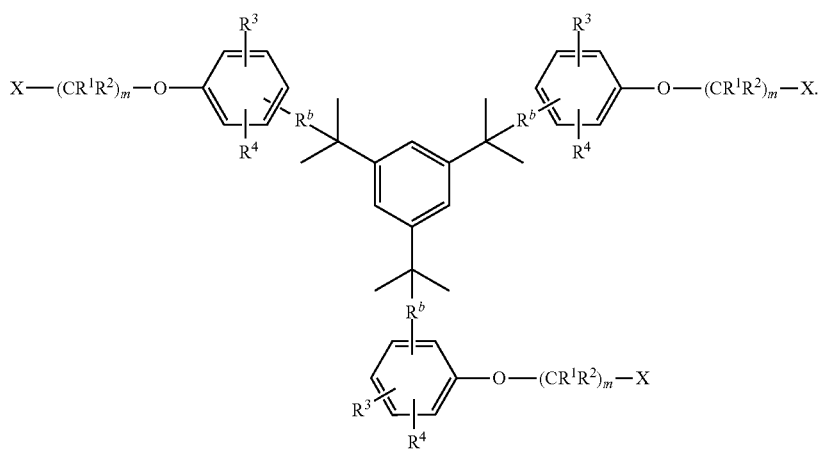

In some embodiments, the compound has the formula

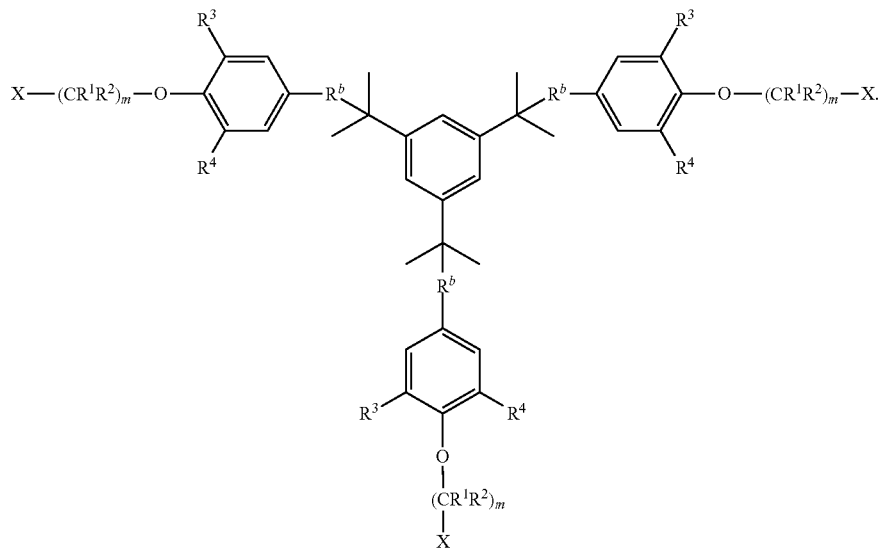

In some embodiments, $R^c$ is alkyl of 1 to about 6 carbons.

In some embodiments, $R^c$ is tert-butyl.

In some embodiments of the compounds of formula I, $R^1$ and $R^2$ are both H.

In some embodiments, $R^1$ and $R^2$ are independently in each —(CR$^1$R$^2$) unit, alkyl of 1 to about 6 carbons or hydrogen.

In some embodiments, $R^1$ and $R^2$ are each, independently in each —(CR$^1$R$^2$) unit, methyl or hydrogen.

In some embodiments, $R^3$ and $R^4$ are identical.

In some embodiments, m is 3-20 and X is H, alkyl, alkenyl, alkynyl, alkaryl, aralkyl, aryl, heteroaryl, alkoxy, —OH, —F, —Cl, —Br, —I, —At, —CN, —NC, —NCO, —OCN, —NCS, —SCN, —OC(O)R$^8$, —C(O)OR$^9$, —C(O)NR$^{10}$R$^{11}$, or

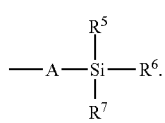

In some embodiments, m is 3-20 and X is H, alkyl, alkenyl, alkynyl, alkaryl, aralkyl, heteroaryl, alkoxy, —OH, —F, —Cl, —Br, —I, —At, —CN, —NC, —NCO, —OCN, —NCS, —SCN, —OC(O)R$^8$, —C(O)OR$^9$, —C(O)NR$^{10}$R$^{11}$, or

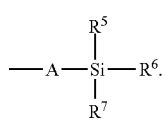

In some embodiments, m is 4-20 and X is H, alkyl, alkenyl, alkynyl, alkaryl, aralkyl, aryl, heteroaryl, alkoxy, —OH, —F, —Cl, —Br, —I, —At, —CN, —NC, —NCO, —OCN, —NCS, —SCN, —OC(O)R$^8$, —C(O)OR$^9$, —C(O)NR$^{10}$R$^{11}$, or $$-A-\underset{\underset{R^7}{|}}{\overset{\overset{R^5}{|}}{Si}}-R^6.$$

In some embodiments, m is 4-20 and X is H, alkyl, alkenyl, alkynyl, alkaryl, aralkyl, heteroaryl, alkoxy, —OH, —F, —Cl, —Br, —I, —At, —CN, —NC, —NCO, —OCN, —NCS, —SCN, —OC(O)R$^8$, —C(O)OR$^9$, —C(O)NR$^{10}$R$^{11}$, or $$-A-\underset{\underset{R^7}{|}}{\overset{\overset{R^5}{|}}{Si}}-R^6.$$

In some embodiments, m is 1-20 and $R^3$ and $R^4$ are hydrogen.

In some embodiments, m is 1-20 and $R^3$ and $R^4$ are each, independently, alkoxy of 1 to about 6 carbons.

In some embodiments, m is 1-20 and $R^3$ and $R^4$ are each, independently, alkoxy of 1 to about 3 carbons.

In some embodiments, m is 1-20, and $R^3$ and $R^4$ are each, independently, H, alkyl of 1 to about 6 carbons, or alkoxy of 1 to about 6 carbons.

In some embodiments, m is 1-20, and $R^3$ and $R^4$ are each, independently, H, alkyl of 1 to about 3 carbons, or alkoxy of 1 to about 3 carbons.

In some embodiments, m is 1-20, and $R^3$ and $R^4$ are each, independently, alkyl of 1 to about 6 carbons or alkoxy of 1 to about 6 carbons.

In some embodiments, $R^3$ and $R^4$ are each, independently, alkyl of 1 to about 6 carbons.

In some embodiments, $R^3$ and $R^4$ are each, independently, alkyl of 1 to about 3 carbons.

In some embodiments, $R^3$ and $R^4$ are each, independently, tert-butyl.

In some embodiments, m is 1 and at least one of $R^3$ and $R^4$ is not H.

In some embodiments, m is 1 and $R^3$ and $R^4$ are both H.

In some embodiments, m is 0.

In some embodiments, m is 1.

In some embodiments, m is 2.

In some embodiments, m is 2 or 3.

In some embodiments, m is 4-20.

In some embodiments, m is 3-20. In some embodiments, m is 0-10. In some embodiments, m is 1-10. In some embodiments, m is 2-10. In some embodiments, m is 3-10. In some embodiments, m is 1-3.

In some embodiments, m is 0 and $R^3$ and $R^4$ are each, independently, alkyl of 1-about 6 carbons.

In some embodiments, m is 0 and $R^3$ and $R^4$ are each, independently, alkyl of 1 to about 3 carbons.

In some embodiments, m is 0 and $R^3$ and $R^4$ are each, independently, alkyl of at least 6 carbons.

In some embodiments, m is 0 and $R^3$ and $R^4$ are each, independently, alkyl of at least 8 carbons.

In some embodiments, m is 0 and $R^3$ and $R^4$ are each, independently, alkyl of at least 10 carbons.

In some embodiments, m is 1 and at least one of $R^3$ and $R^4$ is not H, and X is H, alkyl, or alkenyl.

In some embodiments, m is 1 and at least one of $R^3$ and $R^4$ is not H, and X is H, alkyl of 1 to about 6 carbons or alkenyl of 2 to about 6 carbons.

In some embodiments, m is 1 and at least one of $R^3$ and $R^4$ is not H, and X is H.

In some embodiments, m is 1 at least one of $R^3$ and $R^4$ is not H, and X is

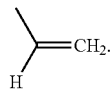

In some embodiments, m is 1 at least one of $R^3$ and $R^4$ is not H, and X is methyl.

In some embodiments, m is 1, at least one of $R^3$ and $R^4$ is not H, and X is

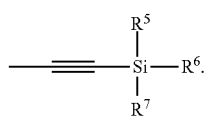

In further embodiments, at least one of $R^5$-$R^7$ is tert-butyl. In further embodiments, at least one of $R^5$-$R^7$ is phenyl. In further embodiments, $R^5$ and $R^6$ are phenyl and $R^7$ is tert-butyl.

In some embodiments, m is 1, $R^3$ and $R^4$ are both H, and X is alkyl, or alkenyl.

In some embodiments, m is 1, $R^3$ and $R^4$ are both H, and X is alkyl of 1 to about 6 carbons or alkenyl of 2 to about 6 carbons.

In some embodiments, m is 1, $R^3$ and $R^4$ are both H, and X is

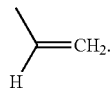

In some embodiments, m is 1 and $R^3$ and $R^4$ are both H, and X is methyl.

In some embodiments, m is 1, $R^3$ and $R^4$ are both H, and X is

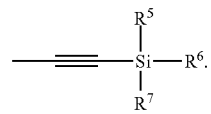

In further embodiments, at least one of $R^5$-$R^7$ is tert-butyl. In further embodiments, at least one of $R^5$-$R^7$ is phenyl. In further embodiments, $R^5$ and $R^6$ are phenyl and $R^7$ is tert-butyl.

In some embodiments, m is 2-20 and X is H, alkyl of 1 to about 6, carbons, alkenyl of 2 to about 6 carbons, F, Cl, Br, or I.

In some embodiments, m is 2-5 and X is H, alkyl of 1 to about 6 carbons, alkenyl of 2 to about 6 carbons, F, Cl, Br, or I.

In some embodiments, m is 2-20 and X is Cl or Br.

In some embodiments, m is 2-5 and X is Cl or Br.

In some embodiments, m is 3-20 and X is OH. In some embodiments, m is 4 to 20 and X is OH. In some embodiments, m is 6-10 and X is OH. In some embodiments, m is 4-11 and X is OH.

In some embodiments, $R^8$—$R^{11}$ are each, independently, alkyl of 1 to about 6 carbons.

In some embodiments, m is 2; $R^1$ and $R^2$ are H; —O—$(CR^1R^2)_m$—X is ortho to $R^4$; and X and $R^4$ together; with the atoms to which X and $R^4$ are attached, form a ring.

In some embodiments, m is 2 and X is

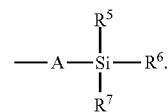

In further embodiments, at least one of $R^5$-$R^7$ is tert-butyl. In further embodiments, at least one of $R^5$-$R^7$ is phenyl. In further embodiments, $R^5$ and $R^6$ are phenyl and $R^7$ is tert-butyl.

In some embodiments, m is 3-20 and X is

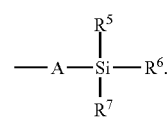

In further embodiments, at least one of $R^5$-$R^7$ is tert-butyl. In further embodiments, at least one of $R^5$-$R^7$ is phenyl. In further embodiments, $R^5$ and $R^6$ are phenyl and $R^7$ is tert-butyl.

In some embodiments, m is 2-3; $R^1$ and $R^2$ are H; —O—$(CR^1R^2)_m$—X is ortho to $R^4$; and X and $R^4$ together; with the atoms to which X and $R^4$ are attached, form a ring.

In some embodiments, m is 2-3 and X is

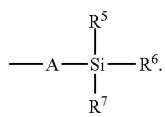

In further embodiments, at least one of $R^5$-$R^7$ is tert-butyl. In further embodiments, at least one of $R^5$-$R^7$ is phenyl. In further embodiments, $R^5$ and $R^6$ are phenyl and $R^7$ is tert-butyl.

In some embodiments, m is 4-20 and X is

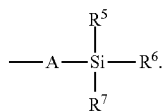

In further embodiments, at least one of $R^5$-$R^7$ is tert-butyl. In further embodiments, at least one of $R^5$-$R^7$ is phenyl. In further embodiments, $R^5$ and $R^6$ are phenyl and $R^7$ is tert-butyl.

In some embodiments, A is ≡.

In some embodiments, $R^X$ and $R^Y$ are each, independently, alkyl or hydrogen. In some embodiments, $R^X$ and $R^Y$ are both hydrogen.

In some embodiments, $R^8$-$R^{11}$ are each, independently, alkyl, alkenyl, alkynyl, or alkaryl.

In some embodiments, $R^8$-$R^{11}$ are each alkyl.

In some embodiments, the compound is

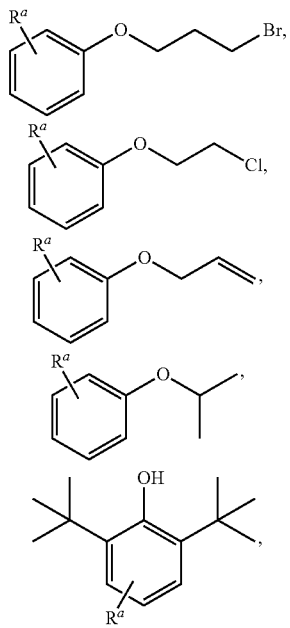

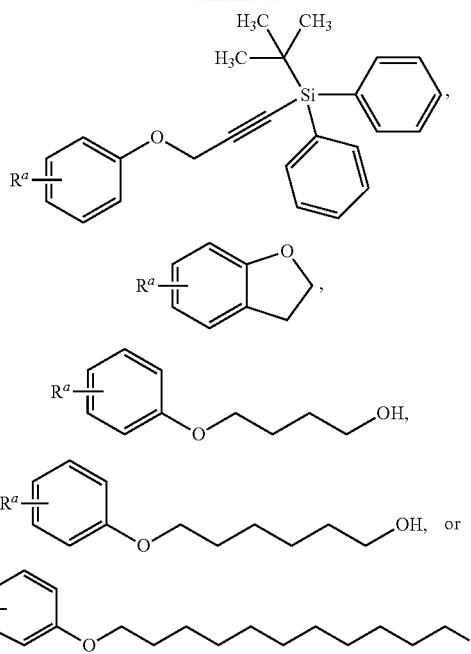

In further embodiments, the compound is a para isomer.

In some embodiments, the compound is between about $5.0 \times 10^2$ g/mol to about $1.0 \times 10^5$ g/mol.

In some embodiments, compound is between about $1.0 \times 10^3$ g/mol to about $1.0 \times 10^4$ g/mol.

In some embodiments, the compound is between about $1.0 \times 10^3$ g/mol and about $5.0 \times 10^3$ g/mol.

In some embodiments, the compound is between about $2.0 \times 10^3$ g/mol and about $3.0 \times 10^3$ g/mol.

In some embodiments, the compound is not

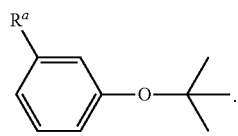

In some embodiments, the compound is not

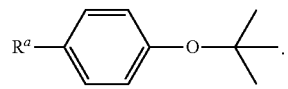

In some embodiments, the compound is not

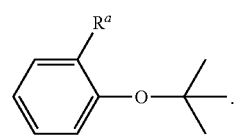

In some embodiments, the compound is not

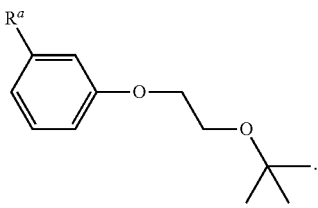

In some embodiments, the compound is not

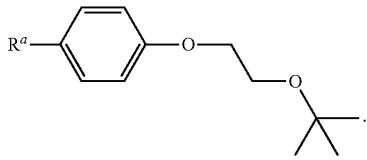

In some embodiments, the compound is not

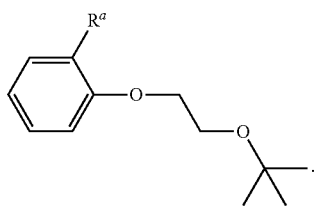

In some embodiments, the compound is not

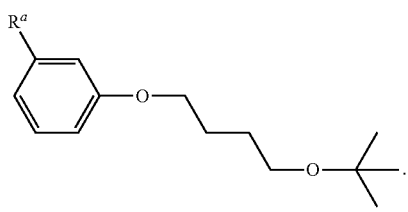

In some embodiments, the compound is not

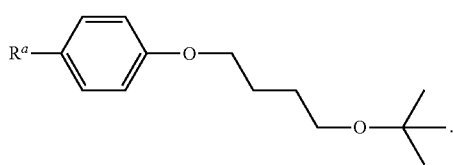

In some embodiments, the compound is not

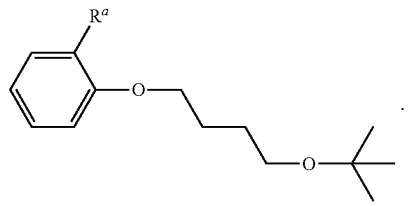

In some embodiments, the compound is not

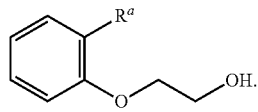

In some embodiments, the compound is not

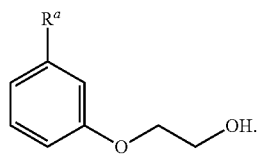

In some embodiments, the compound is not

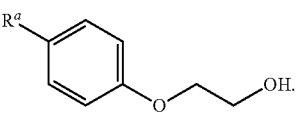

In some embodiments, when 2 or more of $R^5$-$R^7$ is hydroxy, the compound of formula I may polymerize to form a siloxane or silicone.

The embodiments and examples described above are intended to be merely exemplary, and such examples and embodiments are non-limiting. For example, included within the scope of the subject matter described herein are all combinations of the embodiments described herein. In addition, one of ordinary skill in the art will recognize, or will be able to ascertain using no more than routine experimentation, modifications of the embodiments and examples described herein. Such modifications are considered to be within the scope of the claimed subject matter and are encompassed by the appended claims.

5.4 EXAMPLES

5.4.1 Example 1

This example involved alkylation of anisole with monofunctional tert-chloride polyisobutylene activated with $TiCl_4$ (titanium tetrachloride). A 0.02 M solution of $2\times10^3$ g/mol tert-chloride polyisobutylene (100-mL) was prepared at $-60°$ C. in a 60/40 (v/v) mixture of hexane/methyl chloride. To this solution were added 3 eq. (0.66 mL) of anisole and 6 eq. (1.33 mL) of $TiCl_4$. Quantitative capping of the polyisobutylene chain ends was achieved in 45 min. The product consisted exclusively of the para substituted anisole.

5.4.2 Example 2

This example involved in situ alkylation of anisole by quasiliving polyisobutylene from a difunctional initiator. The polymerization/alkylation was performed within a $N_2$ atmosphere dry box equipped with a cryostat bath. To a 60/40 (v/v) mixture of methyl chloride (90 mL)/hexane (60 mL) at $-60°$ C. were added 2,6-lutidine (0.1 mL), 5-tert-butyl-1,3-bis(1-chloro-1-methylethyl)benzene (0.448-g), and isobutylene (3.9 mL). The polymerization of isobutylene was catalyzed by the addition of 5 eq of $TiCl_4$ (1.71 mL). The polymerization was complete in approximately 2 min, at which point 3 eq of anisole (1.02 mL) was immediately added. Quantitative capping of the chain ends by anisole (determined by $^1$H-NMR) was achieved in approximately 45 min. The catalyst was destroyed by the addition of excess methanol, and the polymer was recovered after volatilization of the methyl chloride and precipitation from hexane into methanol. The number average molecular weight of the final polymer was $2.3 \times 10^3$ g/mol with a polydispersity of 1.03.

5.4.3 Example 3

This example involved in situ alkylation of (3-bromopropoxy)benzene by quasiliving polyisobutylene from a difunctional initiator. The polymerization/alkylation was performed within a $N_2$ atmosphere dry box equipped with a cryostat bath. To a 60/40 (v/v) mixture of methyl chloride (90 mL)/hexane (60 mL) at $-60°$ C. were added 2,6-lutidine (0.1 mL), 5-tert-butyl-1,3-bis(1-chloro-1-methylethyl)benzene (0.448 g), and isobutylene (3.9 mL). The polymerization of isobutylene was catalyzed by the addition of 5 eq of $TiCl_4$ (1.71-mL). The polymerization was complete in approximately 2 min, at which point 3 eq of (3-bromopropoxy)benzene (1.47 mL) was immediately added. Quantitative capping of the chain ends by anisole (determined by $^1$H-NMR) was achieved in approximately 80 min. The catalyst was destroyed by the addition of excess methanol, and the polymer was recovered after volatilization of the methyl chloride and precipitation from hexane into methanol. The number average molecular weight of the final polymer was $2.5 \times 10^3$ g/mol with a polydispersity of 1.02.

5.4.4 Example 4

This example involved alkylation of β-chlorophenetole with mono-functional tert-chloride terminated polyisobutylene activated with $TiCl_4$. A 0.02 M solution of $2 \times 10^3$ g/mol tert-chloride terminated polyisobutylene (50 mL) was prepared at $-60°$ C. in a 60/40 (v/v) mixture of methyl chloride and hexane. To this solution were added 5 eq of β-chlorophenetole (0.71 mL) and 6 eq of $TiCl_4$ (0.67 mL). Quantitative capping of the polyisobutylene chain ends was achieved in under 1 h.

5.4.5 Example 5

This example involved alkylation of allyl phenyl ether with mono-functional tert-chloride terminated polyisobutylene activated with $TiCl_4$. A 0.02 M solution of $2 \times 10^3$ g/mol tert-chloride terminated polyisobutylene (15 mL) was prepared at $-60°$ C. in a 60/40 (v/v) mixture of methyl chloride and hexane. To this solution were added 3 eq of allyl phenyl ether (0.12 mL) and 6 eq of $TiCl_4$ (0.2 mL). Quantitative capping of the polyisobutylene chain ends was achieved in under 2 h. However, after extended reaction time (>1 h) the allyl phenyl ether terminated polymer undergoes a pericyclic [3,3]-sigmatropic rearrangement resulting in ortho placement of the allyl group. Furthermore, the allyl functionality is partially hydrochlorinated yielding a secondary halide.

5.4.6 Example 6

This example involved alkylation of isopropyl phenyl ether with mono-functional tert-chloride polyisobutylene activated with $TiCl_4$. A 0.02 M solution of $2 \times 10^3$ g/mol tert-chloride polyisobutylene (15 mL) was prepared at $-60°$ C. in a 60/40 (v/v) mixture of methyl chloride and hexane. To this solution were added 4 eq (0.163 g) of isopropyl phenyl ether and 6 eq (0.198 mL) of $TiCl_4$. Quantitative capping of the polyisobutylene chain ends was achieved in under 3 h.

5.4.7 Example 7

This example involved alkylation of 2,6-di-tert-butylphenol with mono-functional tert-chloride terminated polyisobutylene activated with $TiCl_4$. A 0.02 M solution of $2 \times 10^3$ g/mol tert-chloride terminated polyisobutylene (15 mL) was prepared at $-60°$ C. in a 60/40 (v/v) mixture of methyl chloride and hexane. To this solution were added 4 eq (0.248 g) of 2,6-di-tert-butylphenol and 6 eq (0.198 mL) of $TiCl_4$. Quantitative capping of the polyisobutylene chain ends was achieved in under 3 h. The product consisted of an approximately equimolar mixture of meta and para substituted isomers.

5.4.8 Example 8

This example involved cleavage of the methyl phenyl ether functional groups of the product of Example 1 to yield phenol terminated polyisobutylene. Into a 5 mm NMR tube were charged 40 mg of anisole-capped polyisobutylene, from Example 1, and 0.7 mL chloroform-d. To the resulting solution at room temperature was added 8 μL neat $BBr_3$ (4 eq relative to anisole groups). The reaction was allowed to proceed at room temperature, and the progress of cleavage of the anisole methyl group to yield phenol-capped polyisobutylene was monitored by observing the disappearance of the methyl hydrogens signal at 3.78 ppm via $^1$H NMR spectroscopy. Cleavage was first order with rate constant $9.1 \times 10^{-3}$ min$^{-1}$. Essentially complete conversion (~98%) was achieved in approximately 7 h.

5.4.9 Example 9

This example involved alkylation of phenoxy derivatives having alkanol tethers with mono-functional tert-chloride terminated polyisobutylene activated by $TiCl_4$. In vials, 0.02 M solutions of $2 \times 10^3$ g/mol tert-chloride terminated polyisobutylene (15 mL) were prepared at $-60°$ C. using a 60/40 (v/v) mixture of methyl chloride and hexane. To separate vials containing the polymer solution were added 3 eq of 11-phenoxy-1-undecanol (0.238 g), 6-phenoxy-1-hexanol (0.175 g), 4-phenoxy-1-butanol (0.150 g), and 2-phenoxyethanol (0.124 g). The alkylation reactions were catalyzed by addition of 6 eq of $TiCl_4$ (0.264 mL) to each vial. The reactions were allowed to proceed at $-60°$ C. for 3 h before addition of chilled methanol to destroy the catalyst. For the phenoxy derivatives with alkanol tether lengths from 11 to 4 carbons, $^1$H NMR analysis of the product polymer chain ends indicated high fractions of hydroxyl functionalization. Integration of the $^1$H NMR spectra provided estimates of 94% capping with 11-phenoxy-1-undecanol, 93% capping with 6-phenoxy-1-hexanol, 83% capping with 4-phenoxy-1-butanol, and no capping with 2-phenoxyethanol. In each case, the balance of the chain ends was tert-chloride.

5.4.10 Example 9

This example involved alkylation of tert-butyl(3-phenoxy-1-propynyl)diphenylsilane with mono-functional tert-chloride terminated polyisobutylene activated with $TiCl_4$.

tert-Butyl(3-phenoxy-1-propynyl)diphenylsilane was synthesized as follows: to a solution of phenyl propargyl ether (5.15 g, 39.0 mmol) in tetrahydrofurane (50 mL) was added n-butyllithium (17.14 mL of a 2.5 M solution in hexanes) (42.86 mmol) dropwise at −40° C. The mixture was stirred at −40° C. for 2 h; then tert-butylchlorodiphenylsilane (12.85 g, 46.76 mmol) was added, and the resulting mixture was stirred for 2 h at −40° C. The reaction mixture was allowed to warm to room temperature and stirred for 24 h. The solvent was removed using a rotary evaporator, and the crude product was purified by distillation from calcium hydride.

Into a 75-mL culture tube equipped with a Teflon-lined screw cap were charged 1.5 g of 2×10³ g/mol tert-chloride terminated polyisobutylene, 10 mL of methyl chloride, 15 mL of n-hexane, and 0.008 mL (0.008 g, 0.074 mmol) of 2,6-lutidine. The mixture was cooled to −70° C. with swirling, and then 0.66 mL (1.15 g, 6.08 mmol) of TiCl₄, followed by a pre-chilled (−70° C.) solution of tert-butyl(3-phenoxy-1-propynyl)diphenylsilane (1.41 g in 15 mL of n-hexane and 10 mL methyl chloride) were added to the tube. Quantitative capping of the polyisobutylene chain ends was achieved in under 5 h.

5.4.11 Comparative Examples

When phenol was used as a quencher under conditions otherwise identical to Example 6, quenching did not produce any of the desired compound of formula II.

When tert-butyl phenyl ether was used as a quencher under the conditions of Example 6 with a 3 h quenching time, quenching did not produce any of the desired compound of formula II.

When 2-tert-butoxyethyl phenyl ether was used as a quencher under the conditions of Example 1 with a 3 h quenching time, quenching did not produce any of the desired compound of formula II.

When 4-tert-butoxybutyl phenyl ether was used as a quencher under conditions otherwise identical to Example 1, quenching did not produce any of the desired compound of formula II.

When phenoxyacetonitrile was used as a quencher under the conditions of Example 5 with a 2 h quenching time, quenching did not produce any of the desired compound of formula II.

When 1,2-diphenoxyethane was used as a quencher under the conditions of Example 5 with a 2 h quenching time, quenching did not produce any of the desired compound of formula II.

What is claimed:

1. A method for preparing a telechelic polymer of formula I:

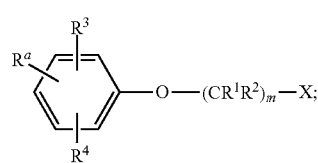

wherein:
$R^a$ is a polyolefin group;
$R^1$ and $R^2$ are each, independently in each —(CR$^1$R$^2$)— unit, H or alkyl; and
m is an integer from 1 to 20; wherein:
if m is 1,
then $R^3$ and $R^4$ are each, independently, H, alkyl, or alkoxy, and
X is

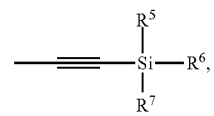

wherein $R^5$-$R^7$ are each, independently, alkyl or aryl;
or
if m is 2 and —O—(CR$^1$R$^2$)$_m$—X is not ortho to $R^4$,
then $R^3$ and $R^4$ are each, independently, H, alkyl, or alkoxy, and
X is —Cl, —Br, or

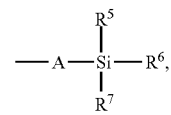

wherein A is ══ or nothing,
$R^5$-$R^7$ are each, independently, alkyl, alkenyl, alkynyl, alkaryl, aralkyl, aryl, heteroaryl, alkoxy, hydroxy, —NR$^{10}$R$^{11}$, —F, —Br, or —I, and
$R^{10}$ and $R^{11}$ are each, independently, H, alkyl, alkenyl, alkynyl, alkaryl, aryl, or heteroaryl;
or
if m is 2 and —O—(CR$^1$R$^2$)$_m$—X is ortho to $R^4$,
then $R^3$ is H, alkyl, or alkoxy, and
X and $R^4$ are:
X and $R^4$, together with the atoms to which X and $R^4$ are attached, form a ring, with the proviso that $R^1$ and $R^2$ are H; or
(ii) $R^4$ is H, alkyl, or alkoxy, and
X is —Cl, —Br, or

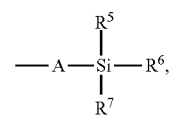

wherein A is ══ or nothing,
$R^5$-$R^7$ are each, independently, alkyl, alkenyl, alkynyl, alkaryl, aralkyl, aryl, heteroaryl, alkoxy, hydroxy, —NR$^{10}$R$^{11}$, —F, —Br, or —I, and
$R^{10}$ and $R^{11}$ are each, independently, H, alkyl, alkenyl, alkynyl, alkaryl, aryl, or heteroaryl;
or
if m is 3-20,
then $R^3$ and $R^4$ are each, independently, H, alkyl, or alkoxy, and X is —OH, —Cl, —Br, or

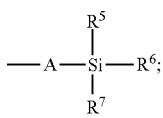

wherein A is ≡ nothing, $R^5$-$R^7$ are each, independently, alkyl, alkenyl, alkynyl, alkaryl, aralkyl, aryl, heteroaryl, alkoxy, hydroxy, —$NR^{10}R^{11}$, —F, —Br, or —I, and $R^{10}$ and $R^{11}$ are each, independently, H, alkyl, alkenyl, alkynyl, alkaryl, aryl, or heteroaryl;

comprising:

(a) generating a quasiliving carbocationic polyolefin, wherein the quasiliving carbocationic polyolefin is prepared by adding a first Lewis acid and a monomer to an initiator in the presence of an electron donor, common ion salt, or common ion salt precursor; and the initiator is 2-chloro-2,4,4-trimethylpentane, 5-tert-butyl-1,3-bis(1-chloro-1-methylethyl)benzene, 1,3,5-tri(2-chloro-2-propyl)benzene, or 1,3,5-tri(2-methoxy-2-propyl)benzene; and (b) reacting the quasiliving carbocationic polyolefin from step (a) with one or more compounds of formula II in the presence of a second Lewis acid or mixture of Lewis acids under quasiliving carbocationic polymerization conditions:

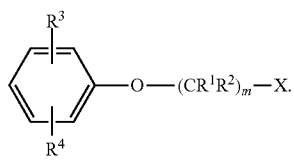

II

2. The method of claim 1, wherein the telechelic polymer of formula I is:

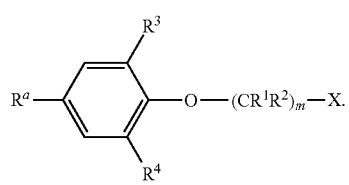

3. The method of claim 1, wherein the telechelic polymer of formula I is:

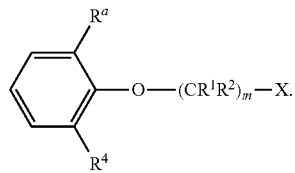

4. The method of claim 1, wherein $R^a$ is a polyisobutyl group.

5. A method for preparing a telechelic polymer of formula:

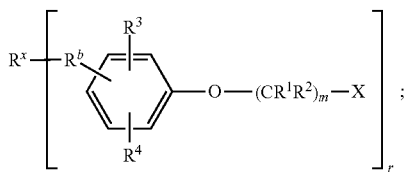

wherein:

$R^b$ is a polyisobutylene group;

$R^x$ is a polyfunctional carbocationic initiator residue;

r is an integer from 1 to 4;

$R^1$ and $R^2$ are each, independently in each —$(CR^1R^2)$— unit, H or alkyl; and m is an integer from 1 to 20; wherein:

if m is 1, then $R^3$ and $R^4$ are each, independently, H, alkyl, or alkoxy, and X is R

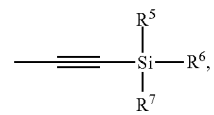

wherein $R^5$-$R^7$ are each, independently, alkyl or aryl;

or if m is 2 and —O—$(CR^1R^2)_m$—X is not ortho to $R^4$, then $R^3$ and $R^4$ are each, independently, H, alkyl, or alkoxy, and X is —Cl, —Br, or

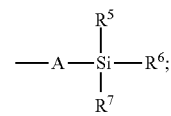

wherein A is ≡ or nothing, $R^5$-$R^7$ are each, independently, alkyl, alkenyl, alkynyl, alkaryl, aralkyl, aryl, heteroaryl, alkoxy, hydroxy, —$NR^{10}R^{11}$, —F, —Br, or —I, and $R^{10}$ and $R^{11}$ are each, independently, H, alkyl, alkenyl, alkynyl, alkaryl, aryl, or heteroaryl;

or if m is 2 and —O—$(CR^1R^2)_m$—X is ortho to $R^4$, then $R^3$ is H, alkyl, or alkoxy, and X and R⁴ are:
(i) X and R⁴, together with the atoms to which X and R⁴ are attached, form a ring, with the proviso that R¹ and R² are H; or
(ii) R⁴ is H, alkyl, or alkoxy, and
X is —Cl, —Br, or

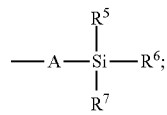

wherein A is ≡ or nothing,
R⁵-R⁷ are each, independently, alkyl, alkenyl, alkynyl, alkaryl, aralkyl, aryl, heteroaryl, alkoxy, hydroxy, —NR¹⁰R¹¹, —F, —Br, or —I, and R¹⁰ and R¹¹ are each, independently, H, alkyl, alkenyl, alkynyl, alkaryl, aryl, or heteroaryl;

or
if m is 3-20,
then R³ and R⁴ are each, independently, H, alkyl, or alkoxy, and
X is —OH, —Cl, —Br, or

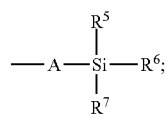

wherein A is ≡ or nothing,
R⁵-R⁷ are each, independently, alkyl, alkenyl, alkynyl, alkaryl, aralkyl, aryl, heteroaryl, alkoxy, hydroxy, —NR¹⁰R¹¹, —F, —Br, or —I, and R¹⁰ and R¹¹ are each, independently, H, alkyl, alkenyl, alkynyl, alkaryl, aryl, or heteroaryl;
comprising:
(a) generating a quasiliving carbocationic polyolefin; and
(b) reacting the quasiliving carbocationic polyolefin from step (a) with one or more compounds of formula II in the presence of a Lewis acid or mixture of Lewis acids under quasiliving carbocationic polymerization conditions:

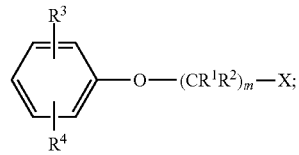

II wherein the telechelic polymer is:

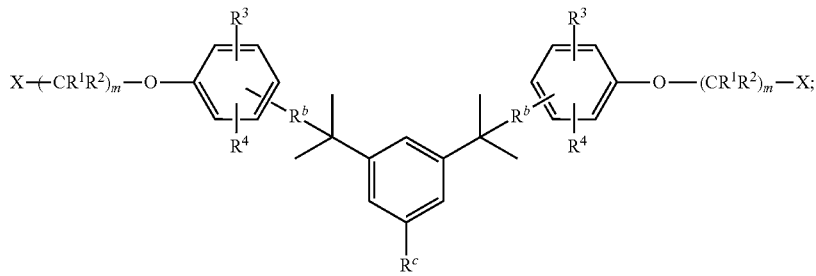

wherein R^C is H or alkyl;
or

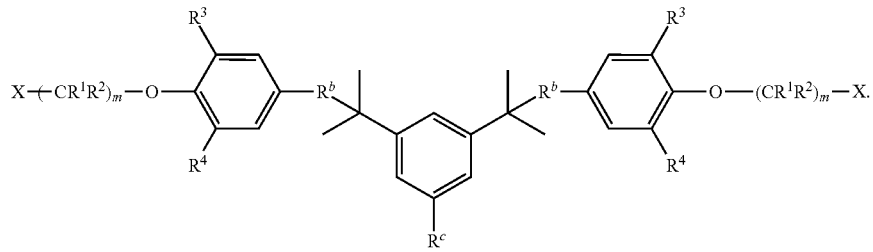

or

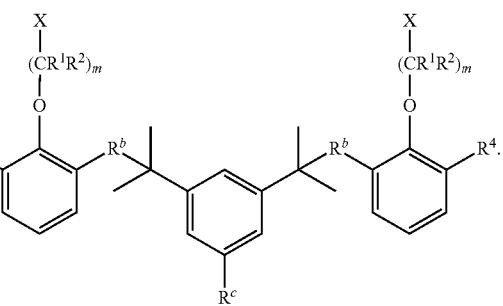

or
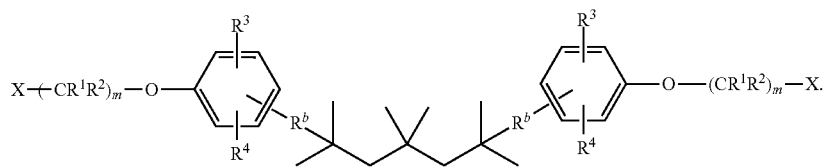
or
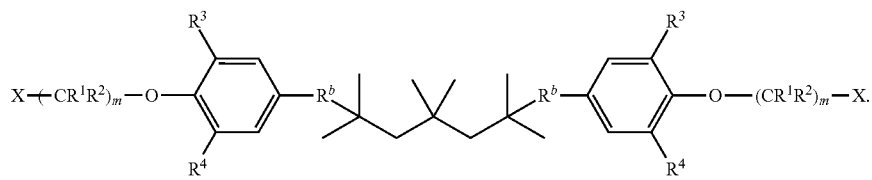
or
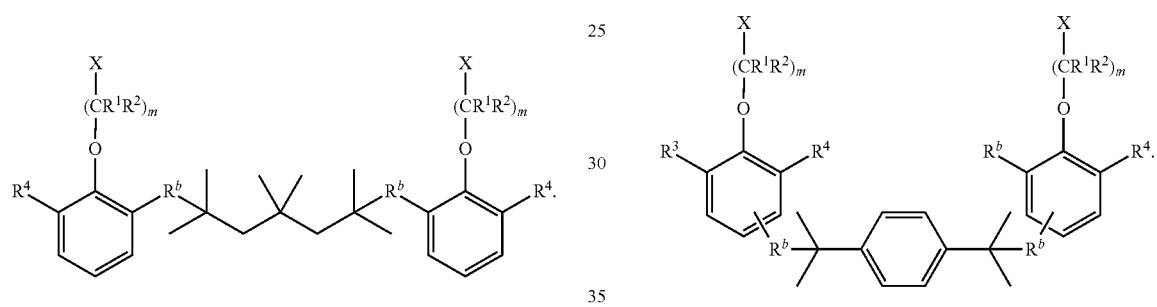
or
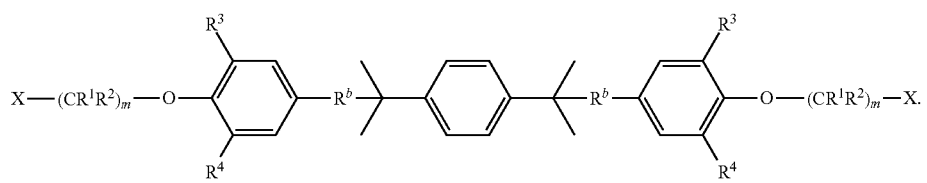
or
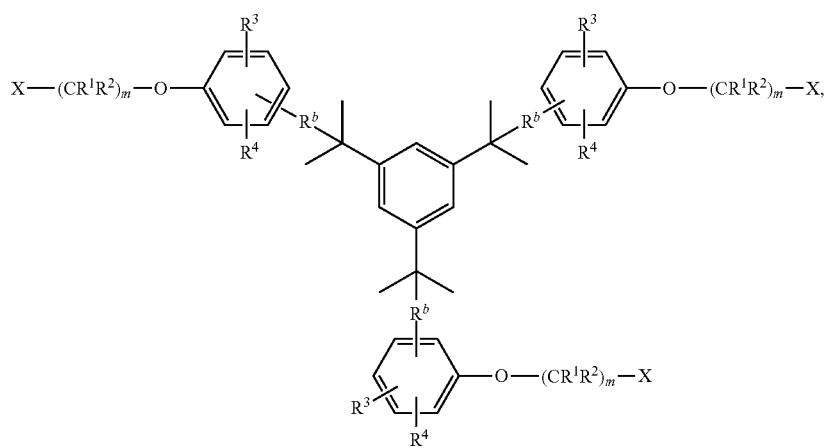

or

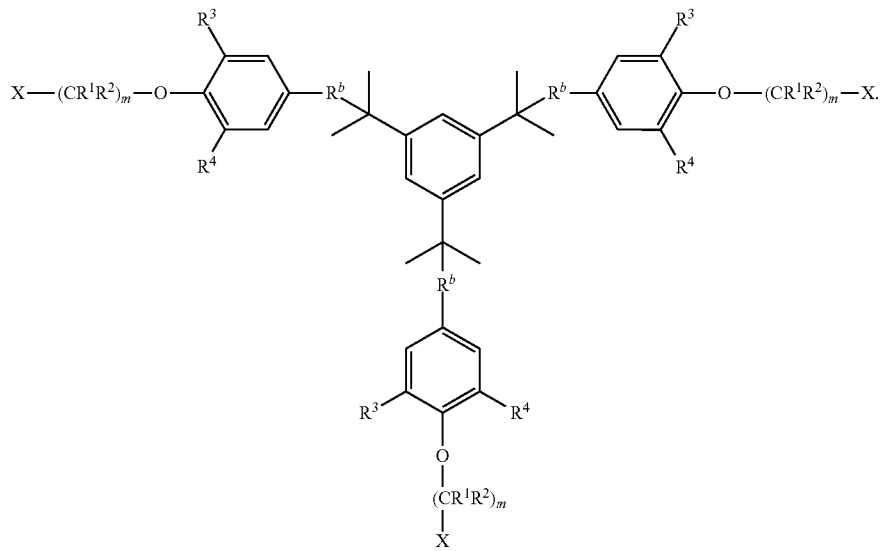

6. The method of claim 1, wherein $R^1$ and $R^2$ are each, independently in each $—(CR^1R^2)$ unit, alkyl of 1 to about 6 carbons or hydrogen.

7. The method of claim 1, wherein $R^1$ and $R^2$ are each, independently in each $—(CR^1R^2)$ unit, methyl or hydrogen.

8. The method of claim 1, wherein $R^3$ and $R^4$ are identical.

9. The method of claim 1, wherein m is 1-20 and $R^3$ and $R^4$ are hydrogen.

10. The method of claim 1, wherein $R^3$ and $R^4$ are each, independently, tert-butyl.

11. The method of claim 1, wherein m is 1.

12. The method of claim 1, wherein m is 2.

13. The method of claim 1, wherein m is 3-20.

14. The method of claim 1, wherein m is 1 and X is

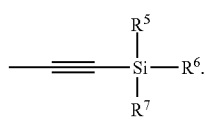

15. The method of claim 14, wherein at least one of $R^5$-$R^7$ is tert-butyl or phenyl.

16. The method of claim 1, wherein m is 2-20 and X is Cl or Br.

17. The method of claim 1, wherein m is 3 to 20 and X is OH.

18. The method of claim 1, wherein $R^{10}$ and $R^{11}$ are each, independently, alkyl of 1 to about 6 carbons.

19. The method of claim 1, wherein
m is 2;
$R^1$ and $R^2$ are H;
$—O—(CR^1R^2)_m—X$ is ortho to $R^4$; and
X and $R^4$, together, with the atoms to which X and $R^4$ are attached, form a ring.

20. The method of claim 1, wherein m is 2-20 and X is

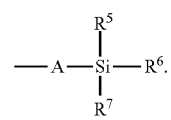

21. The method of claim 20, wherein at least one of $R^5$-$R^7$ is tert-butyl or phenyl.

22. The method of claim 1, wherein the compound of formula II is

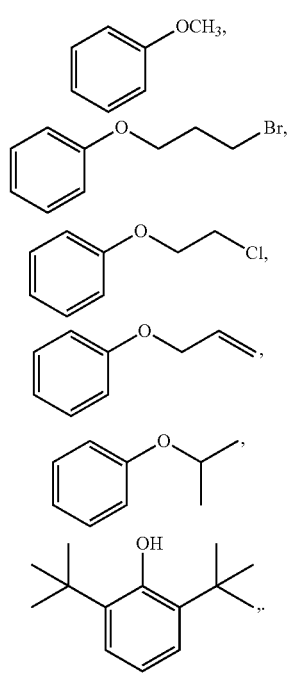

-continued

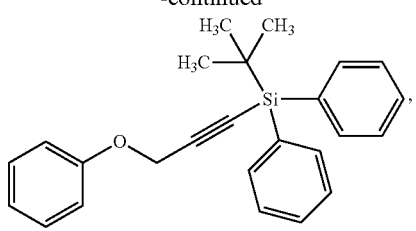

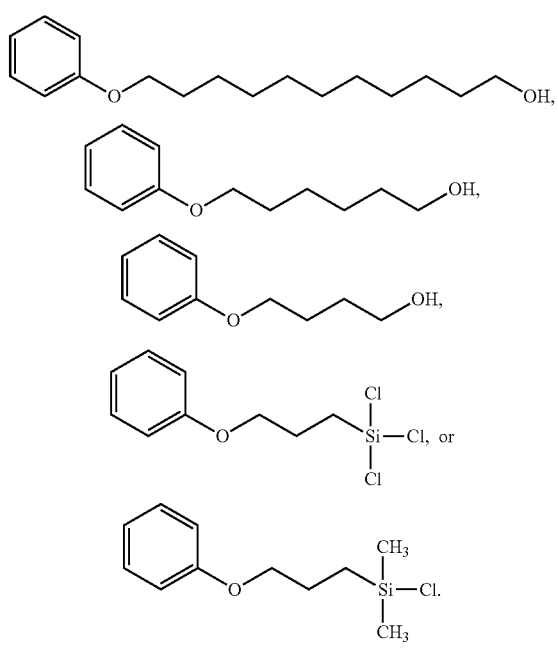

23. The method of claim 1, wherein the monomer is isobutylene, 2-methyl-1-butene, 3-methyl-1-butene, or 4-methyl-1-pentene.

24. The method of claim 1, wherein the monomer is isobutylene.

25. The method of claim 1, wherein the electron donor is 2,6-dimethylpyridine.

26. The method of claim 1, wherein the first Lewis acid is a titanium tetrahalide, a boron trihalide, aluminum trichloride, tin tetrachloride, zinc chloride, or ethyl aluminum dichloride, or a mixture thereof.

27. The method of claim 1, wherein

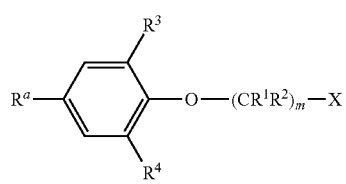

is the major isomer product.

28. The method of claim 5, wherein

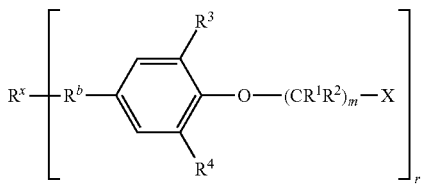

is the major isomer product.

29. The method of claim 1, further comprising a step of reacting the compound of formula I with an acid to form a compound of formula III:

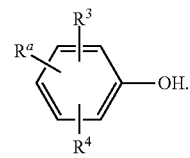
III

30. The method of claim 29, wherein the acid is a Lewis acid or a mixture of a Lewis acid and a protic acid.

31. The method of claim 29, wherein the acid is $BBr_3$, $BCl_3$, $AlCl_3$, $AlBr_3$, $TiCl_4$, or $TiBr_4$.

32. A method for preparing a telechelic polymer of formula I:

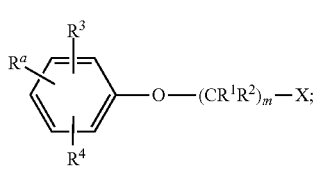
I wherein:
  $R^a$ is a polyolefin group;
  $R^1$ and $R^2$ are each, independently in each $—(CR^1R^2)$ unit, H or alkyl; and
  m is an integer from 1 to 20; wherein:
    if m is 1,
      then $R^3$ and $R^4$ are each, independently, H, alkyl, or alkoxy, and
      X is

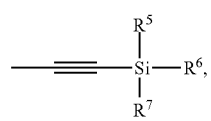

wherein $R^5$-$R^7$ are each, independently, alkyl or aryl;
    or
    if m is 2, and $—O—(CR^1R^2)_m—X$ is not ortho to $R^4$,
      then $R^3$ and $R^4$ are each, independently, H, alkyl, or alkoxy, and X is —Cl, —Br, or

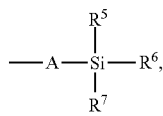

wherein A is —≡— or nothing,
R⁵-R⁷ are each, independently, alkyl, alkenyl, alkynyl, alkaryl, aralkyl, aryl, heteroaryl, alkoxy, hydroxy, —NR¹⁰R¹¹, —F, —Br, or —I, with the proviso that at least one of R⁵-R⁷ is tert-butyl or phenyl; wherein R¹⁰ and R¹¹ are each, independently, H, alkyl, alkenyl, alkynyl, alkaryl, aryl, or heteroaryl;

or
if m is 2, and —O—(CR¹R²)ₘ—X is ortho to R⁴,
then R³ is H, alkyl, or alkoxy, and
X, R¹, R², and R⁴ are:
(i) R² and R³ are H; and
X and R⁴, together with the atoms to which X and R⁴ are attached, form a ring; or
(ii) R¹ and R² are each, independently in each —(CR¹R²) unit, H or alkyl;
R³ and R⁴ are each, independently, H, alkyl, or alkoxy, and
X is —Cl, —Br, or

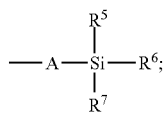

wherein A is —≡— or nothing,
R⁵-R⁷ are each, independently, alkyl, alkenyl, alkynyl, alkaryl, aralkyl, aryl, heteroaryl, alkoxy, hydroxy, —NR¹⁰R¹¹, —F, —Br, or —I, with the proviso that at least one of R⁵-R⁷ is tert-butyl or phenyl; wherein R¹⁰ and R¹¹ are each, independently, H, alkyl, alkenyl, alkynyl, alkaryl, aryl, or heteroaryl;

or
if m is 3-20,
then R³ and R⁴ are each, independently, H, alkyl, or alkoxy, and
X is —OH, —Cl, —Br, or

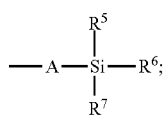

wherein A is —≡— or nothing,
R⁵-R⁷ are each, independently, alkyl, alkenyl, alkynyl, alkaryl, aralkyl, aryl, heteroaryl, alkoxy, hydroxy, —NR¹⁰R¹¹, —F, —Br, or —I, with the proviso that at least one of R⁵-R⁷ is tert-butyl or phenyl; wherein R¹⁰ and R¹¹ are each, independently, H, alkyl, alkenyl, alkynyl, alkaryl, aryl, or heteroaryl;
comprising:
(a) generating a quasiliving carbocationic polyolefin; and
(b) reacting the quasiliving carbocationic polyolefin from step (a) with one or more compounds of formula II in the presence of a Lewis acid or mixture of Lewis acids under quasiliving carbocationic polymerization conditions:

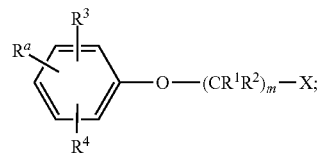

33. The method of claim 32, wherein the telechelic polymer of formula I is:

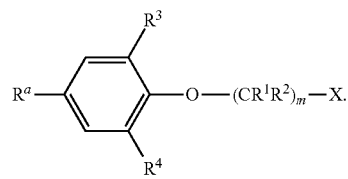

34. The method of claim 32, wherein the telechelic polymer of formula I is:

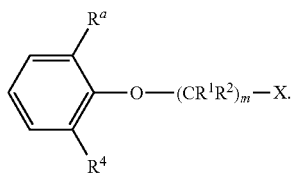

35. The method of claim 32, wherein Rᵃ is a polyisobutyl group.

36. The method of claim 32, wherein the quasiliving carbocationic polyolefin is prepared by adding a Lewis acid and a monomer to an initiator in the presence of an electron donor, common ion salt, or common ion salt precursor.

37. The method of claim 36, wherein the initiator is 2-chloro-2,4,4-trimethylpentane, 5-tert-butyl-1,3-bis(1-chloro-1-methylethyl)benzene, 1,3,5-tri(2-chloro-2-propyl) benzene, or 1,3,5-tri(2-methoxy-2-propyl)benzene.

38. The method of claim 36, wherein the monomer is isobutylene, 2-methyl-1-butene, 3-methyl-1-butene, or 4-methyl-1-pentene.

39. A method for preparing a telechelic polymer of formula I:

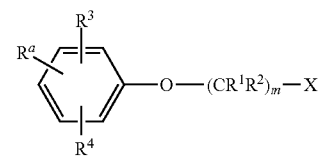

wherein:

R$^a$ is a polyolefin group;

R$^1$ and R$^2$ are each, independently in each —(CR$^1$R$^2$) unit, H or alkyl; and m is an integer from 1 to 20; wherein:

if m is 1, then R$^3$ and R$^4$ are each, independently, H, alkyl, or alkoxy, and X is H, alkyl, alkynyl, alkaryl, aralkyl, aryl, heteroaryl or

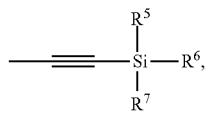

wherein R$^5$-R$^7$ are each, independently, alkyl or aryl;

or if m is 2 and —O—(CR$^1$R$^2$)$_m$—X is not ortho to R$^4$, then R$^3$ and R$^4$ are each, independently, H, alkyl, or alkoxy, and X is H, alkyl, alkynyl, alkaryl, aralkyl, aryl, heteroaryl, alkoxy, —F, —Cl, —Br, —I, —CN, —NC, —NCO, —OCN, —NCS, —SCN, —OC(O)R$^8$, —C(O)OR$^9$, —C(O)NR$^{10}$R$^{11}$ or

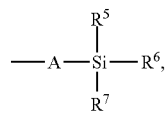

wherein A is ══ or nothing,

R$^5$-R$^7$ are each, independently, alkyl, alkenyl, alkynyl, alkaryl, aralkyl, aryl, heteroaryl, alkoxy, hydroxy, —NR$^{10}$R$^{11}$, —F, —Br, or —I, R$^8$ is alkyl, alkenyl, alkynyl, alkaryl, aryl, or heteroaryl, and R$^9$-R$^{11}$ are each, independently, H, alkyl, alkenyl, alkynyl, alkaryl, aryl, or heteroaryl;

or if m is 2 and —O—(CR$^1$R$^2$)$_m$—X is ortho to R$^4$, then R$^3$ is H, alkyl, or alkoxy, and X and R$^4$ are:

(i) X and R$^4$, together with the atoms to which X and R$^4$ are attached, form a ring; or (ii) R$^4$ is H, alkyl, or alkoxy, and X is H, alkyl, alkynyl, alkaryl, aralkyl, aryl, heteroaryl, alkoxy, —F, —Cl, —Br, —I, —CN, —NC, —NCO, —OCN, —NCS, —SCN, —OC(O)R$^8$, —C(O)OR$^9$, —C(O)NR$^{10}$R$^{11}$, or

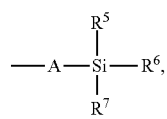

wherein A is ══ nothing,

R$^5$-R$^7$ are each, independently, alkyl, alkenyl, alkynyl, alkaryl, aralkyl, aryl, heteroaryl, alkoxy, hydroxy, —NR$^{10}$R$^{11}$, —F, —Br, or —I, R$^8$ is alkyl, alkenyl, alkynyl, alkaryl, aryl, or heteroaryl, and R$^9$-R$^{11}$ are each, independently, H, alkyl, alkenyl, alkynyl, alkaryl, aryl, or heteroaryl;

or if m is 3-20, then R$^3$ and R$^4$ are each, independently, H, alkyl, or alkoxy, and X is H, alkyl, alkynyl, alkaryl, aralkyl, aryl, heteroaryl, alkoxy, aryloxy, heteroaryloxy, alkaryloxy, —OH, —F, —Cl, —Br, —I, —CN, —NC, —NCO, —OCN, —NCS, —SCN, —OC(O)R$^8$, —C(O)OR$^9$, —C(O)NR$^{10}$R$^{11}$,

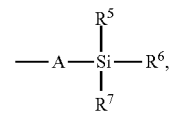

or NR$^X$R$^Y$;

wherein A is ══ or nothing,

R$^X$ and R$^Y$ are each, independently, H, alkyl, alkenyl, alkynyl, cycloalkyl, aryl, heteroaryl, heterocyclyl, or C(O)R$^Z$, wherein R$^Z$ is H, alkyl, alkenyl, alkynyl, cycloalkyl, aryl, heteroaryl, heterocyclyl, —OR$^8$, or —NR$^{10}$R$^{11}$;

R$^5$-R$^7$ are each, independently, alkyl, alkenyl, alkynyl, alkaryl, aralkyl, aryl, heteroaryl, alkoxy, hydroxy, —NR$^{10}$R$^{11}$, —F, —Br, or —I, R$^8$ is alkyl, alkenyl, alkynyl, alkaryl, aryl, or heteroaryl, and R$^9$-R$^{11}$ are each, independently, H, alkyl, alkenyl, alkynyl, alkaryl, aryl, or heteroaryl;

comprising:

(a) generating a quasiliving carbocationic polyolefin;

(b) reacting the quasiliving carbocationic polyolefin from step (a) with one or more compounds of formula II in the presence of a Lewis acid or mixture of Lewis acids under quasiliving carbocationic polymerization conditions to form the telechelic polymer of formula I;

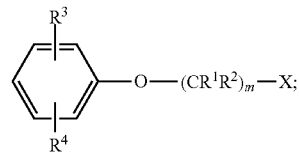

and (c) reacting the telechelic polymer of formula I from step (b) with an acid to form a compound of formula III:

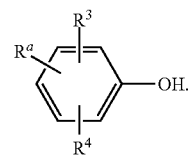

40. The method of claim 39, wherein the telechelic polymer of formula I is:

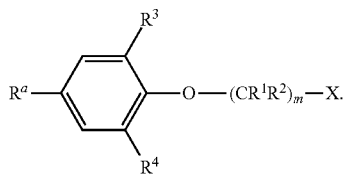

41. The method of claim 39, wherein the telechelic polymer of formula I is:

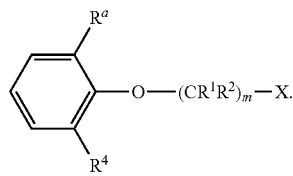

42. The method of claim 39, wherein $R^a$ is a polyisobutyl group.

43. The method of claim 39, wherein the quasiliving carbocationic polyolefin is prepared by adding a Lewis acid and a monomer to an initiator in the presence of an electron donor, common ion salt, or common ion salt precursor.

44. The method of claim 43, wherein the initiator is 2-chloro-2,4,4-trimethylpentane, 5-tert-butyl-1,3-bis(1-chloro-1-methylethyl)benzene, 1,3,5-tri(2-chloro-2-propyl)benzene, or 1,3,5-tri(2-methoxy-2-propyl)benzene.

45. The method of claim 43, wherein the monomer is isobutylene, 2-methyl-1-butene, 3-methyl-1-butene, or 4-methyl-1-pentene.

46. The method of claim 39, wherein the acid for the step (c) is a Lewis acid or a mixture of a Lewis acid and a protic acid.

47. The method of claim 46, wherein the acid is $BBr_3$, $BCl_3$, $AlCl_3$, $AlBr_3$, $TiCl_4$, or $TiBr_4$.

* * * * *